US012382041B2

(12) United States Patent
Zhang et al.

(10) Patent No.: US 12,382,041 B2
(45) Date of Patent: Aug. 5, 2025

(54) CODED VIDEO PROCESSING USING ENHANCED SECONDARY TRANSFORM

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Tianliang Fu, Beijing (CN); Yue Wang, Beijing (CN); Siwei Ma, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/953,045

(22) Filed: Sep. 26, 2022

(65) Prior Publication Data
US 2023/0037443 A1    Feb. 9, 2023

Related U.S. Application Data

(63) Continuation of application No. PCT/CN2021/082962, filed on Mar. 25, 2021.

(30) Foreign Application Priority Data

Mar. 25, 2020    (WO) ............... PCT/CN2020/081174

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/126* (2014.11);
(Continued)

(58) Field of Classification Search
CPC ...... H04N 19/60; H04N 19/70; H04N 19/172; H04N 19/124; H04N 19/126
See application file for complete search history.

(56) References Cited

U.S. PATENT DOCUMENTS

| 5,822,004 A | 10/1998 | Crocitti et al. |
| 6,389,072 B1 | 5/2002 | Tzou et al. |

(Continued)

FOREIGN PATENT DOCUMENTS

| CN | 104025589 A | 9/2014 |
| CN | 105516730 A | 4/2016 |

(Continued)

OTHER PUBLICATIONS

Machine translation of "From HEVC to WC: Evolution of transformation technology (2)—Secondary transform" (Year: 2019).*
(Continued)

*Primary Examiner* — David N Werner
(74) *Attorney, Agent, or Firm* — Conley Rose, P.C.

(57) ABSTRACT

A video processing method includes performing a conversion between a video block of a video and a bitstream of the video according to a rule. The rule specifies whether or how usage of a secondary transform within a video unit is indicated in the bitstream. The secondary transform is applied before quantization or after de-quantization.

18 Claims, 40 Drawing Sheets

(51) Int. Cl.
    *H04N 19/126*     (2014.01)
    *H04N 19/172*     (2014.01)
    *H04N 19/176*     (2014.01)
    *H04N 19/189*     (2014.01)
    *H04N 19/60*     (2014.01)
    *H04N 19/61*     (2014.01)
    *H04N 19/70*     (2014.01)

(52) U.S. Cl.
    CPC ......... *H04N 19/172* (2014.11); *H04N 19/176* (2014.11); *H04N 19/189* (2014.11); *H04N 19/60* (2014.11); *H04N 19/61* (2014.11); *H04N 19/70* (2014.11)

(56) References Cited

U.S. PATENT DOCUMENTS

| | | | |
|---|---|---|---|
| 10,666,976 | B2 | 5/2020 | Huang et al. |
| 11,647,229 | B2 | 5/2023 | Zhang |
| 2002/0044605 | A1 | 4/2002 | Nakamura |
| 2004/0264571 | A1 | 12/2004 | Zhang et al. |
| 2013/0003856 | A1 | 1/2013 | Saxena et al. |
| 2014/0254676 | A1 | 9/2014 | Jiang et al. |
| 2016/0050422 | A1 | 2/2016 | Rosewarne et al. |
| 2017/0094313 | A1 | 3/2017 | Zhao et al. |
| 2018/0041776 | A1 | 2/2018 | Kim et al. |
| 2018/0103252 | A1 | 4/2018 | Hseih et al. |
| 2018/0302631 | A1 | 10/2018 | Chiang et al. |
| 2018/0338143 | A1 | 11/2018 | Fracastoro et al. |
| 2018/0367814 | A1 | 12/2018 | Seregin et al. |
| 2019/0028701 | A1 | 1/2019 | Yu et al. |
| 2019/0141334 | A1* | 5/2019 | Lim ...... H04N 19/51 |
| 2019/0356915 | A1 | 11/2019 | Jang et al. |
| 2020/0288134 | A1* | 9/2020 | Lim ...... H04N 19/186 |
| 2020/0288172 | A1 | 9/2020 | Huang et al. |
| 2020/0322617 | A1 | 10/2020 | Zhao et al. |
| 2021/0195222 | A1* | 6/2021 | Egilmez ...... H04N 19/647 |
| 2021/0321134 | A1 | 10/2021 | Koo et al. |
| 2021/0352326 | A1* | 11/2021 | Lim ...... H04N 19/176 |
| 2022/0046281 | A1* | 2/2022 | Nam ...... H04N 19/91 |
| 2022/0109876 | A1 | 4/2022 | Zhang et al. |
| 2022/0132134 | A1* | 4/2022 | Koo ...... H04N 19/70 |
| 2022/0150498 | A1* | 5/2022 | Zhang ...... H04N 19/61 |
| 2022/0159300 | A1* | 5/2022 | Chiang ...... H04N 19/60 |
| 2022/0182675 | A1 | 6/2022 | Zhang et al. |
| 2022/0201335 | A1 | 6/2022 | Chiang et al. |
| 2022/0248055 | A1* | 8/2022 | Koo ...... H04N 19/132 |
| 2022/0264101 | A1* | 8/2022 | Koo ...... H04N 19/186 |
| 2022/0312013 | A1* | 9/2022 | Koo ...... H04N 19/625 |
| 2022/0329786 | A1* | 10/2022 | Huo ...... H04N 19/593 |
| 2022/0329861 | A1* | 10/2022 | Huo ...... H04N 19/159 |
| 2022/0329862 | A1* | 10/2022 | Huo ...... H04N 19/61 |
| 2022/0345744 | A1* | 10/2022 | LeLeannec ...... H04N 19/11 |
| 2022/0360785 | A1* | 11/2022 | Huo ...... H04N 19/176 |
| 2022/0385912 | A1* | 12/2022 | Koo ...... H04N 19/70 |
| 2022/0385946 | A1* | 12/2022 | Chiang ...... H04N 19/186 |
| 2023/0078566 | A1* | 3/2023 | Koo ...... H04N 19/18 375/240.01 |
| 2023/0130131 | A1* | 4/2023 | Chiang ...... H04N 19/12 375/240.18 |
| 2023/0396805 | A1* | 12/2023 | Le Leannec ...... H04N 19/189 |
| 2024/0007674 | A1* | 1/2024 | Koo ...... H04N 19/186 |

FOREIGN PATENT DOCUMENTS

| | | | |
|---|---|---|---|
| CN | 108141594 | A | 6/2018 |
| CN | 108141596 | A | 6/2018 |
| CN | 108141597 | A | 6/2018 |
| CN | 108322745 | A | 7/2018 |
| CN | 108632611 | A | 10/2018 |
| CN | 108712649 | A | 10/2018 |
| CN | 109076222 | A | 12/2018 |
| CN | 109076223 | A | 12/2018 |
| CN | 109076226 | A | 12/2018 |
| CN | 109076230 | A | 12/2018 |
| CN | 109076242 | A | 12/2018 |
| CN | 109076243 | A | 12/2018 |
| CN | 109644269 | A | 4/2019 |
| CN | 110677675 | A | 1/2020 |
| CN | 110636313 | B * | 7/2022 ...... H04N 19/147 |
| EP | 3349451 | A1 | 7/2018 |
| EP | 3506634 | A4 | 8/2019 |
| JP | 7509944 | B2 | 7/2024 |
| KR | 20180041578 | A | 4/2018 |
| KR | 2021-0120802 | A1 * | 10/2021 ...... H04N 19/60 |
| KR | 2321394 | B1 * | 11/2021 ...... H04N 19/105 |
| KR | 102727219 | B1 | 11/2024 |
| TW | 201902219 | A | 1/2019 |
| WO | 2017195555 | A1 | 11/2017 |
| WO | 2017195666 | A1 | 11/2017 |
| WO | 2018037737 | A1 | 3/2018 |
| WO | 2018128323 | A1 | 7/2018 |
| WO | 2018166429 | A1 | 9/2018 |
| WO | 2018174402 | A1 | 9/2018 |
| WO | 2019006148 | A1 | 1/2019 |
| WO | 2019022099 | A1 | 1/2019 |
| WO | 2020046092 | A1 | 3/2020 |
| WO | 2020049446 | A1 | 3/2020 |
| WO | WO-2021194052 | A1 * | 9/2021 ...... H04N 19/103 |

OTHER PUBLICATIONS

Columbia Tristar Home Video, optical disc storing video bitstream of motion picture "Anatomy of a Murder" (Year: 2000).*
CN-110636313-B machine translation (Year: 2022).*
KR-10-2321394-B1 machine translation (Year: 2021).*
KR-2021-0120802-A1 machine translation (Year: 2021).*
WO-2021-194052-A1 machine translation (Year: 2021).*
Document: JVET-N1001-v2, Bross, B., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 361 pages.
Bossen, F., vcgit.hhi.fraunhofer.de/jvet/VVCSoftware_VTM/tags/VTM-4.0, VTM version 4.0, Dec. 7, 2022, 2 pages.
Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.
Document: JVET-M0057, Abdoli, M., et al., CE8: BDPCM with horizontal/vertical predictor and independently decodable areas (test 8.3.1b), Joint Video Experts Team (JVET) of ITU-T SG 16 WP 3 and ISO/IEC JTC 1/SC 29/WG 11 13th Meeting: Marrakech, MA, Jan. 9-18, 2019, 7 pages.
Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.
Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.
Document: JVET-K0102-v1, Zhang, K., et al., "CE4-related: Interweaved Prediction for Affine Motion Compensation," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.

(56) References Cited

OTHER PUBLICATIONS

Document: JVET-N0555-v3, Siekmann, M., et al., "CE6-related: Simplification of the Reduced Secondary Transform," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.
Document: JVET-M0292, Koo, M., et al., "CE6: Reduced Secondary Transform (RST) (test 6.5.1)," Joint Video Experts Team (JVET) of ITU-T SG 16 WP 3 and ISO/IEC JTC 1/SC 29/WG 11 13th Meeting: Marrakech, MA, Jan. 9-18, 2019, 14 pages.
Document: JVET-B0059, Zhao, X., et al., "TU-level non-separable secondary transform," Joint Video Exploration Team (JVET) of ITU-T SG 16 WP 3 and ISO/IEC JTC 1/SC 29/WG 11 2nd Meeting: San Diego, USA, Feb. 20-26, 2016, 5 pages.
"From HEVC to VVC Evolution of Transform Technology (2)—Secondary Transform," retrieved from the internet: https://cloud.tencent.com/developer/article/1427150, May 15, 2019, 6 pages.
Koo, M., et al., "Low Frequency Non-Separable Transform (LFNST)," 2019 Picture Coding Symposium (PCS), Nov. 12-15, 2019, 5 pages.
Zhao, X., et al., "NSST: Non-Separable secondary transforms for next generation video coding," 2016 Picture Coding Symposium (PCS), Dec. 2016, 5 pages.
Document: JVET-P0379-v1, Fan, K., et al., "Non-CE6: A unified zero-out range for 4x4 LFNST," Joint Video Experts Team (JVET) of ITU-T SG 16 WP 3 and ISO/IEC JTC 1/SC 29/WG 11 16th Meeting: Geneva, CH, Oct. 1-11, 2019, 8 pages.
Document: JVET-N1002-v2, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 79 pages.
Foreign Communication From a Related Counterpart Application, PCT Application No. PCT/CN2020/086421, English Translation of International Search Report dated Jul. 23, 2020, 11 pages.
Non-Final Office Action dated Dec. 29, 2021, 22 pages, U.S. Appl. No. 17/406,260, filed Aug. 19, 2021.
Foreign Communication From a Related Counterpart Application, PCT Application No. PCT/CN2020/086444, English Translation of International Search Report dated Aug. 11, 2020, 11 pages.
Foreign Communication From a Related Counterpart Application, European Application No. 20795742.4, Extended European Search Report dated May 3, 2022, 9 pages.
Non-Final Office Action dated Dec. 13, 2021, 21 pages, U.S. Appl. No. 17/406,242, filed Aug. 19, 2021.
Foreign Communication From a Related Counterpart Application, PCT Application No. PCT/CN2020/086458, English Translation of International Search Report dated Jul. 6, 2020, 9 pages.
Foreign Communication From a Related Counterpart Application, PCT Application No. PCT/CN2020/096046, English Translation of International Search Report dated Sep. 24, 2020, 11 pages.
Foreign Communication From a Related Counterpart Application, PCT Application No. PCT/CN2020/133273, English Translation of International Search Report dated Feb. 18, 2021, 10 pages.
Foreign Communication From a Related Counterpart Application, PCT Application No. PCT/CN2021/082962, English Translation of International Search Report dated Jul. 1, 2021, 10 pages.
Bossen F., "VTM-4.0," 2 Pages, Retrieved from URL: vcgit.hhi.fraunhofer.de/jvet/VVCSoftware_VTM/tags/VTM-4.0, retrieved Jun. 29, 2024.
JVET-N0555-v1, Siekmann M., et al., "CE6-Related: Simplification of the Reduced Secondary Transform," Fraunhofer HHI, Mar. 24, 2019, 10 Pages.
Non-Final Office Action for U.S. Appl. No. 17/406,242, mailed Aug. 4, 2022, 18 Pages.
Siekmann, M., et al., "CE6—related: Simplification of the Reduced Secondary Transform," JVET of ITU-T and ISO/IEC, JVET-N0555.pptx in JVET-N0555 version 4 (Mar. 24, 2019), 10 pages.
Document: JCTVC-E380, Alshina, E., et al., "CE7: Experimental results of ROT by Samsung," Joint Collaborative Team on Video Coding (JCT-VC) of ITU-T SG16 WP3 and ISO/IEC JTC1/SC29/WG11 5th Meeting: Geneva, CH, Mar. 16-23, 2011, 10 pages.
Document: JCTVC-I0408, Lan, C., et al., "Intra transform skipping," Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, 6 pages.
Non-Final Office Action from U.S. Appl. No. 18/193,131 dated Jan. 24, 2024, 28 pages.
Chinese Office Action from Chinese Patent Application No. 202180024692.1 dated Dec. 10, 2024, 51 pages.

* cited by examiner

CODED VIDEO PROCESSING USING ENHANCED SECONDARY TRANSFORM

CROSS REFERENCE TO RELATED APPLICATIONS

This application is a continuation of International Patent Application No. PCT/CN2021/082962, filed on Mar. 25, 2021, which claims the priority to and benefits of International Patent Application No. PCT/CN2020/081174, filed on Mar. 25, 2020. For all purposes under the law, the entire disclosure of the aforementioned applications is incorporated by reference as part of the disclosure of this application.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques in which a secondary transform (also referred to as Low Frequency Non-Separable Transform) is used during decoding or encoding of video or images.

In one example aspect, a method of video processing is disclosed. The method includes performing a conversion between a video block of a video and a bitstream of the video according to a rule. The rule specifies whether or how usage of a secondary transform within a video unit is indicated in the bitstream. The secondary transform is applied between forward primary transform and quantization or between de-quantization and invert primary transform.

In another example aspect, a method of video processing is disclosed. The method includes performing a conversion between a video block of a video and a bitstream of the video according to a rule. The rule specifies that usage of a separable secondary transform in the video block is determined based on a syntax element associated with the video block. The separable secondary transform is applied between forward primary transform and quantization or between de-quantization and invert primary transform.

In another example aspect, a method of video processing is disclosed. The method includes performing a conversion between a video block of a video and a bitstream of the video according to a rule. The rule specifies that a secondary transform is selected from multiple separable secondary transforms to be applied to the video block. The secondary transform is applied to rows of the video block or columns of the video block.

In another example aspect, a method of video processing is disclosed. The method includes making a determination of one or more interpolation filters for motion compensation of a video block of a video based on a condition, and performing a conversion between the video block of the video and a bitstream of the video according to the determination.

In another example aspect, a method of video processing is disclosed. The method includes performing a conversion between a video block of a video and a bitstream of the video according to a rule. The video block is coded using an interweaved prediction mode in which the video block is divided into sub-blocks using a first pattern and a second pattern, and a final prediction is determined as a weighted sum of two auxiliary predictions with the first and second patterns. The rule specifies that the two auxiliary predictions with the first and second patterns include uni-prediction and bi-prediction, where the first pattern and the second pattern are different.

In another example aspect, a method of video processing is disclosed. The method includes determining a constraint rule for selectively applying a secondary transform with reduced dimensions during to a conversion between a bitstream representation of a current video block and pixels of the current video block and performing the conversion by applying the secondary transform with reduced dimensions according to the constraint rule. The secondary transform with reduced dimensions has dimensions reduced from a dimension of the current video block. The secondary transform with reduced dimensions is applied in a specific order together with a primary transform during the conversion.

In another example aspect, another method of video processing is disclosed. The method includes determining a constraint rule for selectively applying a secondary transform with reduced dimensions during to a conversion between a bitstream representation of a current video block and a neighboring video region and pixels of the current video block and pixels of the neighboring region, and performing the conversion by applying the secondary transform with reduced dimensions according to the constraint rule. The secondary transform with reduced dimensions has dimensions reduced from a dimension of the current video block and the neighboring video region. The secondary transform with reduced dimensions is applied in a specific order together with a primary transform during the conversion.

In yet another example aspect, another method of video processing is disclosed. The method includes determining a zeroing-out rule for selectively applying a secondary transform with reduced dimensions during to a conversion between a bitstream representation of a current video block and pixels of the current video block and performing the conversion by applying the secondary transform with reduced dimensions according to the zeroing-out rule. The secondary transform with reduced dimensions has dimensions reduced from a dimension of the current video block. The zeroing-out rule specifies a maximum number of coefficients used by the secondary transform with reduced dimensions.

In yet another example aspect, another method of video processing is disclosed. The method includes determining a zeroing-out rule for selectively applying a secondary transform with reduced dimensions during to a conversion between a bitstream representation of a current video block and pixels of the current video block and performing the conversion by applying the secondary transform with reduced dimensions according to the zeroing-out rule. The secondary transform with reduced dimensions has dimensions reduced from a dimension of the current video block. The zeroing-out rule specifies a maximum number of coefficients used by the secondary transform with reduced dimensions.

In yet another example aspect, another method of video processing is disclosed. The method includes determining a condition for selectively applying a secondary transform with reduced dimensions during to a conversion between a bitstream representation of a current video block and pixels of the current video block and performing the conversion by applying the secondary transform with reduced dimensions according to the condition. The secondary transform with reduced dimensions has dimensions reduced from a dimension of the current video block. The condition is signalled in the bitstream representation.

In yet another example aspect, another method of video processing is disclosed. The method includes selectively applying a secondary transform with reduced dimensions during to a conversion between a bitstream representation of a current video block and pixels of the current video block and performing the conversion by applying the secondary transform with reduced dimensions according to the condition. The secondary transform with reduced dimensions has dimensions reduced from a dimension of the current video block. The conversion includes selectively applying a Position Dependent intra Prediction Combination (PDPC) based on a coexistence rule.

In yet another example aspect, another method of video processing is disclosed. The method includes applying a secondary transform with reduced dimensions during to a conversion between a bitstream representation of a current video block and pixels of the current video block, and performing the conversion by applying the secondary transform with reduced dimensions according to the condition. The secondary transform with reduced dimensions has dimensions reduced from a dimension of the current video block. The applying controls a use of neighboring samples for intra prediction during the conversion.

In yet another example aspect, another method of video processing is disclosed. The method includes selectively applying a secondary transform with reduced dimensions during to a conversion between a bitstream representation of a current video block and pixels of the current video block, and performing the conversion by applying the secondary transform with reduced dimensions according to the condition. The secondary transform with reduced dimensions has dimensions reduced from a dimension of the current video block. The selectively applying controls a use of quantization matrix during the conversion.

In yet another example aspect, another method of video processing is disclosed. The method includes determining, for a conversion between a current video block of a video and a bitstream representation of the video, whether to use a separable secondary transform (SST) for the conversion based on a coding condition; and performing the conversion according to the determining.

In yet another example aspect, a video encoder is disclosed. The video encoder comprises a processor configured to implement one or more of the above-described methods.

In yet another example aspect, a video decoder is disclosed. The video decoder comprises a processor configured to implement one or more of the above-described methods.

In yet another example aspect, a computer readable medium is disclosed. The medium includes code for implementing one or more of the above-described methods stored on the medium.

These, and other, aspects are described in the present document.

BRIEF DESCRIPTION OF DRAWINGS

FIG. 9 shows an example order of processing of the rows of pixels to maximize throughput for 4×N blocks with vertical predictor
FIG. 25 shows an example of weighting values in a sub-block.

Figures 27A, 27B:
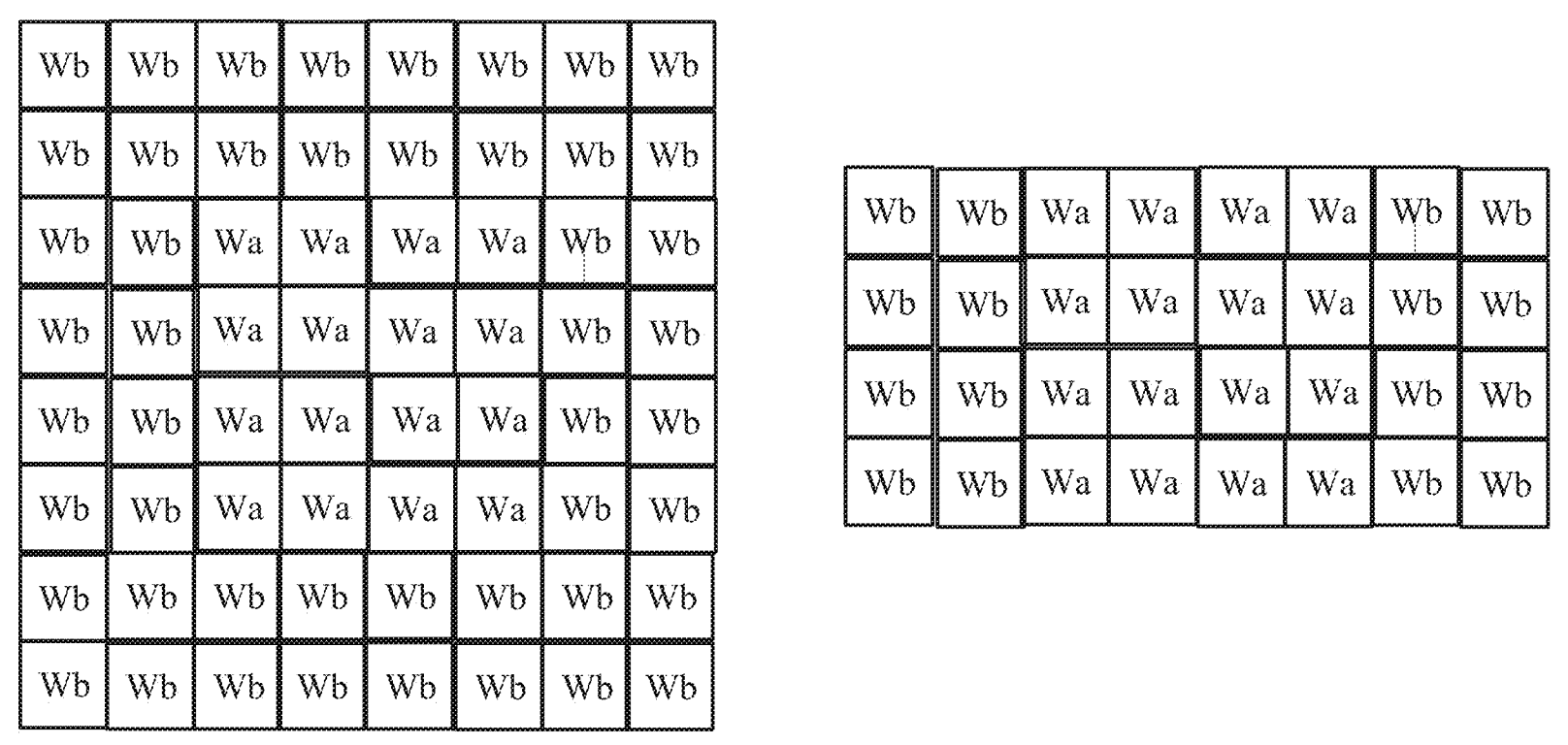
Figures 27C, 27D:
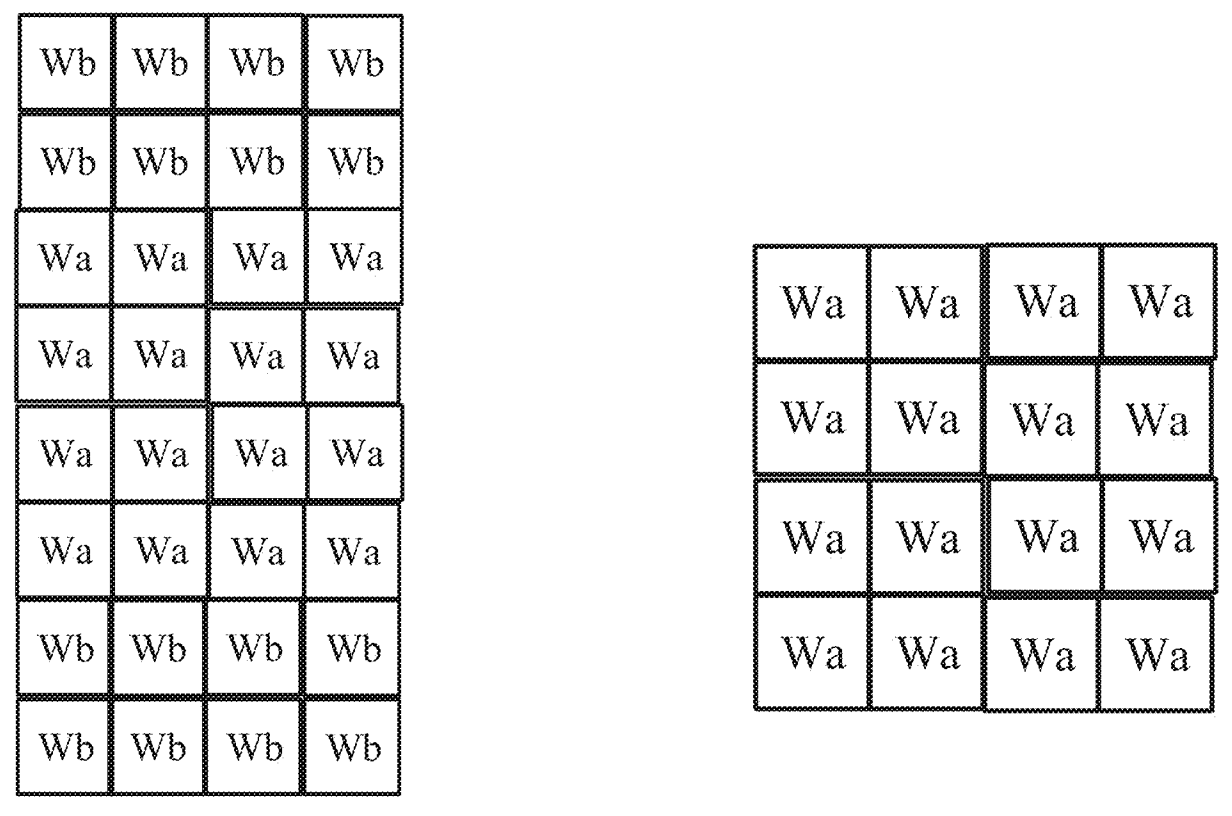

FIG. 27A shows an example of weighting values in a sub-block.

FIG. 27B shows another example of weighting values in a sub-block.

FIG. 27C shows another example of weighting values in a sub-block.

FIG. 27D shows yet another example of weighting values in a sub-block.

DETAILED DESCRIPTION

Figure 1:
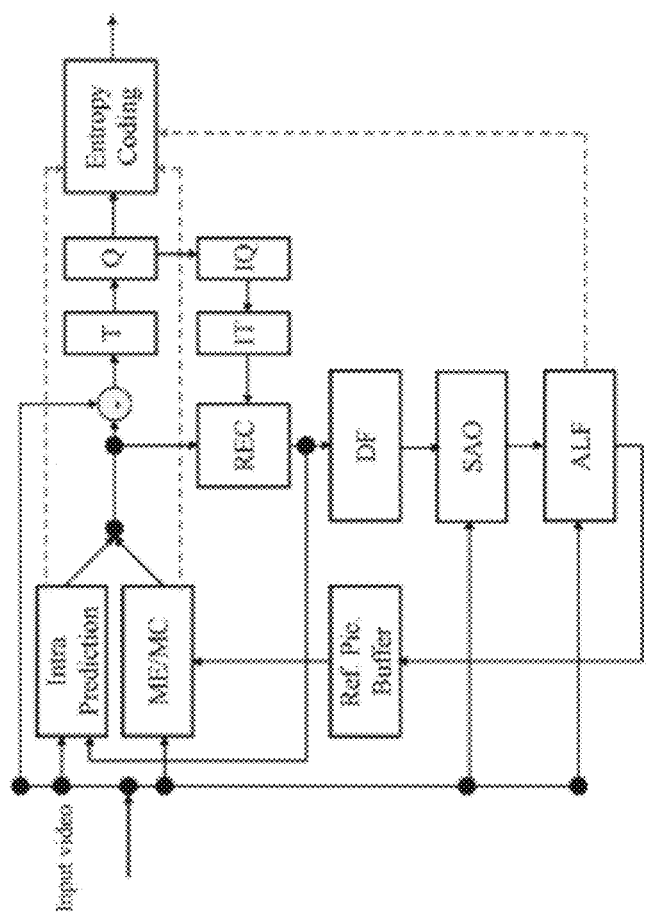
FIG. 1 shows an example of an encoder block diagram.

Section headings are used in the present document to facilitate ease of understanding and do not limit the embodiments disclosed in a section to only that section. Furthermore, while certain embodiments are described with reference to Versatile Video Coding (VVC) or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Overview

This patent document is related to video coding technologies. Specifically, it is related transform in video coding. It may be applied to the existing video coding standard like High Efficiency Video Coding (HEVC), or the standard (Versatile Video Coding) to be finalized. It may be also applicable to future video coding standards or video codec.

2. Initial Discussion

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 Format 4:4:4

Each of the three Y'CbCr components have the same sample rate, thus there is no chroma subsampling. This scheme is sometimes used in high-end film scanners and cinematic post production.

2.1.2 Format 4:2:2

The two chroma components are sampled at half the sample rate of luma: the horizontal chroma resolution is halved. This reduces the bandwidth of an uncompressed video signal by one-third with little to no visual difference 2.1.3 Format 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO), and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and DC modes remain the same. These denser directional intra prediction modes apply for all block sizes and for both luma and chroma intra predictions.

Figure 2:
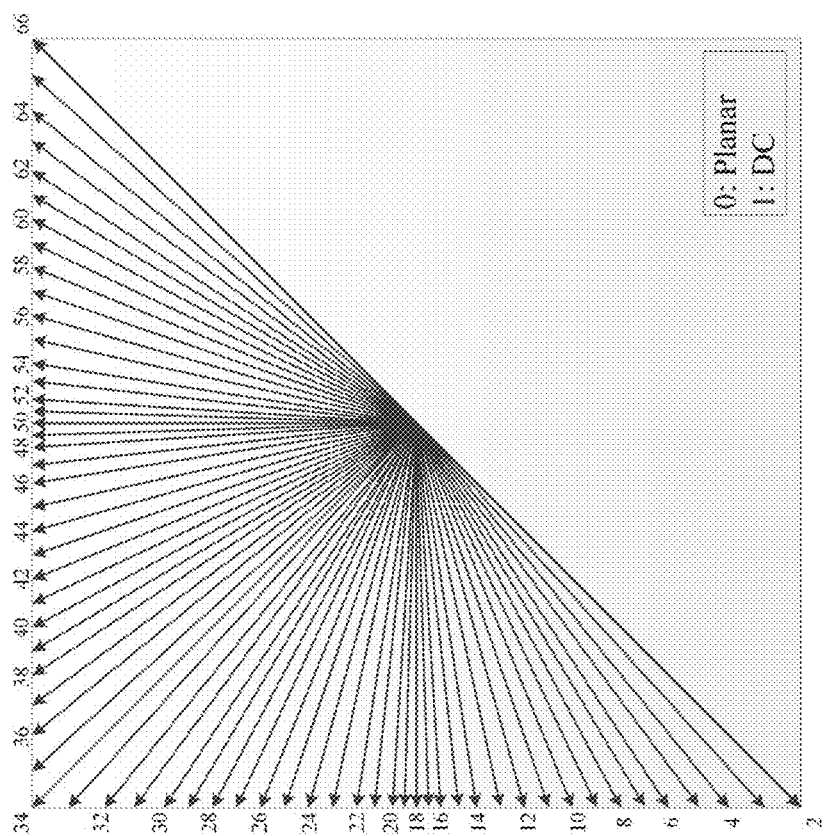
FIG. 2 shows an example of 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.4 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signalled using the original method and remapped to the indexes of wide angular modes after parsing. The total number of intra prediction modes for a certain block is unchanged, e.g., 67, and the intra mode coding is unchanged.

Figure 3A:
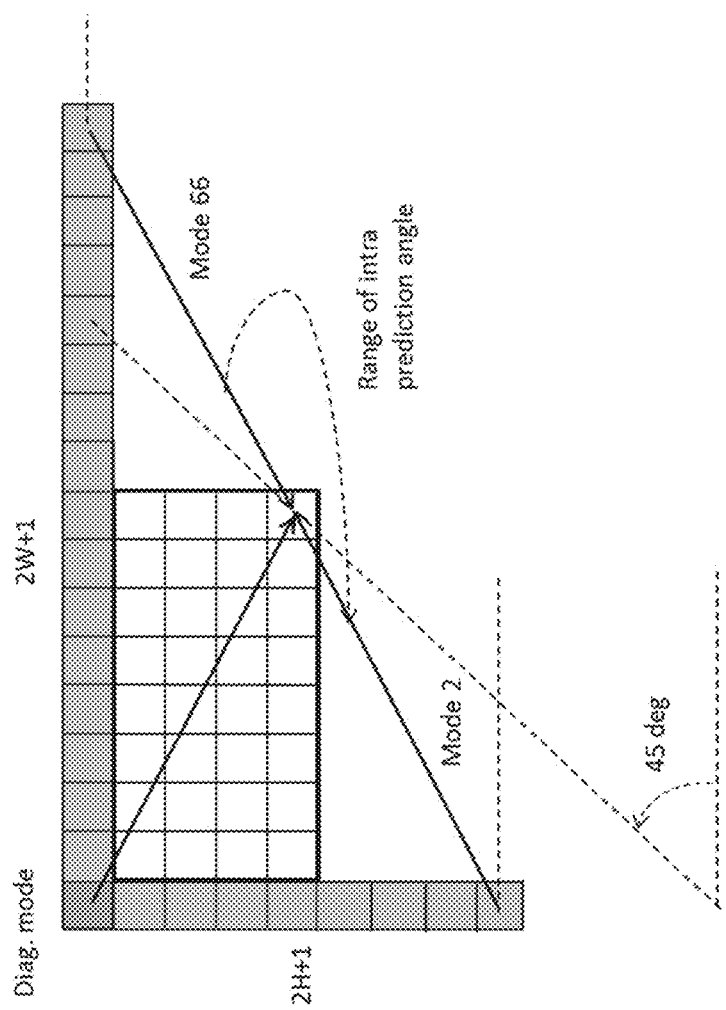
FIG. 3A shows an example of reference samples for wide-angular intra prediction
FIG. 3B show another example of reference samples for wide-angular intra prediction.
Figure 3B:
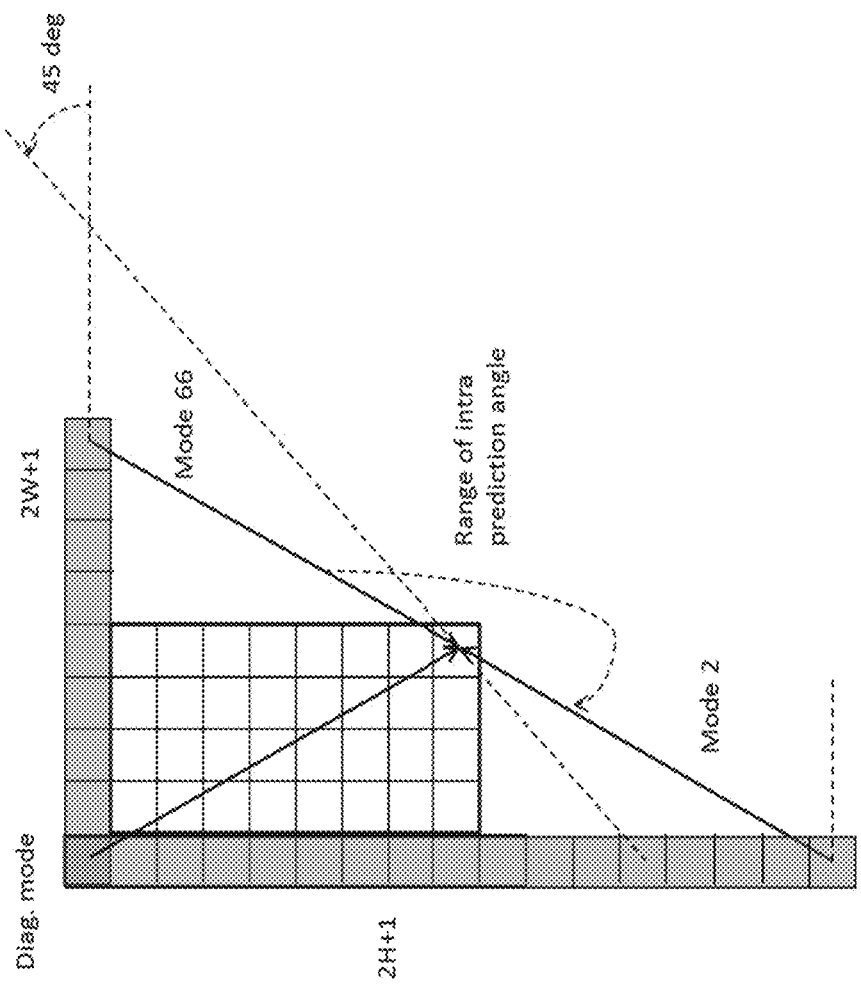

To support these prediction directions, the top reference with length 2 W+1, and the left reference with length 2H+1, are defined as shown in FIG. 3A-3B.

The mode number of replaced mode in wide-angular direction mode is dependent on the aspect ratio of a block. The replaced intra prediction modes are illustrated in Table 1.

TABLE 1

Intra prediction modes replaced by wide-angular modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 4:
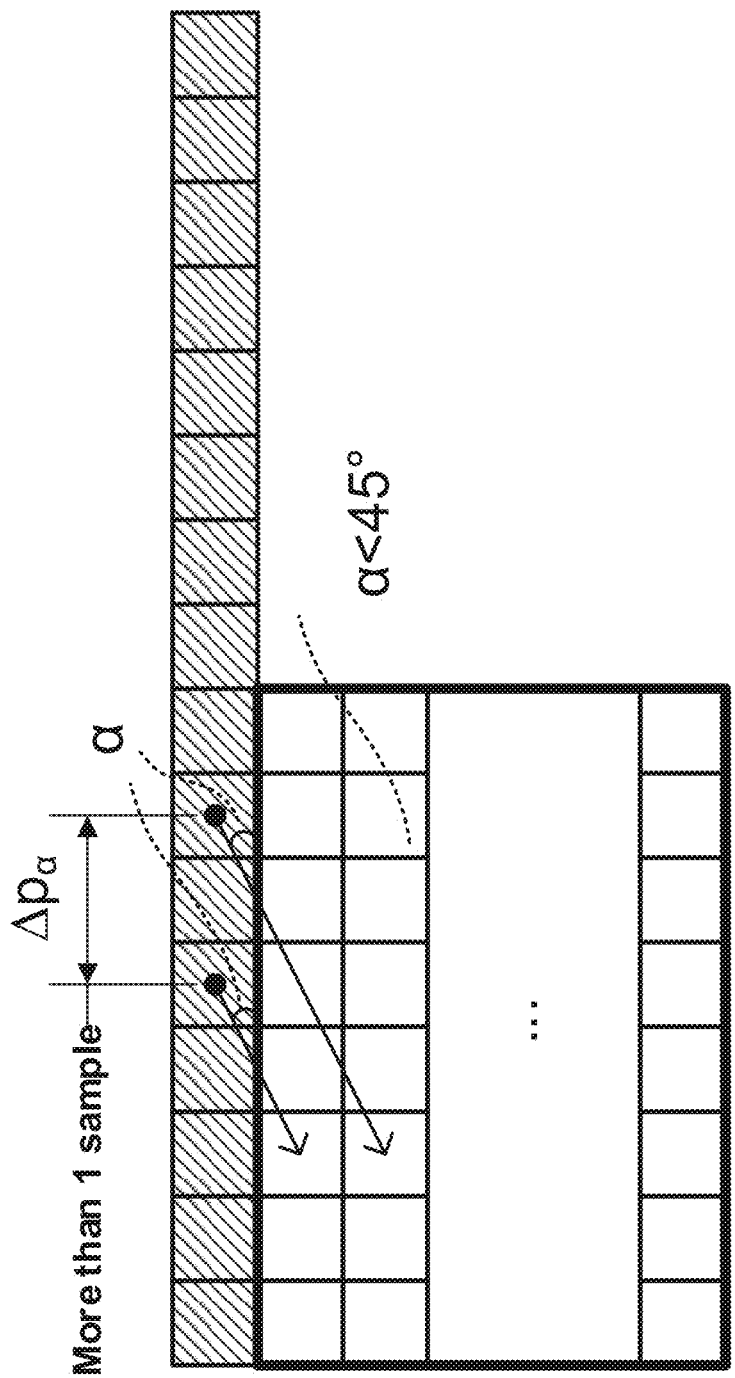
FIG. 4 is an example illustration of a problem of discontinuity in case of directions beyond 45 degrees.
Figure 5A:
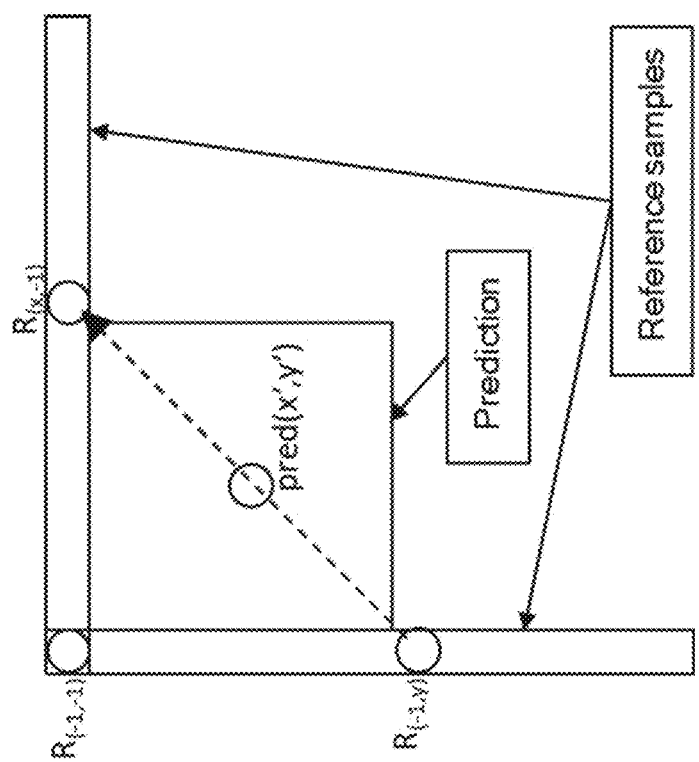
FIG. 5A shows an example illustration of samples used by PDPC applied to diagonal and adjacent angular intra modes.
Figure 5B:
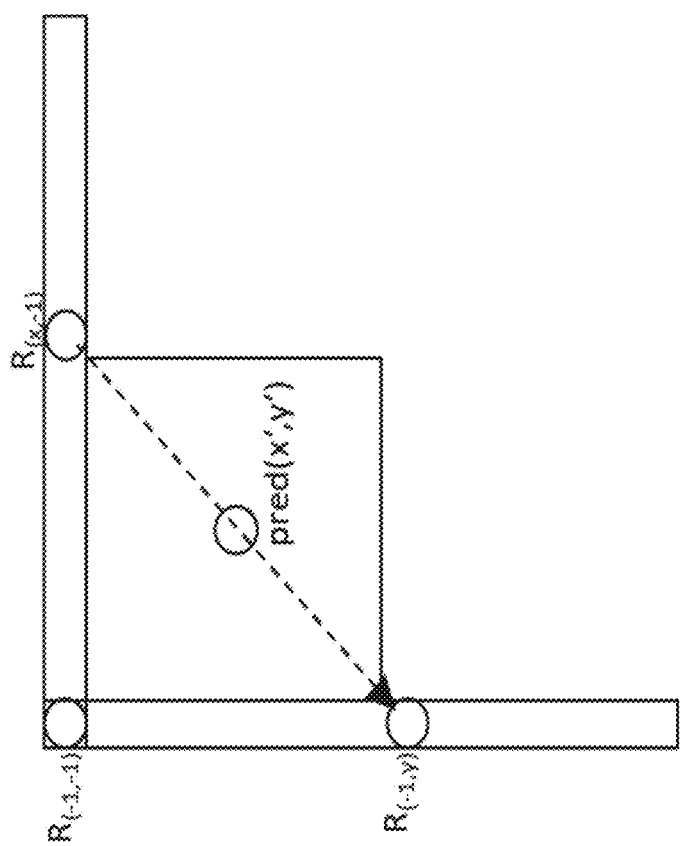
FIG. 5B shows another example illustration of samples used by PDPC applied to diagonal and adjacent angular intra modes.
Figure 5C:
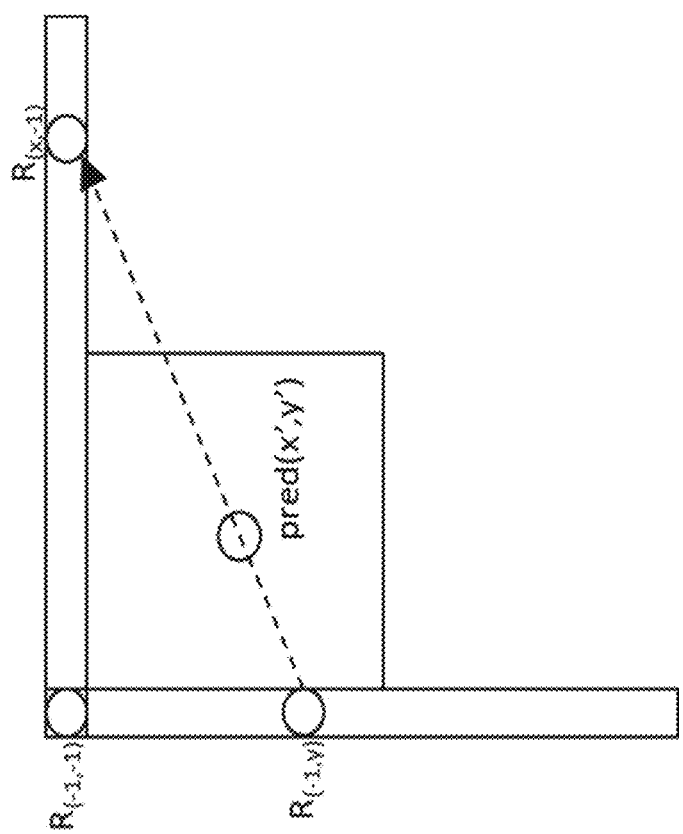
FIG. 5C shows another example illustration of samples used by PDPC applied to diagonal and adjacent angular intra modes.
Figure 5D:
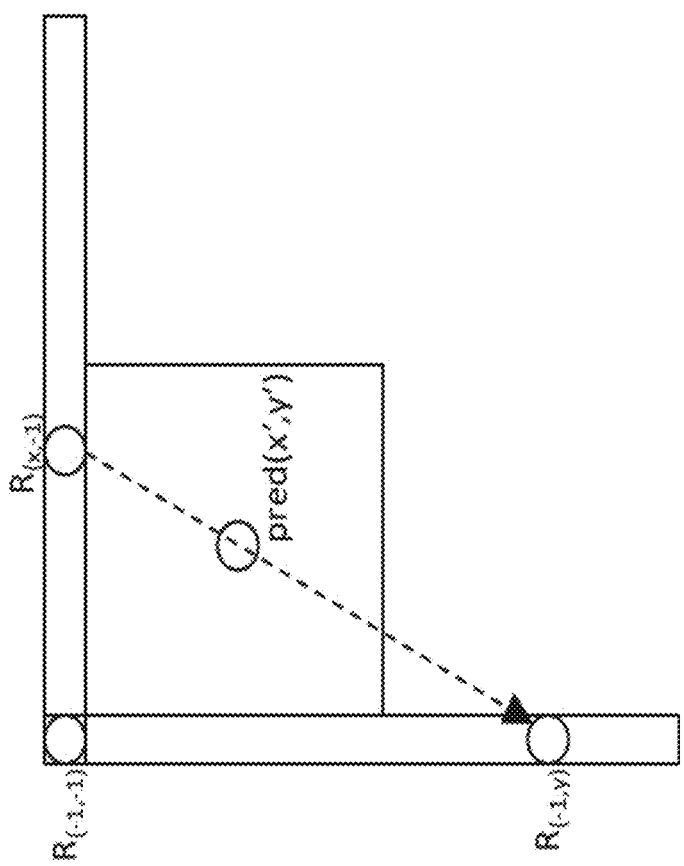
FIG. 5D shows yet another example illustration of samples used by PDPC applied to diagonal and adjacent angular intra modes.

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.5 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without Signalling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows: $pred(x,y)=(wL \times R_{-1,y}+wT \times R_{x,-1}-wTL \times R_{-1,-1}+(64-wL-wT+wTL) \times pred(x,y)+32)>>6$ where $R_{x,-1}$, $R_{-1,y}$ represent the reference samples located at the top and left of current sample (x,y), respectively, and $R_{-1,y}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIG. 5A-5D illustrates the definition of reference samples ($R_{x,-1}R_{-1,y}$ and $R_{-1,-1}$) for PDPC applied over various prediction modes. The prediction sample pred (x',y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

FIGS. 5A to 5D provide definition of samples used by PDPC applied to diagonal and adjacent angular intra modes.

The PDPC weights are dependent on prediction modes and are shown in Table 2.

TABLE 2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.6 Intra Subblock Partitioning (ISP)

Figure 6:
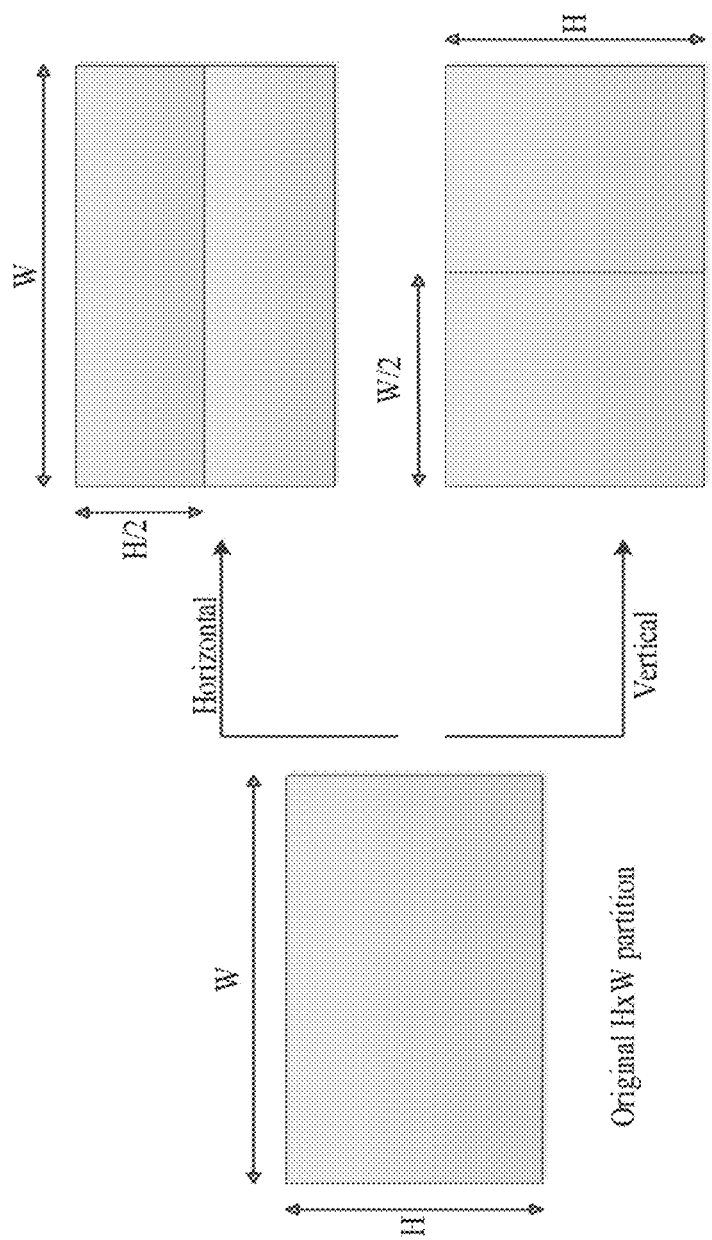
FIG. 6 is an example of division of 4×8 and 8×4 blocks.
Figure 7:
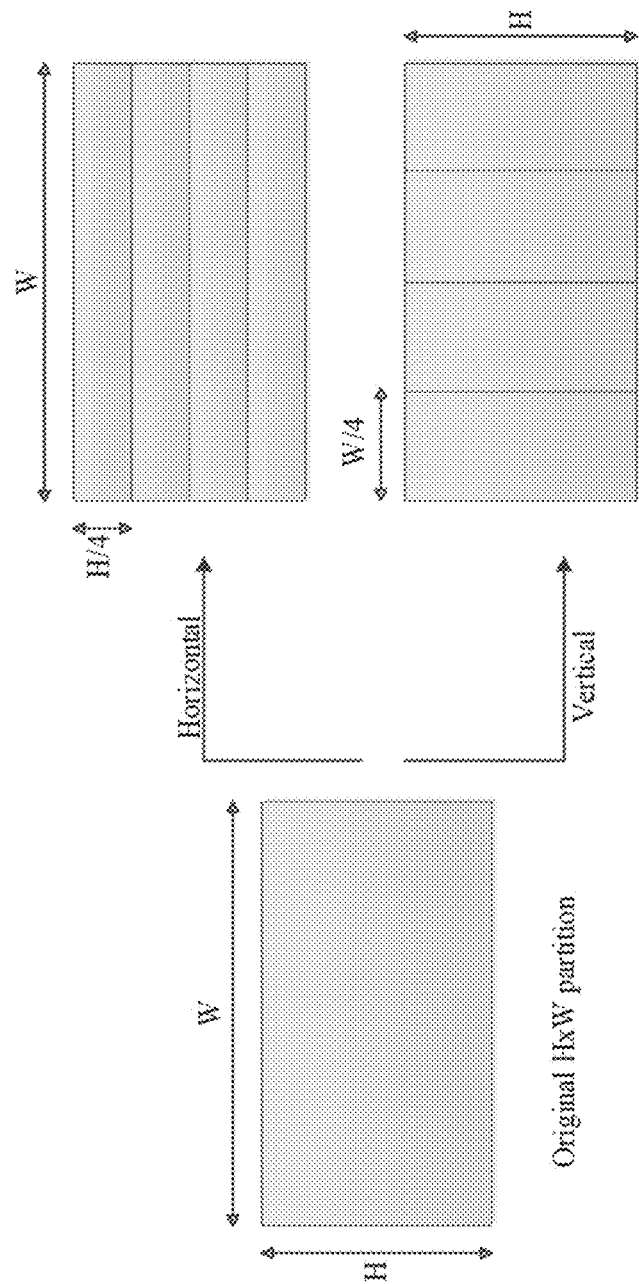
FIG. 7 is an example of division of all blocks except 4×8, 8×4 and 4×4.

In some embodiments, ISP is proposed to divide luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

TABLE 4

Worst case throughput for blocks of size 4 × N, N × 4

| Block size | 4 × 4 | 4 × 8, 8 × 4 | 4 × 16, 16 × 4 | 4 × 32, 32 × 4 |
|---|---|---|---|---|
| Cycles | 2 | 4 | 8 | 16 |
| Pixels | 16 | 32 | 64 | 128 |
| Throughput (pixels/cycle) | 8 | 8 | 8 | 8 |

FIG. 6 shows an example of division of 4×8 and 8×4 blocks.

FIG. 7 shows an example of division of all blocks except 4×8, 8×4 and 4×4.

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the coding unit (CU) and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Block Differential Pulse-Code Modulation Coding (BDPCM)

Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4×8 block predicted vertically.

Figure 8:
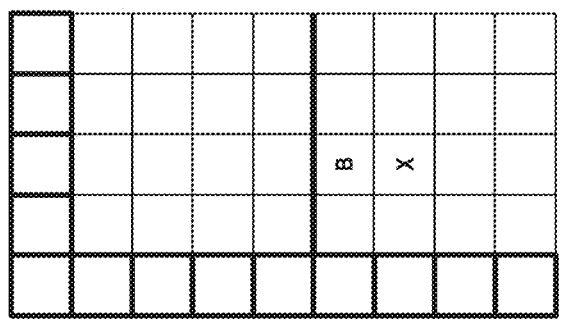
FIG. 8 is an example of dividing a block of 4×8 samples into two independently decodable areas.
Figure 8:
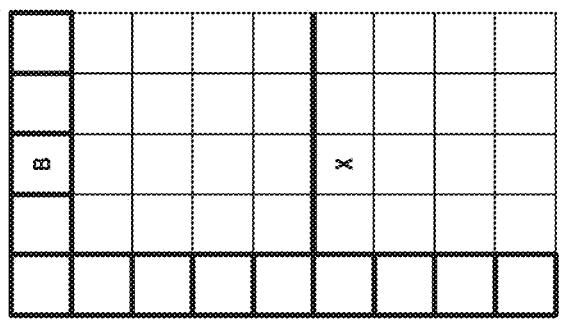
Figure 8:
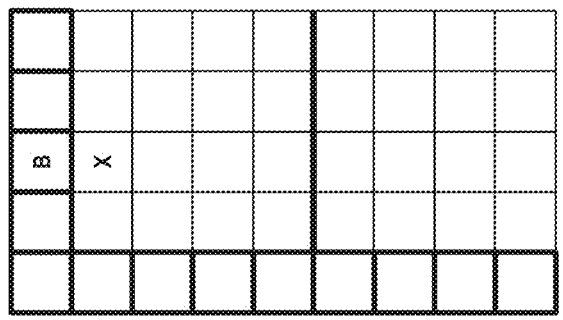

FIG. 8 shows an example of dividing a block of 4×8 samples into two independently decodable areas.

Figure 9:
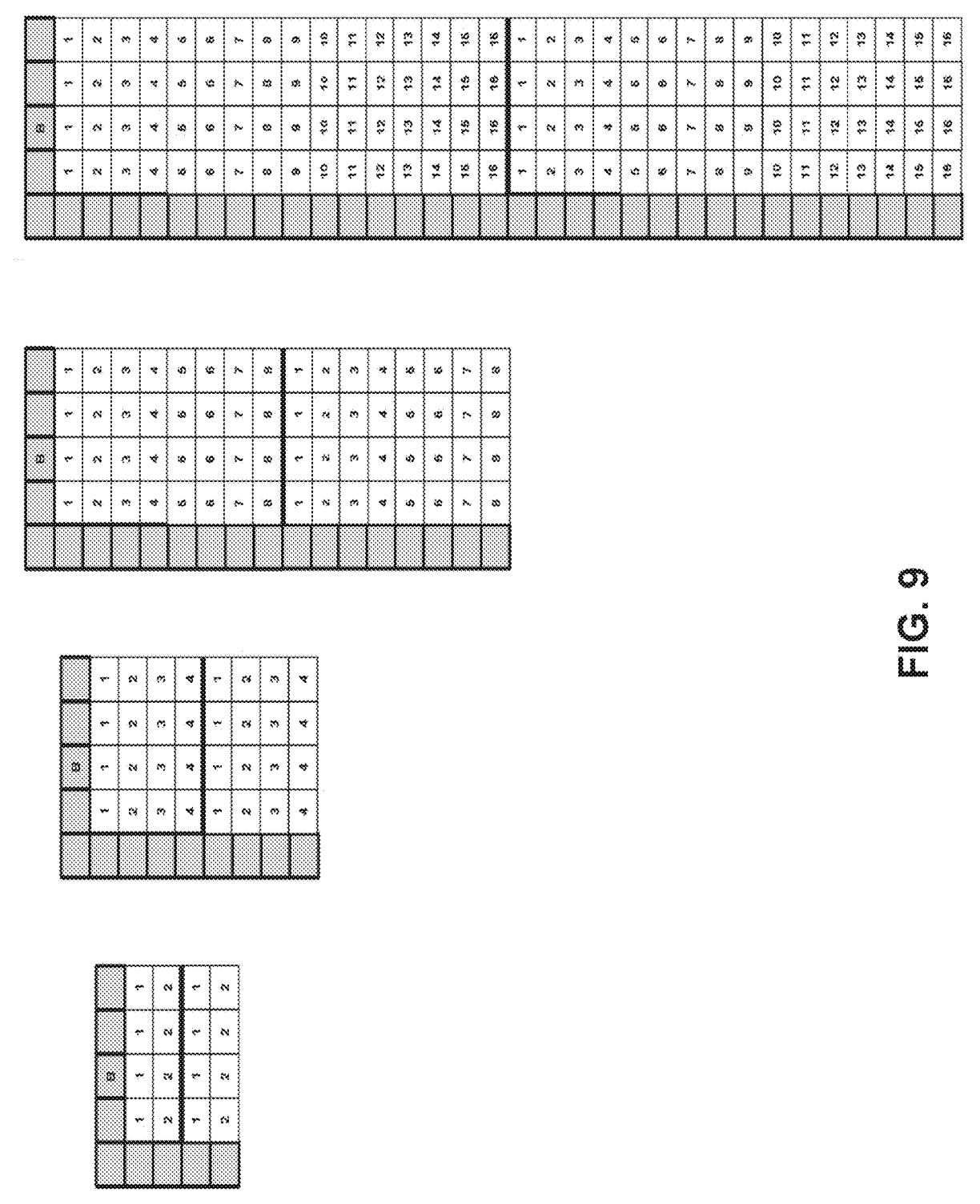

Thanks to this property, it becomes now possible to process a 4×4 block in 2 cycles, and a 4×8 or 8×4 block in 4 cycles, and so on, as shown on FIG. 9.

FIG. 9 shows an example of order of processing of the rows of pixels to maximize throughput for 4×N blocks with vertical predictor.

Table 4 summarizes the number of cycles required to process the block, depending on the block size. It is trivial to show that any block which has both dimensions larger or equal to 8 can be processed in 8 pixels per cycle or more.

2.8 Quantized Residual Domain BDPCM

In some embodiments, quantized residual domain BDPCM (denoted as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, 0 \leq i \leq (M-1), 0 \leq j \leq (N-1).$$

For horizontal case, $$Q(r_{i,j}) = \sum_{k=0}^{j} \tilde{r}_{i,k}, 0 \leq i \leq (M-1), 0 \leq j \leq (N-1).$$

The inverse quantized residuals, $Q^{-1}(Q(r_{i,j}))$, are added to the intra block prediction values to produce the reconstructed sample values.

The main benefit of this scheme is that the invert DPCM can be done on the fly during coefficient parsing simply adding the predictor as the coefficients are parsed or it can be performed after parsing.

Transform skip is always used in quantized residual domain BDPCM.

2.9 Multiple Transform Set (MTS) in VVC

In VVC Test Model 4 (VTM4), large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to discrete cosine transform (DCT)-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The table below shows the basis functions of the selected DST/DCT.

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at sequence parameter set (SPS) level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
Coded block flag (CBF) flag is equal to one If MTS CU flag is equal to zero, then DCT2 is applied in both directions. However, if MTS CU flag is equal to one, then two other flags are additionally signalled to indicate the transform type for the horizontal and vertical directions, respectively. Transform and Signalling mapping table as shown in Table 3-10. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signalled when the CU level MTS_CU flag is not equal to zero. The block size limitation for transform skip is the same to that for MTS in JEM4, which indicate that transform skip is applicable for a CU when both block width and height are equal to or less than 32.

2.10 Example Reduced Secondary Transform (RST)

2.10.1 Example Non-Separable Secondary Transform (NSST)

Figure 10:
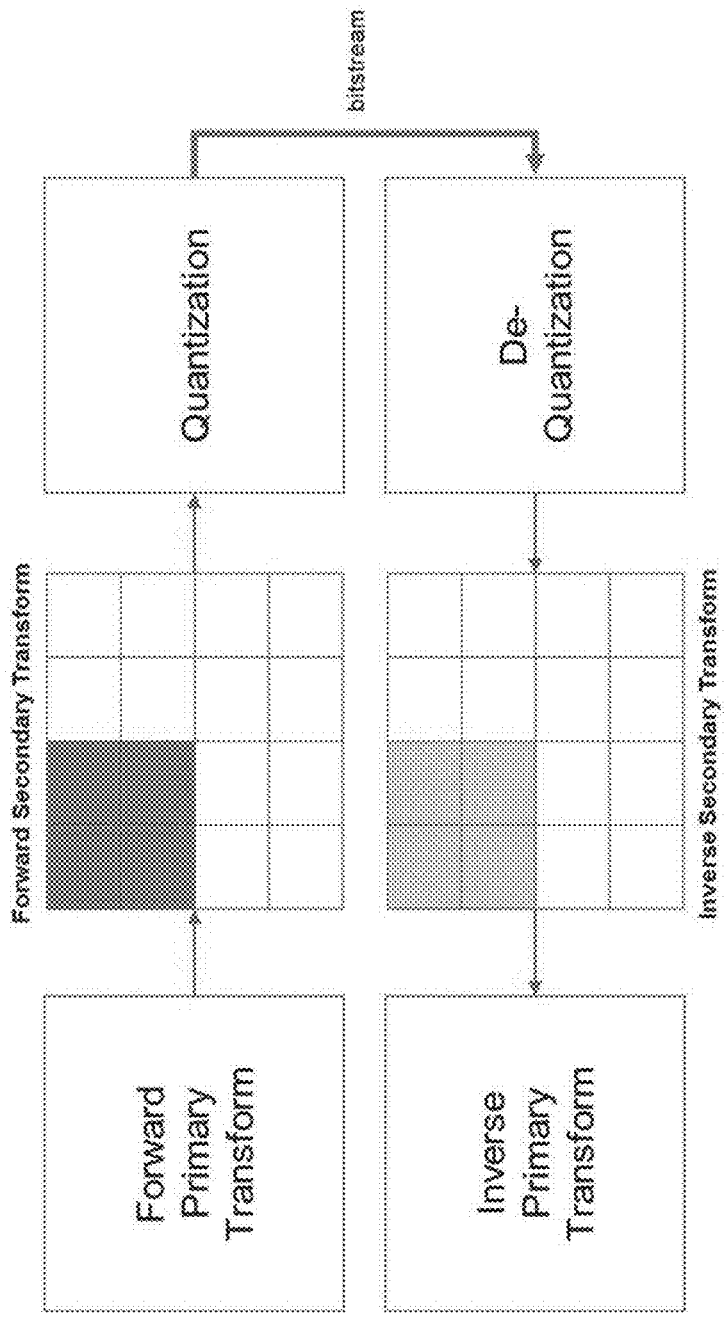
FIG. 10 shows an example of secondary transform.

In some embodiments, secondary transform, also referred to non-separable transform, is applied between forward primary transform and quantization (at encoder) and between de-quantization and invert primary transform (at decoder side). As shown in FIG. 10, a 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

FIG. 10 shows an example of secondary transform in JEM.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signalled secondary transform index. The index is signalled in a bit-stream once per Intra CU after transform coefficients.

2.10.2 Example Reduced Secondary Transform (RST)/Low Frequency Non-Separable Transform (LFNST)

Figure 11:
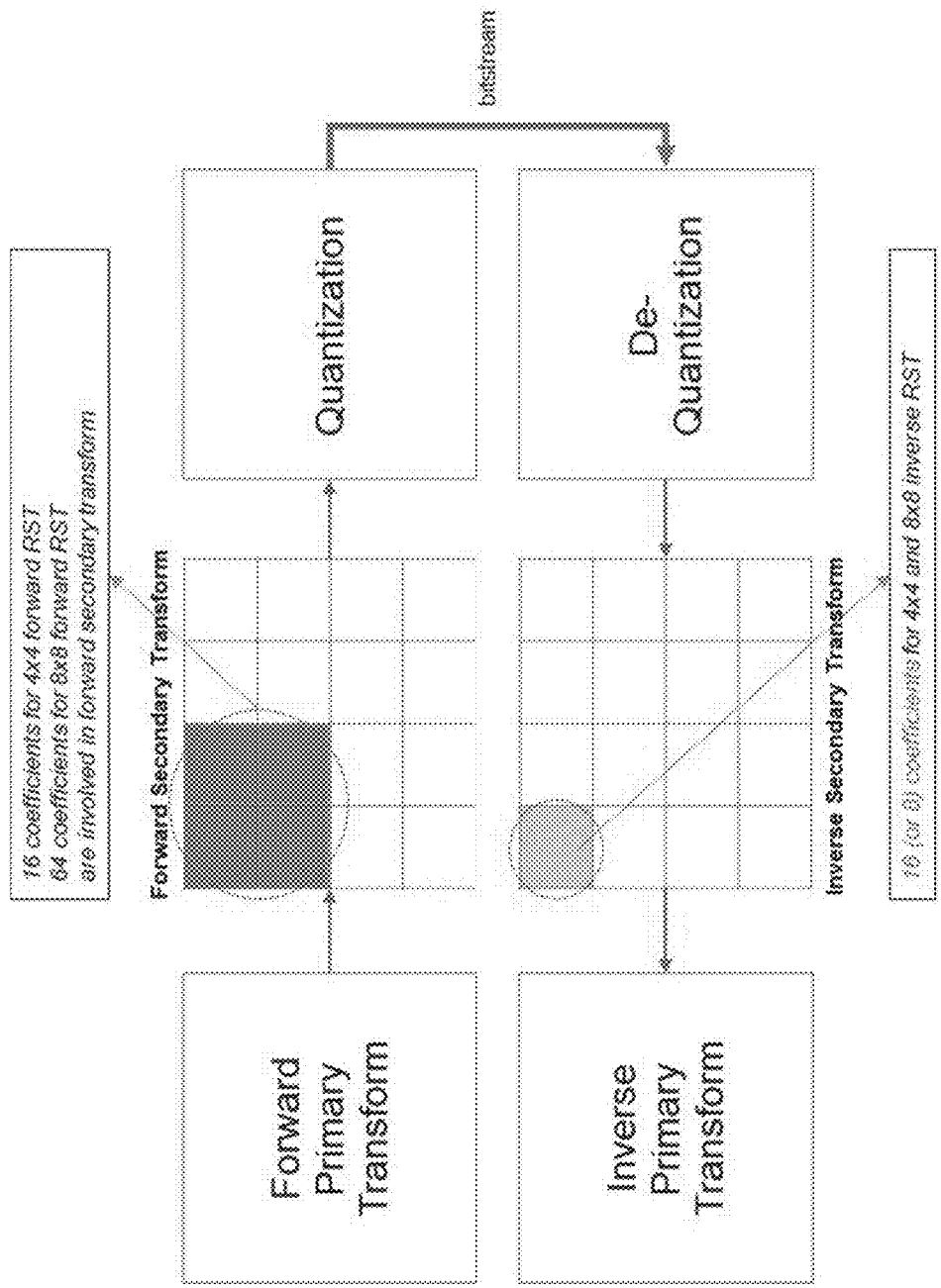
FIG. 11 shows an example of the proposed Reduced Secondary Transform (RST).

The Reduced Secondary Transform (RST), also referred to as Low Frequency Non-Separable Transform (LFNST), was introduced as 4 transform set (instead of 35 transform sets) mapping. In some embodiments, 16×64 (may further be reduced to 16×48) and 16×16 matrices are employed for 8×8 and 4×4 blocks, respectively. For notational convenience, the 16×64 (may further be reduced to 16×48) transform is denoted as RST8×8 and the 16×16 one as RST4×4. FIG. 11 shows an example of RST.

FIG. 11 shows an example of the proposed Reduced Secondary Transform (RST).

RST Computation

The main idea of a Reduced Transform (RT) is to map an N dimensional vector to an R dimensional vector in a different space, where R/N(R<N) is the reduction factor.

The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. Examples of the forward and inverse RT are depicted in FIG. 12.

Figure 12:
FIG. 12 show an example of a forward and invert (or inverse) Reduced Transform.

FIG. 12 show an example of a forward and invert Reduced Transform.

In some embodiments, the RST8×8 with a reduction factor of 4 (¼ size) is applied. Hence, instead of 64×64, which is conventional 8×8 non-separable transform matrix size, a 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:
  a. Block size is greater than or equal to the given threshold (W>=4 && H>=4)
  b. Transform skip mode flag is equal to zero If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signalled separately. For inter slice (the dual tree is disabled), a single RST index is signalled and used for both Luma and Chroma.

In some embodiments, Intra Sub-Partitions (ISP), as a new intra prediction mode, was adopted. When ISP mode is selected, RST is disabled and RST index is not signalled, because performance improvement was marginal even if RST is applied to every feasible partition block. Furthermore, disabling RST for ISP-predicted residual could reduce encoding complexity.

RST Selection

An RST matrix is chosen from four transform sets, each of which consists of two transforms. Which transform set is applied is determined from intra prediction mode as the following:

(1) If one of three cross-component linear model (CCLM) modes is indicated, transform set 0 is selected.

(2) Otherwise, transform set selection is performed according to the following table:

| The transform set selection table | |
|---|---|
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

RST Matrices of Reduced Dimension

Figure 13:
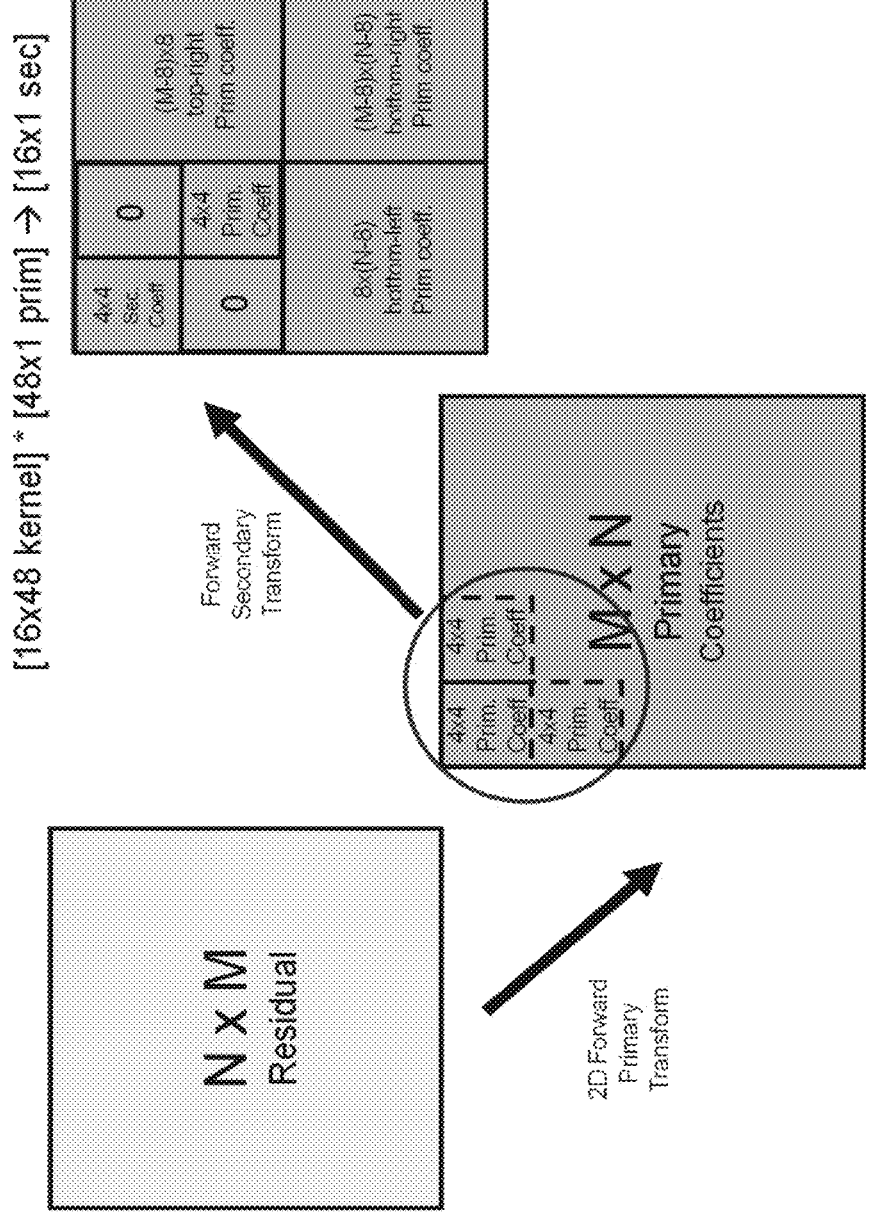
FIG. 13 shows an example of forward RST8×8 process with 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (FIG. 13).

FIG. 13 shows an example of forward RST8×8 process with 16×48 matrix.

RST Signalling

Figure 14:
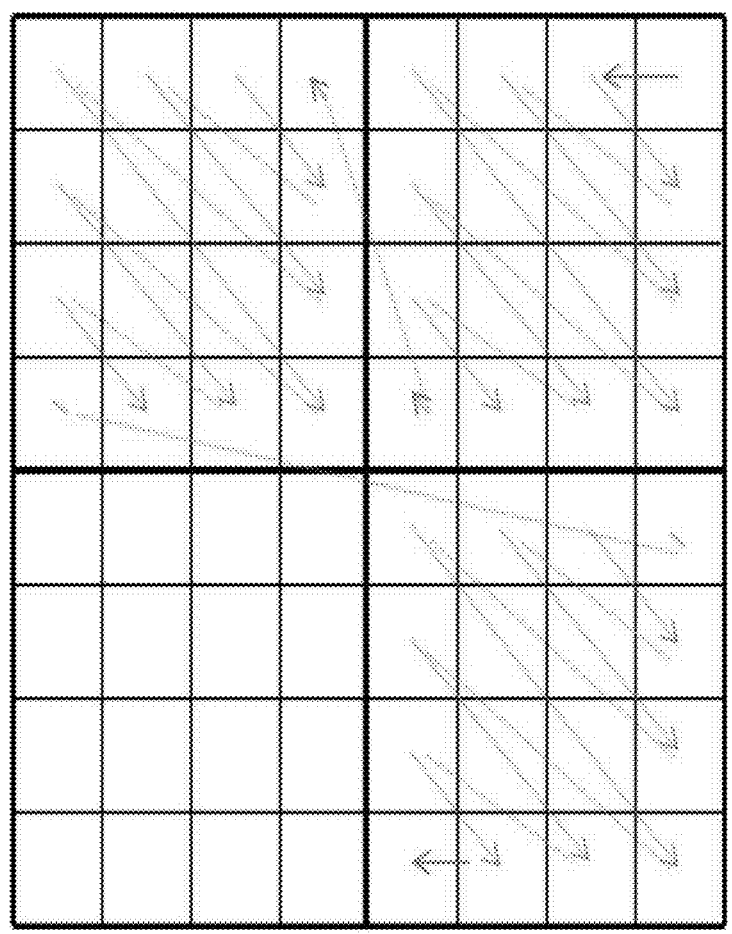
FIG. 14 shows an example of scanning the position 17 to 64 for non-zero element.

The forward RST8×8 with R=16 uses 16×64 matrices so that it produces non-zero coefficients only in the top-left 4×4 region within the given 8×8 region. In other words, if RST is applied then the 8×8 region except the top-left 4×4 region generates only zero coefficients. As a result, RST index is not coded when any non-zero element is detected within 8×8 block region other than top-left 4×4 (which is depicted in FIG. 14) because it implies that RST was not applied. In such a case, RST index is inferred to be zero.

FIG. 14 shows an example of scanning the position 17 to 64 for non-zero element.

Zero-Out Range

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a one-dimensional (1-D) array before the invert RST must be zero.

When nonZeroSize is equal to 16, there is no zero-out constraint on the coefficients in the top-left 4×4 sub-block.

In some embodiments, when the current block size is 4×4 or 8×8, nonZeroSize is set equal to 8. For other block dimensions, nonZeroSize is set equal to 16.

Example Description of RST

In the tables and description below, bold-faced italicized text is used to denote changes that can be made to current syntax to accommodate certain embodiments described in the present document.

Sentience parameter set RBSP syntax

|  | Descriptor |
|---|---|
| seq_parameter_set_rbsp( ) { | |
| ...... | |
|     sps_mts_enabled_flag | u(1) |
|     if( sps_mts_enabled_flag ) { | |

-continued

|  | Descriptor |
|---|---|
|         sps_explicit_mts_intra_enabled_flag | u(1) |
|         sps_explicit_mts_inter_enabled_flag | u(1) |
|     } | |
| ...... | |
| *sps_st_enabled_flag* | u(1) |
| ...... | |
| } | |

Residual Coding Syntax

|  | Descriptor |
|---|---|
| residual_coding( x0, y0, log2TbWidth, log2TbHeight, cIdx) { | |
| ... | |
|     if( coded_sub_block_flag[ xS ][yS ] && ( n > 0 \|\| !inferSbDcSigCoeffFlag ) && ( xC != LastSignificantCoeffX \|\| yC != LastSignificantCoeffY ) ) { | |
|         sig_coeff_flag[ xC ][ yC ] | ae(v) |
|         remBinsPass1-- | |
|         if( sig_coeff_flag[ xC ][ yC ] ) | |
|             inferSbDcSigCoeffFlag = 0 | |
|     } | |
|     if( sig_coeff_flag[ xC ] [ yC ]) { | |
| ***    if( !transform_skip_flag[ x0 ][ y0 ] ) {*** | |
| ***        numSigCoeff++*** | |
| ***        if( ( ( ( log2TbWidth == 2 && log2TbHeight == 2 ) \|\| ( log2TbWidth == 3 && log2TbHeight == 3 ) ) && n >= 8 && i == 0 ) \|\| ( ( log2TbWidth >= 3 && log2TbHeight >= 3 && ( i == 1 \|\| i == 2 ) ) ) ) {*** | |
| ***            numZeroOutSigCoeff++*** | |
| ***        }*** | |
| ***    }*** | |
| ***    abs_level_gt1_flag[ n ]*** | *ae(v)* |
| ... | |

Coding Unit Syntax

|  | Descriptor |
|---|---|
| coding_unit( x0, y0, cbWidth, cbHeight, treeType ) { | |
| ... | |
|     if( !pcm_flag[ x0 ][ y0 ] ) { | |
|         if( CuPredMode[ x0 ][ y0 ] != MODE_INTRA && merge_flag [ x0 ][ y0 ] = = 0 ) | |
|             cu_cbf | ae(v) |
|         if( cu_cbf ) { | |
|             if( CuPredMode[ x0 ][ y0 ] = = MODE_INTER && sps_sbt_enabled_flag && !ciip_flag[ x0 ][ y0 ] ) { | |
|                 if( cbWidth <= MaxSbtSize && cbHeight <= MaxSbtSize ) { | |
|                     allowSbtVerH = cbWidth >= 8 | |
|                     allowSbtVerQ = cbWidth >= 16 | |
|                     allowSbtHorH = cbHeight >= 8 | |
|                     allowSbtHorQ = cbHeight >= 16 | |
|                     if( allowSbtVerH \|\| allowSbtHorH \|\| allowSbtVerQ \|\| allowSbtHorQ ) | |
|                         cu_sbt_flag | ae(v) |
|                 } | |
|                 if( cu_sbt_flag ) { | |
|                     if( ( allowSbtVerH \|\| allowSbtHorH ) && ( allowSbtVerQ \|\| allowSbtHorQ) ) | |
|                         cu_sbt_quad_flag | ae(v) |
|                     if( (cu_sbt_quad_flag && allowSbtVerQ && allowSbtHorQ ) \|\| ( !cu_sbt_quad_flag && allowSbtVerH && allowSbtHorH) ) | |
|                         cu_sbt_horizontal_flag | ae(v) |

-continued

| | Descriptor |
|---|---|
|                 cu_sbt_pos_flag<br>            }<br>        }<br>   numZeroOutSigCoeff = 0<br>            transform_tree( x0, y0, cbWidth, cbHeight, treeType )<br>        if( Min( cbWidth, cbHeight ) >= 4 && sps_st_enabled_flag == 1 &&<br>CuPredMode[ x0 ][ y0 ] == MODE_INTRA<br>&& IntraSubPartitionsSplitType == ISP_NO_SPLIT ) {<br>            if( ( numSigCoeff > ( ( treeType == SINGLE_TREE ) ? 2 : 1 ) ) &&<br>numZeroOutSigCoeff == 0 ) {<br>                st_idx[ x0 ][ y0 ]<br>            }<br>        }<br>            }<br>            }<br>} | ae(v)<br><br><br><br><br><br><br><br><br>ae(v) |

Sequence Parameter Set RBSP Semantics
*sps_st_enabled_flag* equal to 1 specifies that *st_idx* may be present in the residual coding syntax for intra coding units. *sps_st_enabled_flag* equal to 0 specifies that *st_idx* is not present in the residual coding syntax for intra coding units.
Coding Unit Semantics *st_idx[ x0 ][ y0 ]* specifies which secondary transform kernel is applied between two candidate kernels in a selected transform set. *st_idx[ x0 ][ y0 ]* equal to 0 specifies that the secondary transform is not applied. The array indices x0, y0 specify the location ( x0, y0 ) of the top-left sample of the considered transform block relative to the top-left sample of the picture. When *st_idx[ x0 ][ y0 ]* is not present, *st_idx[ x0 ][ y0 ]* is inferred to be equal to 0.

Transformation process for scaled transform coefficients
General
Inputs to this Process are:—
- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0..nTbW−1, y=0..nTbH−1. Output of this process is the (nTbW)×(nTbH) array r[x][y] of residual samples with x=0..nTbW−1, y=0..nTbH−1.

If *st_idx[ xTbY ][ yTbY ]* is not equal to 0, the following applies: 1. The variables nStSize, log2StSize, numStX, numStY, and nonZeroSize are derived as follows: If both nTbW and nTbH are greater than or equal to 8, log2StSize is set to 3 and nStOutSize is set to 48. Otherwise, log2StSize is set to 2 and nStOutSize is set to 16. nStSize is set to ( 1 << log2StSize ). If nTbH is equal to 4 and nTbW is greater than 8, numStX set equal to 2. Otherwise, numStX set equal to 1. If nTbW is equal to 4 and nTbH is greater than 8, numStY set equal to 2. Otherwise, numSt Y set equal to 1. If both nTbW and nTbH are equal to 4 or both nTbW and nTbH are equal to 8, non ZeroSize is equal to 8. Otherwise, nonZero Size set equal to 16.

2. For xSbIdx = 0..numStX − 1 and ySbIdx = 0..numStY − 1, the following applies: The variable array u[x] with x = 0..nonZeroSize − 1 are derived as follows:
xC = (xSbIdx << log2StSize) + DiagScanOrder[log2StSize][ log2StSize][x][0]
yC = ( ySbIdx << log2StSize ) + DiagScanOrder[ log2StSize ][ log2StSize ][ x ][ 1 ]
u[ x ] = d[ xC ][ yC ] u[ x ] with x = 0..nonZeroSize − 1 is transformed to the variable array v[ x ] with x = 0..nStOutSize −1 by invoking the one-dimensional transformation process as specified in clause 8.7.4.4 with the transform input length of the scaled transform coefficients nonZeroSize, the transform output length nStOutSize the list u[ x ] with x = 0..nonZeroSize − 1, the index for transform set selection stPredModeIntra, and the index for transform selection in a transform set st_idx[ xTbY ][ yTbY ] as inputs, and the output is the list v[ x ] with x = 0..nStOutSize − 1. The variable stPred ModeIntra is set to the predMode set to the predMode Intra specified in clause 8.4.4.2.1. The array d[ ( xSbIdx << log2StSize ) + x ][ ( ySbIdx << log2StSize ) + y ] with x = 0..nStSize − 1, y = 0..nStSize − 1 are derived as follows: If stPredModeIntra is less than or equal to 34, or equal to INTRA_LT_CCLM, INTRA_T_CCLM, or INTRA_L_CCLM, the following applies: d[ ( xSbIdx << log2StSize ) + x ][ ( ySbIdx << log2 StSize ) + y ] = ( y < 4 ) ? v[ x + ( y << log2StSize ) ] : ( ( x < 4 ) ? v[ 32 + x + ( ( y − 4 ) << 2 ) ] : d[ ( xSbIdx << log2StSize ) + x ][ ( ySbIdx << log2StSize ) + y ] ) Otherwise, the following applies: d[ ( xSbIdx << log2StSize ) + x ][ ( ySbIdx << log2StSize ) + y ] = ( y < 4 ) ? v[ y + ( x << log2StSize ) ] : ( ( x < 4 ) ? v[ 32 + ( y − 4 ) + ( x << 2 ) ] : d[ ( xSbIdx << log2StSize ) + x ][ ( ySbIdx << log 2StSize ) + y ] )

Secondary Transformation Process
Inputs to this process are: a variable nTrS specifying the transform output length, a variable nonZeroSize specifying the transform input length, a list of transform input x[ j ] with j = 0..non ZeroSize - 1, *a variable stPredMode
Intra specifying the index for transform set selection,
a variable stIdx specifying the index for transform
selection in a set. Output of this process
is the list of transformed samples y[ i ] with i
= 0..nTrS - 1. The transformation matrix derivation
process as specified in clause 8.7.4.5
is involved with the transform output length nTrS, the
index for transform set selection stPred
ModeIntra, and the index for transform selection in a
transform set stIdx as inputs, and the
transformation matrix secTransMatrix as output.
The list of transformed samples y[ i ] with i
= 0..nTrS - 1 is derived as follows:*

$y[i]$ = Clip3( CoeffMin, CoeffMax, $((\Sigma_{j=0}^{nonZeroSize-1}$
*secTransMatrix[j][i] * x[j]) + 64) >> 7 ) with i = 0..nTrS
- 1 CoeffMin = -(1<<15) and CoeffMin = (1<<15)-1;*
Secondary Transformation Matrix Derivation Process
*Inputs to this process are: a variable nTrS specifying
the transform output length, a variable stPredMode
Intra specifying the index for transform set selection,
a variable stIdx specifying the index
for transform selection in the designated transform set.
Output of this process is the transformation
matrix secTransMatrix. The variable stTrSetIdx is
derived as follows:*

| stPredModeIntra | stTrSetIdx |
| --- | --- |
| stPredModeIntra < 0 | 1 |
| 0 <= stPredModeIntra <= 1 | 0 |
| 2 <= stPredModeIntra <= 12 | 1 |
| 13 <= stPredModeIntra <= 23 | 2 |
| 24 <= stPredModeIntra <= 44 | 3 |
| 45 <= stPredModeIntra <= 55 | 2 |
| 56 <= stPredModeIntra | 1 |

*The transformation matrix secTransMatrix
is derived based on nTrS, stTrSetIdx,
and stIdx as follows: If nTrS is equal to 16,
stTrSetIdx is equal to 0, and stIdx is equal to 1,
the following applies: secTransMatrix [ m ][ n ] =...
If nTrS is equal to 16, stTrSetIdx is equal to 0,
and stIdx is equal to 2, the following applies:
secTransMatrix [ m ][ n ] =... If n TrS is equal to 16,
stTrSetIdx is equal to 1, and stIdx is equal to 1,
the following applies: secTransMatrix [ m ][ n ] =...
If nTrS is equal to 16, stTrSetIdx is equal to 1,
and stIdx is equal to 2, the following applies:
stTrSetIdx is equal to 1, and stIdx is equal to 2,
the following applies: secTransMatrix [ m ][ n ] =...
If nTrS is equal to 16, stTrSetIdx is equal to 2,
and stIdx is equal to 1, the following applies:
secTransMatric [ m ][ n ] =... If nTrS is equal to 16,
stTrSetIdx is equal to 2, and stIdx is equal to 2,
the following applies: secTransMatric [ m ][ n ] =...
If nTrS is equal to 16, stTrSetIdx is equal to 3,
and stIdx is equal to 1, the following applies:
secTransMatric [ m ][ n ] =... If nTrS is equal to 16,
stTrSetIdx is equal to 3, and stIdx is equal to 2,
the following applies: secTransMatrix [ m ][ n ] =...
If nTrS is equal to 48, stTrSetIdx is equal to 0,
and stIdx is equal to 1 the following applies:
secTransMatrix [ m ][ n ] =... If nTrS is equal to 48,
stTrSetIdx is equal to 0, and stIdx is equal to 2
the following applies: secTransMatrix [ m ][ n ] =...
If nTrS is equal to 48, stTrSetIdx is equal to 1,
and stIdx is equal to 1 the following applies:
secTransMatrix [ m ][ n ] =... If nTrS is equal to 48,
stTrSetIdx is equal to 1, and stIdx is equal to 2
the following applies: secTransMatrix [ m ][ n ] =...
If nTrS is equal to 48, stTrSetIdx is equal to 2,
and stIdx is equal to 1 the following applies:
secTransMatrix [ m ][ n ] =... If nTrS is equal to 48,
stTrSetIdx is equal to 2, and stIdx is equal to 2
the following applies: secTransMatrix [ m ][ n ] =...
If nTrS is equal to 48, stTrSetIdx is equal to 3,
and stIdx is equal to 1 the following applies:
secTransMatrix [ m ][ n ] =... If nTrS is equal to 48,
stTrSetIdx is equal to 3, and stIdx is equal to 2
the following applies: secTransMatrix [ m ][ n ] =...*

2.11 Clipping of Dequantization in HEVC

In HEVC, the scaled transform coefficient d' is calculated as d'=Clip3(coeffMin, coeffMax, d), where d is the scaled transform coefficient before clipping.

For luma component, coeffMin=CoeffMinY; coeffMax=CoeffMaxY. For chroma components, coeffMin=CoeffMinC; coeffMax=CoeffMaxC; where CoeffMinY=-(1<<(extended_precision_
  processing_flag? Max(15,BitDepthY+6):15))

CoeffMinC=-(1<<(extended_precision_
  processing_flag? Max(15,BitDepthC+6):15))

CoeffMaxY=(1<<(extended_precision_
  processing_flag? Max(15,BitDepthY+6):15))-1

CoeffMaxC=(1<<(extended_precision_
  processing_flag? Max(15,BitDepthC+6):15))-1 extended_precision_processing_flag is a syntax element signalled in SPS.

2.12 Affine Linear Weighted Intra Prediction (ALWIP, a.k.a. Matrix-Based Intra Prediction, MIP)

In some embodiments, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.13 Sub-Block Transform

For an inter-predicted CU with cu_cbf equal to 1, cu_sbt_flag may be signalled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 15. For example, the horizontal and vertical transforms for SBT-V position 0 is DCT-8 and DST-7, respectively. When one side of the residual transform unit (TU) is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

Figure 15:
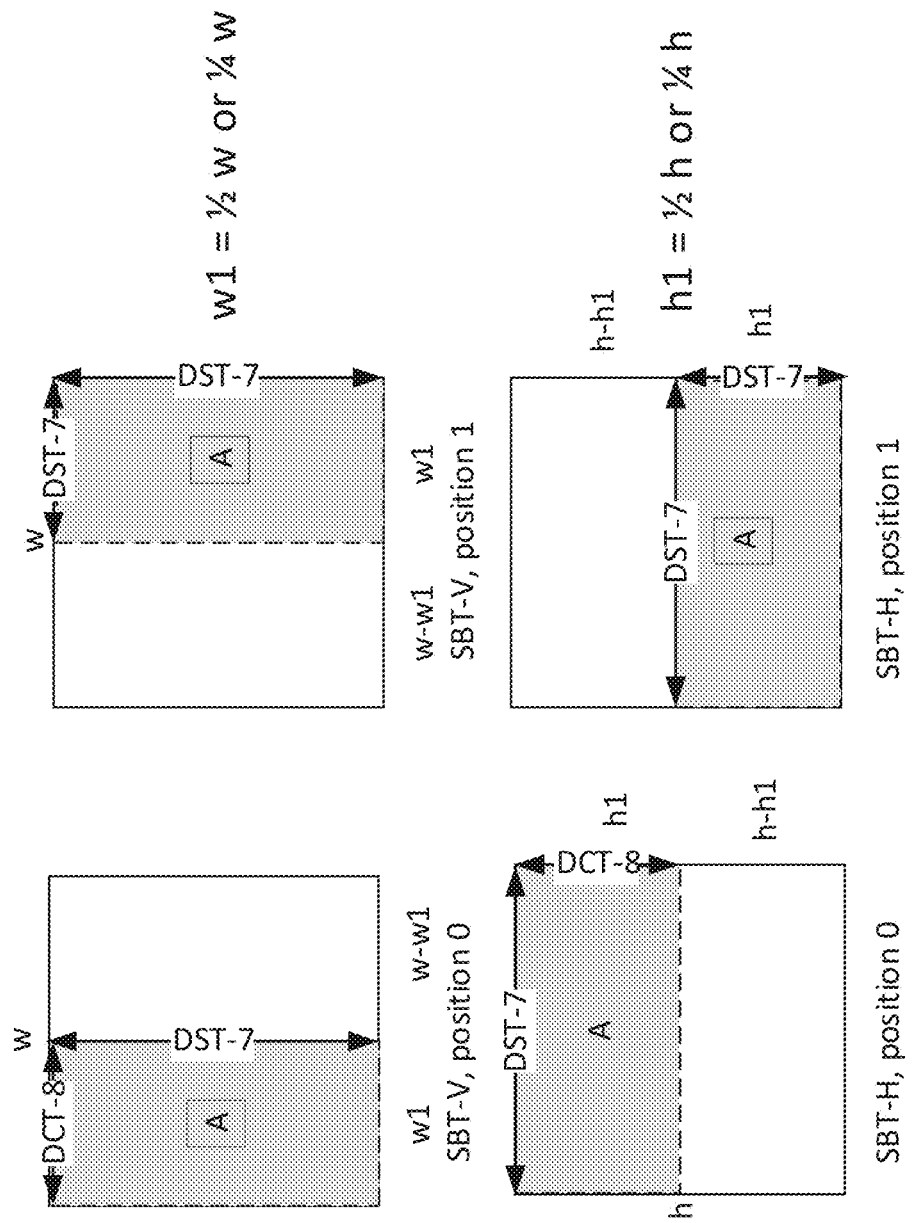
FIG. 15 is an illustration of sub-block transform modes SBT-V and SBT-H.

FIG. 15 is an illustration of sub-block transform modes SBT-V and SBT-H.

2.14 Separable Secondary Transform in AVS

In some embodiments, a 4×4 Separable Secondary Transform (SST) is applied on all luma block coded with the intra mode after the primary transform if the primary transform is DCT2.

When SST is applied on a block at encoder, the top-left 4×4 sub-block of the transformed block after the primary transform (denoted as L) is further transformed as L'=T'×L×T, wherein T is the secondary transform matrix.

Then L' is quantized together with other parts of the transformed block.

When SST is applied on a block at decoder, the top-left 4×4 sub-block of the transformed block after the de-quantization (denoted as M) is further inversed-transformed as $$M' = S' \times M \times S,$$

wherein S is the inversed secondary transform matrix.
Specifically, S'=T.

Then M' together with other parts of the transformed block is put as the input of the primary inversed transform.

2.15 Scan-Region Based Coefficient Coding (SRCC)

Figure 18B:
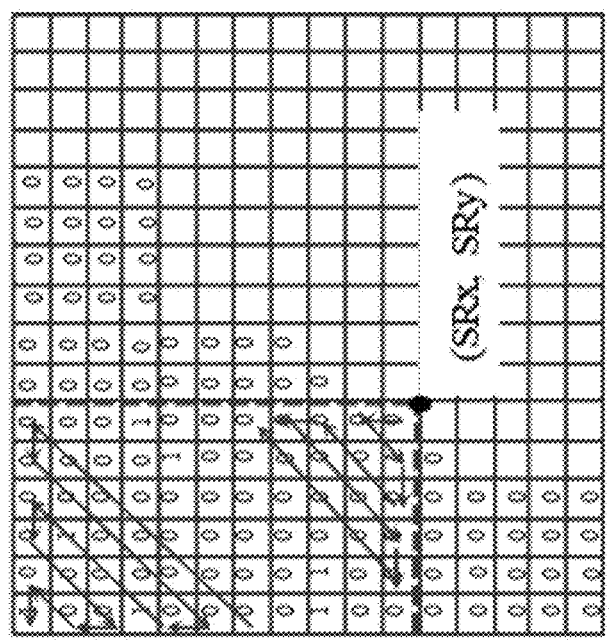
FIG. 18B illustrates another example of scan-region based coefficient coding.
Figure 18A:
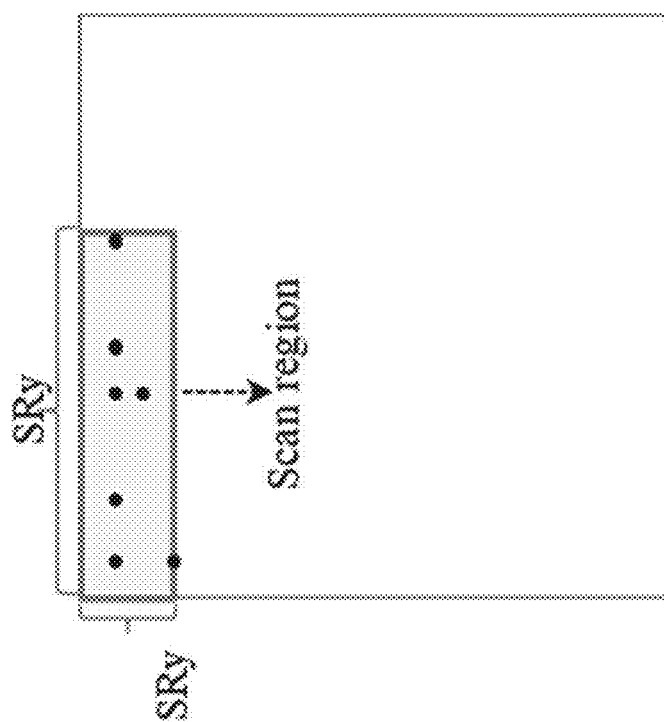
FIG. 18A illustrates an example of scan-region based coefficient coding.

SRCC has been adopted into AVS-3. With SRCC, a bottom-right position (SRx, SRy) as shown in FIGS. 18A-18B signalled, and only coefficients inside a rectangle (e.g., scan region) with four corners (0, 0), (SRx, 0), (0, SRy), (SRx, SRy) are scanned and signalled. All coefficients out of the rectangle are zero.

2.16 Affine Prediction

Figure 20:
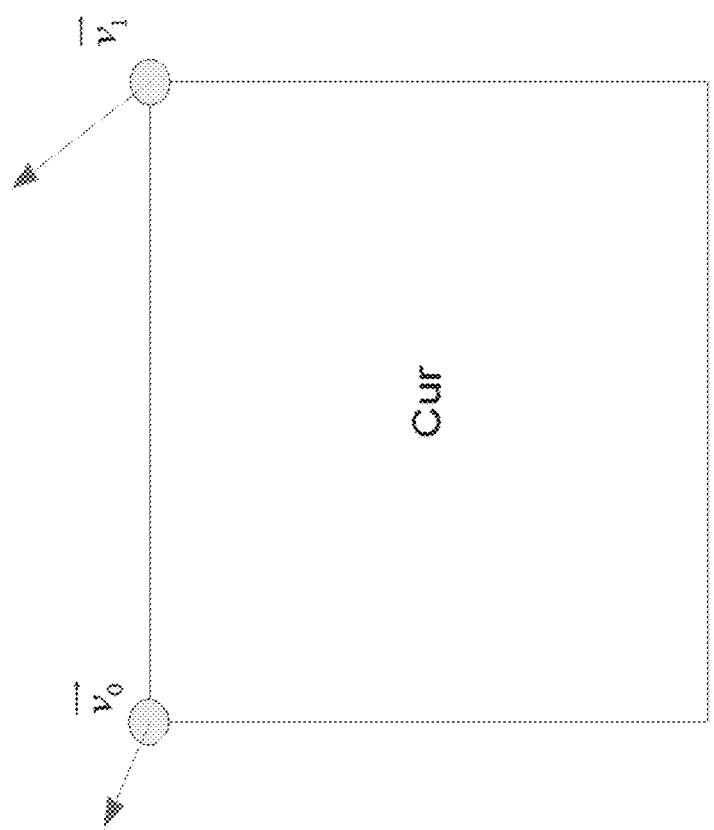
FIG. 20 shows an example of simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 20, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where (v0x, v0y) is motion vector of the top-left corner control point, and (v1x, v1y) is motion vector of the top-right corner control point.

In order to further simplify the motion compensation prediction, sub-block based affine transform prediction is applied. The sub-block size M×N is derived as in Eq. (2), where MvPre is the motion vector fraction accuracy (1/16 in JEM), (v2x, v2y) is motion vector of the bottom-left control point, calculated according to Equation 1.

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad (2)$$

After derived by Eq. (2), M and N should be adjusted downward if necessary to make it a divisor of w and h, respectively.

Figure 21:
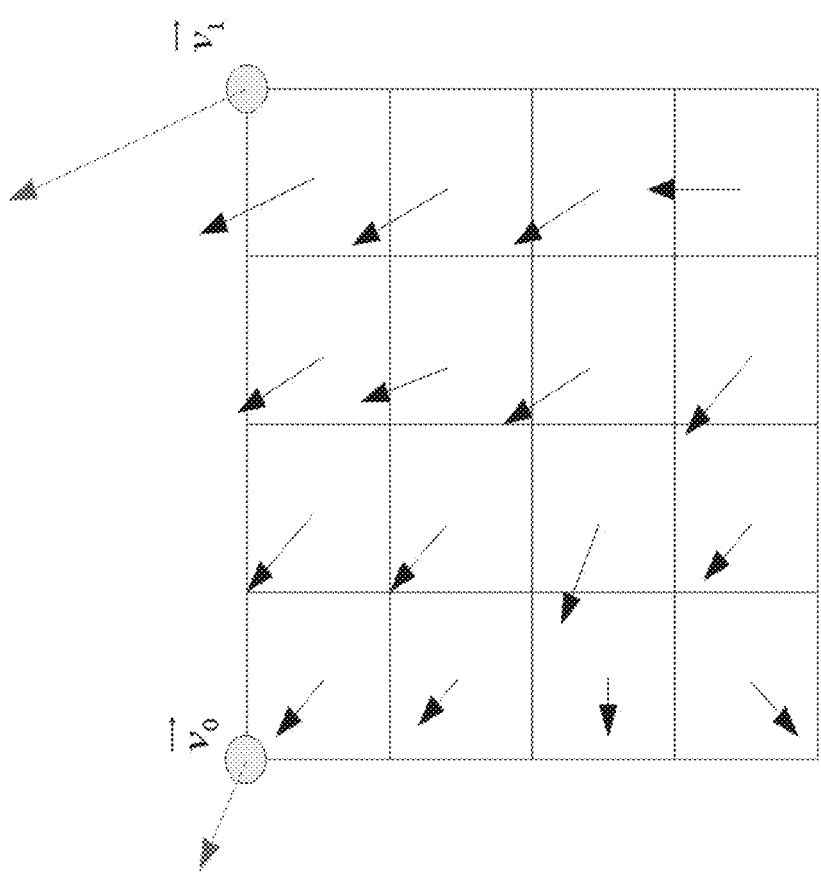
FIG. 21 shows an example of affine motion vector (MV) per sub-block.

To derive motion vector of each M×N sub-block, the motion vector of the center sample of each sub-block, as shown in FIG. 21, is calculated according to Eq. (1), and rounded to 1/16 fraction accuracy. Then the motion compensation interpolation filters are applied to generate the prediction of each sub-block with derived motion vector.

After MCP, the high accuracy motion vector of each sub-block is rounded and saved as the same accuracy as the normal motion vector.

Figure 22:
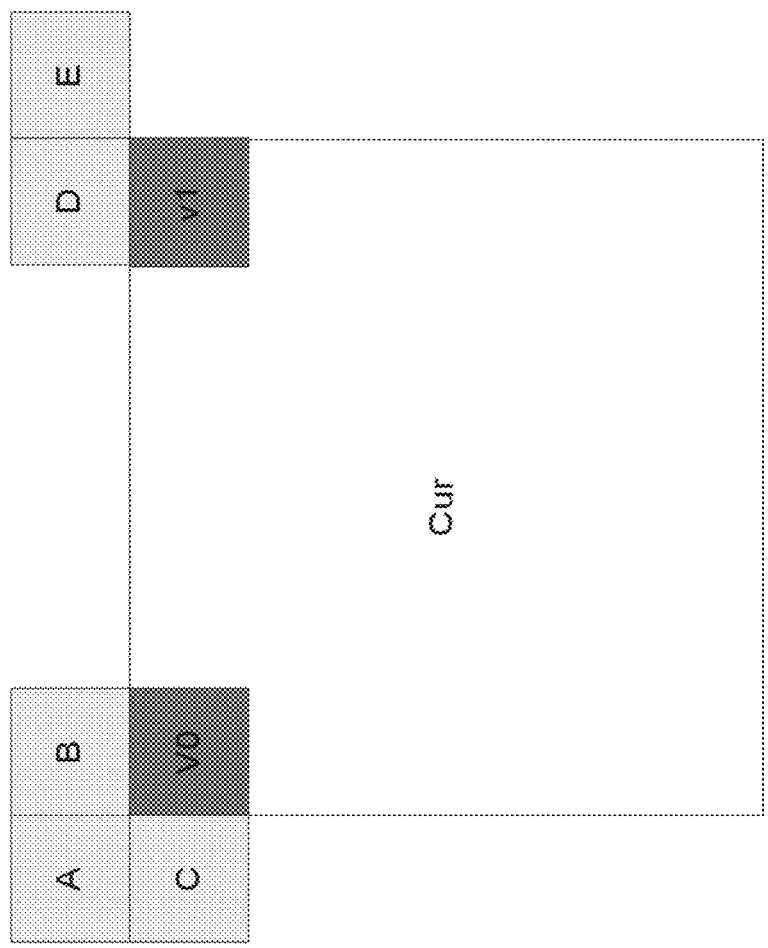
FIG. 22 shows an example of motion vector prediction (MVP) for affine motion mode AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair {(v₀, v₁)|v₀={v_A, v_B, v_C}, v₁={v_D,v_E}} is constructed using the neighbor blocks. As shown in FIG. 22, v₀ is selected from the motion vectors of the block A, B or C. The motion vector from the neighbor block is scaled according to the reference list and the relationship among the picture order count (POC) of the reference for the neighbor block, the POC of the reference for the current CU and the POC of the current CU. And the approach to select v₁ from the neighbor block D and E is similar. If the number of candidate list is smaller than 2, the list is padded by the motion vector pair composed by duplicating each of the AMVP candidates. When the candidate list is larger than 2, the candidates are firstly sorted according to the consistency of the neighboring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 23B:
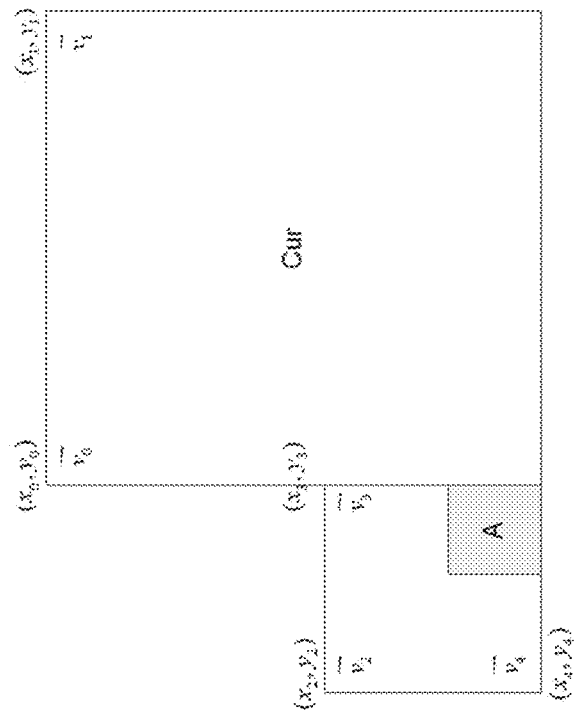
FIG. 23B shows another example of candidates for AF_MERGE.
Figure 23A:
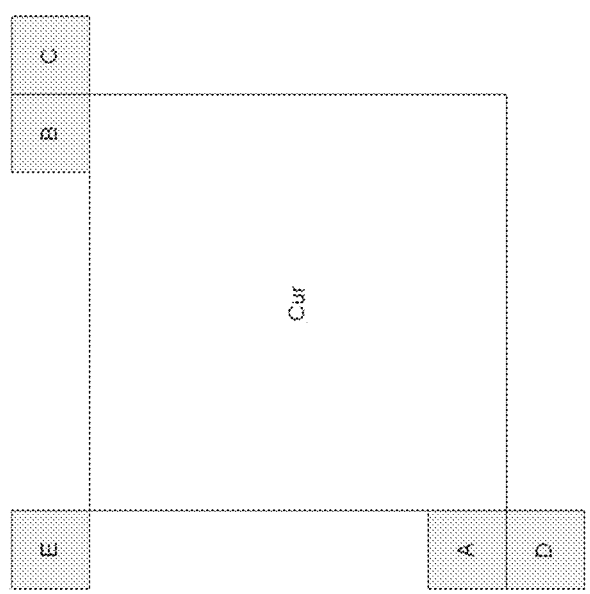
FIG. 23A shows an example of candidates for affine motion mode AF_MERGE.

When a CU is applied in AF_MERGE mode, it gets the first block coded with affine mode from the valid neighbor reconstructed blocks. And the selection order for the candidate block is from left, above, above right, left bottom to above left as shown in FIG. 23A. If the neighbor left bottom block A is coded in affine mode as shown in FIG. 23B, the motion vectors v₂, v₃ and v₄ of the top left corner, above right corner and left bottom corner of the CU which contains the block A are derived. And the motion vector v₀, of the top left corner on the current CU is calculated according to v₂, v₃ and v₄. Secondly, the motion vector v₁ of the above right of the current CU is calculated.

After the CPMV of the current CU v₀, and v₁ are derived, according to the simplified affine motion model Eq (1), the MVF of the current CU is generated. In order to identify whether the current CU is coded with AF_MERGE mode, an affine flag is signalled in the bitstream when there is at least one neighbor block is coded in affine mode.

2.17 Interweaved Prediction

To address the dilemma of Affine Motion Compensation (AMC), interweaved prediction is proposed to achieve a finer granularity of MVs without increasing the complexity too much.

Figure 24B:
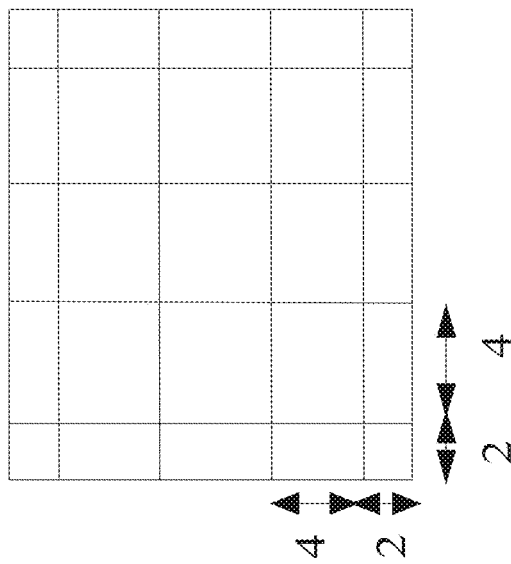
FIG. 24B shows an example of a block divided by 4×4 sub-blocks with an offset.
Figure 24A:
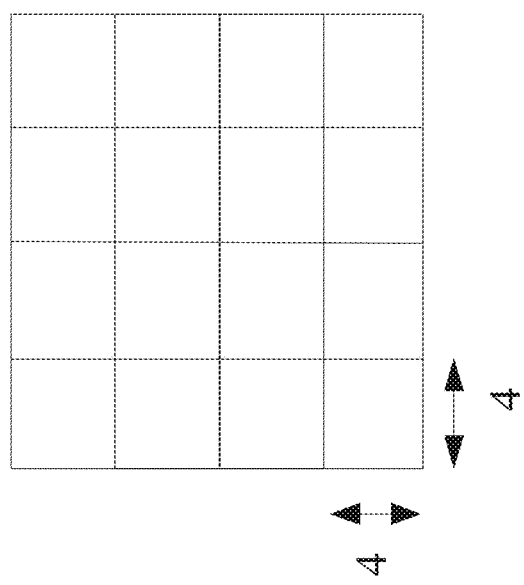
FIG. 24A shows an example of a block divided by 4×4 sub-blocks.

First, a coding block is divided into sub-blocks with two different dividing patterns. The first dividing pattern is the same as that in BMS-1.1 as shown in FIG. 24A, while the second dividing pattern also divides the coding-block into 4×4 sub-blocks but with a 2×2 offset as shown in FIG. 24B.

Second, two auxiliary predictions are generated by AMC with the two dividing patterns. The MV for each sub-block in a dividing pattern is derived from mv0 and mv1 by eq. (1).

The final prediction is calculated as a weighted-sum of the two auxiliary predictions, formulated as:

$$\begin{cases} P = (P_0 + P_1) >> 1, \text{ if } \omega_0 = \omega_1 \\ P = (\omega_0 P_0 + \omega_1 P_1) >> 2 \text{ Otherwise} \end{cases} \quad (2)$$

Figure 25:
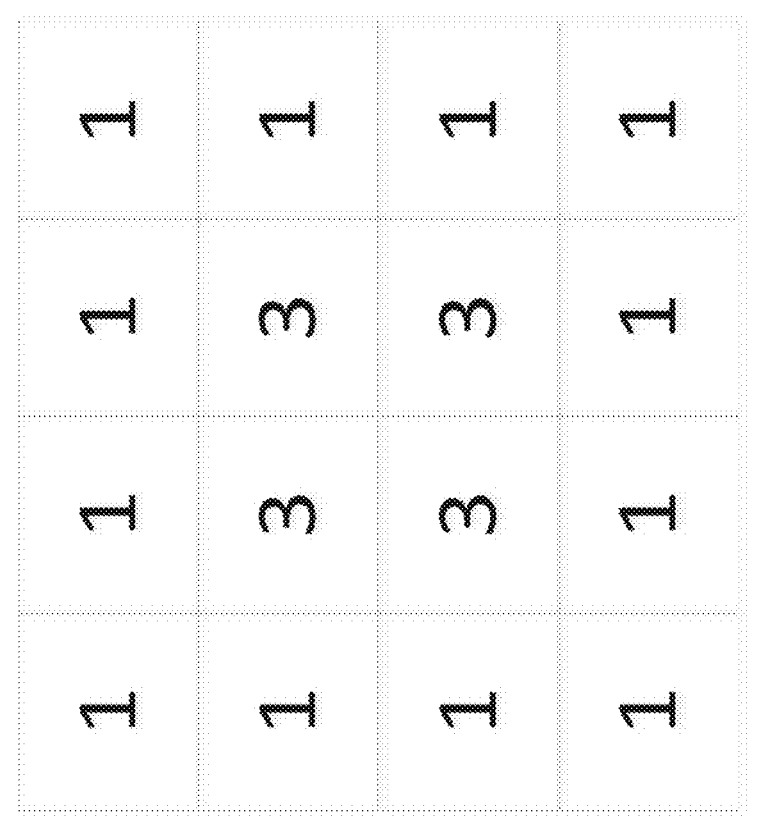

As shown in FIG. 25, an auxiliary prediction sample located at the center of a sub-block is associated with a weighting value 3, while an auxiliary prediction sample located at the boundary of a sub-block is associated with a weighting value 1.

In this contribution, the proposed interweaved prediction is only applied on the luma-component for affine-coded blocks with uni-prediction, so the bandwidth in the worst case is not changed.

3. Examples of Problems Solved by Embodiments

The current design has the following problems:
(1) The clipping and shifting/rounding operations in MTS/RST may not be optimal.
(2) The RST applied on two adjacent 4×4 blocks may be costly.
(3) RST may be done in different ways for different color components.
(4) RST may not work well for screen content coding.
(5) The interaction between RST and other coding tools is unclear.
(6) The transform matrix of RST may be stored more efficiently.
(7) How to apply quantization matrix on RST is unclear.

4. Example Embodiments and Techniques

The listing of embodiments below should be considered as examples to explain general concepts. These embodiments should not be interpreted in a narrow way. Furthermore, these embodiments can be combined in any manner.

In the following description, coding information may include prediction mode (e.g., intra/inter/intra block copy (IBC) mode), motion vector, reference picture, inter prediction direction, intra prediction mode, combined intra inter prediction (CIIP) mode, ISP mode, affine intra mode, employed transform core, transform skip flag etc., e.g., information required when encoding a block.

In the following discussion, SatShift(x, n) is defined as $$SatShift(x, n) = \begin{cases} (x + \textit{offset0}) >> n \text{ if } x \geq 0 \\ -((-x + \textit{offset1}) >> n) \text{ if } x < 0 \end{cases}$$

Shift(x, n) is defined as Shift(x, n)=(x+offset0)»n.

In one example, offset0 and/or offset1 are set to (1<<n)»1 or (1<<(n−1)). In another example, offset0 and/or offset1 are set to 0.

In another example, offset0=offset1=((1<<n)»1)−1 or ((1<<(n−1)))−1.

Clip3(min, max, x) is defined as $$Clip3(\text{Min, Max}, x) = \begin{cases} \text{Min if } x < \text{Min} \\ \text{Max if } x > \text{Max} \\ x \text{ Otherwise} \end{cases}$$

1. After the invert RST, the output value should be clipped to the range of [MinCoef, MaxCoef], inclusively, where MinCoef and/or MaxCoef are two integer values which may be variable.
   a. In one example, suppose a coefficient after dequantization is clipped to the range of [QMinCoef, QMaxCoef] inclusively, then MinCoef may be set equal to QMinCoef and/or MaxCoef may be set equal to QMaxCoef.
   b. In one example, MinCoef and/or MaxCoef may depend on the color component.
      i. In one example, MinCoef and/or MaxCoef may depend on the bit-depth of the corresponding color component.
   c. In one example, MinCoef and/or MaxCoef may depend on the block shape (e.g., square or non-square) and/or block dimensions.
   d. In one example, the value or the selection of candidate values of MinCoef and/or MaxCoef may be signalled, such as in SPS, picture parameter set (PPS), slice header/tile group header/coding tree unit (CTU)/CU.
   e. In one example, for a Luma component, MinCoef and/or MaxCoef may be derived as:

MinCoef=−(1<<(extended_precision_processing_flag? Max(15,BitDepthY+6):15))

MaxCoef=(1<<(extended_precision_processing_flag? Max(15,BitDepthY+6):15))−1 where BitDepthY is the bit-depth of the luma component and extended_precision_processing_flag may be signalled such as in SPS.
   f. In one example, for a component, MinCoef and/or MaxCoef may be derived as:

MinCoef=−(1<<(extended_precision_processing_flag? Max(15,BitDepthC+6):15))

MaxCoef=(1<<(extended_precision_processing_flag? Max(15,BitDepthC+6):15))−1, where BitDepthC is the bit-depth of the chroma component and extended_precision_processing_flag may be signalled such as in SPS.
   g. In some embodiments, MinCoef is −(1<<15) and MaxCoef is (1<<15)−1.
   h. In one example, a conformance bitstream shall satisfy that the transform coefficients after the forward RST shall be within a given range.
2. It is proposed that the way to apply forward RST and/or invert RST on a M×N sub-block of coefficients may depend on the number of sub-blocks that forward RST and/or invert RST is applied to, e.g. M=N=4.
   a. In one example, the zeroing-out range may depend on the sub-block index that RST is applied to.

i. Alternatively, the zeroing-out range may depend on the number of sub-blocks that RST is applied to.
b. In one example, the way to apply forward RST and/or invert RST on the first sub-block and on the second sub-block of coefficients may be different, when there are S sub-blocks that forward RST and/or invert RST is applied to, in a whole coefficient block, where S>1, e.g. S=2. For example, the first M×N sub-block may be the top-left M×N sub-block.
  i. In one example, nonZeroSize as described in section 2.10 may be different for the first M×N sub-block of coefficients (denoted as nonZeroSize0) and for the second M×N sub-block of coefficients (denoted as nonZeroSize1).
    1) In one example, nonZeroSize0 may be larger than nonZeroSize1. For example, nonZeroSize0=16 and nonZeroSize1=8.
  ii. In one example, nonZeroSize as described in section 2.10 may be different when is only one M×N sub-block to be applied forward RST and/or invert RST, or there is more than one M×N sub-blocks to be applied forward RST and/or invert RST.
    1) In one example, nonZeroSize may be equal to 8 if there is more than one M×N sub-blocks to be applied forward RST and/or invert RST.
3. It is proposed to apply forward RST and/or invert RST on only one M×N sub-block (such as the top-left M×N sub-block) of coefficients, if the current block size is 4×H or W×4, where H>8 and W>8. E.g. M=N=4.
  a. In one example, forward RST and/or invert RST is applied on only one M×N sub-block of coefficients if H>T1 and/or W>T2. e.g. T1=T2=16.
  b. In one example, forward RST and/or invert RST is applied on only one M×N sub-block of coefficients if H<T1 and/or W<T2. e.g. T1=T2=32.
  c. In one example, forward RST and/or invert RST is applied on only one M×N sub-block of coefficients for all H>8 and/or W>8.
  d. In one example, forward RST and/or invert RST is applied on only one M×N sub-block (such as the top-left M×N sub-block), if the current block size is M×H or W×N, where H>=N and W>=M. E.g. M=N=4
4. RST may be applied to non-square regions. Suppose the region size is denoted by K×L where K is not equal to L.
  a. Alternatively, furthermore, zeroing-out may be applied to the transform coefficients after forward RST so that the maximum number of non-zero coefficients is satisfied.
    i. In one example, the transform coefficients may be set to 0 if they are located outside the top-left M×M region wherein M is no larger than K and M is no larger than L.
5. It is proposed that coefficients in two adjacent M×N sub-blocks may be involved in a single forward RST and/or invert RST. E.g. M=N=4.
  a. In an example, one or several operations as below may be conducted at encoder. The operations may be conducted in order.
    i. The coefficients in two adjacent M×N sub-blocks are rearranged into a 1-D vector with 2×M×N elements
    ii. A forward RST with a transform matrix with 2×M×N columns and M×N rows (or M×N columns and 2×M×N rows) is applied on the 1-D vector.
    iii. The transformed 1-D vector with M×N elements are rearranged into the first M×N sub-block (such as the top-left sub-block).
    iv. All coefficients in the second M×N sub-block may be set as zero.
  b. In an example, one or several operations as below may be conducted at decoder. The operations may be conducted in order.
    i. The coefficients in the first M×N sub-block (such as the top-left sub-block) are rearranged into a 1-D vector with M×N elements
    ii. An invert RST with a transform matrix with M×N columns and 2×M×N rows (or 2×M×N columns and M×N rows) is applied on the 1-D vector.
    iii. The transformed 1-D vector with 2×M×N elements are rearranged into the two adjacent M×N sub-blocks.
  c. In one example, a block may be split into K(K>1) sub-blocks, and both major and secondary transform may be performed at sub-block level.
6. The zeroing-out range (e.g., nonZeroSize as described in section 2.10) may depend on the color component.
  a. In one example, for the same block dimension, the range may be different for luma and chroma components.
7. The zeroing-out range (e.g., nonZeroSize as described in section 2.10) may depend on the coded information.
  a. In one example, it may depend on the coded mode, such as intra or non-intra mode.
  b. In one example, it may depend on the coded mode, such as intra or inter or IBC mode.
  c. In one example, it may depend on the reference pictures/motion information.
8. It is proposed that zeroing-out range (e.g., nonZeroSize as described in section 2.10) for specific block dimensions may depend on the Quantization Parameter (QP).
  a. In one example, suppose nonZeroSize is equal to nonZeroSizeA when QP is equal QPA and nonZeroSize is equal to nonZeroSizeB when QP is equal QPB. If QPA is no smaller than QPB, then nonZeroSizeA is no larger than nonZeroSizeB.
  b. Different transform/inv-transform matrices may be used for different nonZeroSize.
9. It is proposed that zeroing-out range (e.g., nonZeroSize as described in section 2.10) may be signalled, such as in SPS, PPS, picture header, slice header, tile group header, CTU row, CTU, CU or any video data unit.
  a. Alternatively, multiple ranges may be defined. And the indication of which candidate nonZeroSize is selected may be signalled, such as in SPS, PPS, picture header, slice header, tile group header, CTU row, CTU and CU.
10. Whether and/or how to apply RST may depend on the color format, and/or usage of separate plane coding, and/or color component.
  a. In one example, RST may not be applied on chroma components (such as Cb and/or Cr).
  b. In one example, RST may not be applied on chroma components if the color format is 4:0:0.
  c. In one example, RST may not be applied on chroma components if separate plane coding is used.
  d. In one example, nonZeroSize for specific block dimensions may depend on color components.

i. In one example, nonZero Size on chroma components may be smaller than nonZeroSize on the luma component for the same block dimensions.
11. It is proposed that the RST controlling information (such as whether RST is applied, and/or which group of transform matrix is selected) may be signalled separately for luma and chroma components, when the components are coded with a single coding structure tree.
12. Whether and how to apply RST may depend on coding information (such as coding mode) of the current block and/or neighboring blocks.
   a. In one example, RST cannot be used for one or multiple specific intra-prediction modes.
      i. For example, RST cannot be used for the LM mode.
      ii. For example, RST cannot be used for the LM-T mode.
      iii. For example, RST cannot be used for the LM-A mode.
      iv. For example, RST cannot be used for wide angle intra-prediction modes.
      v. For example, RST cannot be used for BDPCM mode or/and DPCM mode or/and RBDPCM modes.
      vi. For example, RST cannot be used for ALWIP mode.
      vii. For example, RST cannot be used for some specific angular intra-prediction modes (such as DC, Planar, Vertical, Horizontal, etc.).
      viii. For example, RST may be used for luma component but not for chroma component in LM mode or/and LM-T mode or/and LM-A mode.
      ix. For example, RST may be not used for chroma component when joint chroma residual coding is applied.
   b. If RST cannot be applied, the syntax elements to indicate information related RST in the current block may not be signalled.
13. It is proposed that RST may be applied on blocks that is not intra-coded.
   a. In one example, RST may be applied on an inter-coded block.
   b. In one example, RST may be applied on an intra block copy (IBC)-coded block.
   c. In one example, RST may be applied on a block coded with combined inter-intra prediction (CIIP).
14. It is proposed that RST may be controlled at different levels.
   a. For example, the information to indicate whether RST (such as a control flag) is applicable or not may be signalled in PPS, slice header, picture header, tile group header, tile, CTU row, CTU.
   b. Whether RST is applicable may depend on standard profiles/levels/tiers.
15. It is proposed that whether Position Dependent intra Prediction Combination (PDPC) is applied may depend on whether RST is applied.
   a. In one example, PDPC may not be applied if the current block applied RST.
   b. In one example, PDPC may be applied if the current block applied RST.
   c. Alternatively, whether RST is applied may depend on whether PDPC is applied.
      i. In one example, RST is not applied when PDPC is applied.
      ii. If RST cannot be applied, the syntax elements to indicate information related RST in the current block may not be signalled.
16. It is proposed that whether neighboring samples used for intra-prediction are filtered may depend on whether RST is applied.
   a. In one example, neighboring samples may not be filtered if the current block applied RST.
   b. In one example, neighboring samples may be filtered if the current block applied RST.
   c. Alternatively, whether RST is applied may depend on whether neighboring samples used for intra-prediction are filtered.
      i. In one example, RST is not applied when neighboring samples used for intra-prediction are filtered.
      ii. In one example, RST is not applied when neighboring samples used for intra-prediction are not filtered.
      iii. If RST cannot be applied, the syntax elements to indicate information related RST in the current block may not be signalled.
17. It is proposed that RST may be applied when the current block is coded with transform skip.
   a. For example, the major transform is skipped, but the second transform may still be applied.
   b. Secondary transform matrices used in transform skip mode may be different from that are used in none transform skip mode.
18. It is proposed that the transform matrices used for RST may be stored with bit-width less than 8. For example, the transform matrices used for RST may be stored with bit-width 6 or 4.
19. It is proposed that the transform matrices used for RST may be stored in a predictive way.
   a. In one example, a first element in a first transform matrix for RST may be predicted by a second element in the first transform matrix for RST.
      i. For example, the difference between the two elements may be stored.
      ii. For example, the difference may be stored with bit-width less than 8, such as 6 or 4.
   b. In one example, a first element in a first transform matrix for RST may be predicted by a second element in the second transform matrix for RST.
      i. For example, the difference between the two elements may be stored.
      ii. For example, the difference may be stored with bit-width less than 8, such as 6 or 4.
20. It is proposed that a first transform matrix for RST may be derived from a second transform matrix for RST.
   a. In one example, partial elements of the second transform matrix for RST may be picked up to build the first transform matrix for RST.
   b. In one example, the first transform matrix for RST by be derived by rotating or flipping on the whole or a part of the second transform matrix for RST.
   c. In one example, the first transform matrix for RST by be derived by down-sampling or up-sampling on the second transform matrix for RST.
21. It is proposed that the syntax elements to indicate information related RST in the current block may be signalled before residues (may be transformed) are signalled.

a. In one example, the signalling of information related RST may not depend on the non-zero or zero coefficients counted when parsing the residues.
b. In one example, the non-zero or zero coefficients may not be counted when parsing the residues.
c. In one example, the coded block flag (cbf) flags for sub-blocks which are set to be all-zero by RST may not be signalled and inferred to be 0.
d. In one example, the significant flag for a coefficient which is set to be zero by RST may not be signalled and inferred to be 0.
e. The scanning order to parse the residue block may depend whether and how to apply RST.
  i. In one example, the coefficients which are set to be zero by RST may not be scanned.
f. The arithmetic coding contexts to parse the residue block may depend on whether and how to apply RST.

22. It is proposed that whether and how to apply quantization matrix may depend on whether and how to apply RST.
  a. In one example, different quantization matrix may be applied whether RST is applied or not.
  b. Alternatively, whether and how to apply RST may depend on whether and how to apply quantization matrix.
    i. In one example, RST may not be applied when quantization matrix is applied on a block.

23. It is proposed that RST may be applied to quantized coefficients/residual.
  a. In one example, RST may be applied to residuals when transform skip is used.
  b. In one example, RST may be applied to quantized transformed coefficients of a block.

24. It is proposed that RST may be applied to sub-block transform blocks.
  a. In one example, RST may be applied to the upper-left coefficients generated by sub-block transform.

25. It is proposed that how to and/or whether to apply RST may depend on the number of TUs in a CU.
  a. For example, how to and/or whether to apply RST may depend on whether the number of TUs in a CU is larger than 1.
    i. In one example, RST is not applied if the number of TUs in a CU is larger than 1.
    ii. In one example, RST is only applied to one of the multiple TUs in a CU if the number of TUs in the CU is larger than 1.
      1) In one example, RST is only applied to the first TU in a CU if the number of TUs in the CU is larger than 1.
      2) In one example, RST is only applied to the last TU in a CU if the number of TUs in the CU is larger than 1.
    iii. In one example, RST is applied to each TU of the CU if the number of TUs in the CU is larger than 1 independently.
      1) Alternatively, whether to apply RST on a first TU of the CU may be determined independently of whether to apply RST on a second TU of the CU when the number of TUs in the CU is larger than 1.
      2) In one example, whether to apply RST on a TU of the CU may depend on the number of non-zero coefficients (denoted as NZ) of the TU, but not depend on the number of non-zero coefficients of other TUs of the CU when the number of TUs in the CU is larger than 1.
        a) In one example, if NZ is smaller than a threshold T (e.g. T=2), RST is not applied on the TU.
        b) The syntax element(s) to indicate whether to apply RST may not be signalled for a TU of the CU if RST is determined not to be applied on the TU
  b. For example, how to and/or whether to apply RST may depend on whether the TU size is equal to CU size.
    i. In one example, when CU size is larger than TU size, RST is disabled.
  c. It is proposed to use the decoded information of the first TU or last TU in the decoding order of a CU to decide the usage of RST and/or signalling of RST related syntax elements.
    i. In one example, if number of non-zero coefficients of the first or last TU is smaller than a threshold T (e.g. T=2), RST is not applied on the CU.
    ii. In one example, if number of non-zero coefficients of a sub-region (e.g., top-left 4×4) within the first or last TU is smaller than a threshold T (e.g. T=2), RST is not applied on the CU.

26. It is proposed to have a flag for a TU to control whether RST is applied.
  a. Whether to apply RST to a TU may depend on the flag for that TU.
    i. When the flag is not presented or has not been derived, it may be derived to be false.
    ii. Alternatively, when the flag is not presented or has not been derived, it may be derived to be true.
  b. When a CU contains only one TU, the flag for the TU may be equal to the CU RST flag which may be derived on-the-fly (e.g., based on the coefficient information).
  c. When the number of TUs in a CU is larger than 1, the flag for the last TU in the CU may be derived from the CU RST flag which may be derived on-the-fly (e.g., based on the coefficient information), and all other TUs' flag may be set to false.
    i. Alternatively, When the number of TUs in a CU is larger than 1, the flag for the last TU in the CU may be derived from the CU RST flag, and all other TUs' flag may be set to true.

27. It is proposed that whether to and/or how to apply RST on a first component of a block may be different from whether to and/or how to apply RST on a second component of the block when the number of components is larger than 1 and a single coding tree is used. That is, separate control of RST is applied for different color components.
  a. It is proposed that whether to apply RST on a first component of a block may be determined independently of whether to apply RST on a second component of the block when the number of components is larger than 1 and a single coding tree is used.
    i. In one example, whether to apply RST on a component of a block may depend on decoded information (e.g., the number of non-zero coefficients (denoted as NZ)) of the component of the block, but not depend on the decoded information of any other component of the block when the number of components is larger than 1 and a single coding tree is used.

1) In one example, if NZ is smaller than a threshold T (e.g. T=2), RST is not applied on the component of the block.
2) The syntax element(s) to indicate whether to apply RST may not be signalled for the component of the block if RST is determined not to be applied on the component of the block.
b. In one example, for the single tree case, whether to enabled RST and/or how to apply RST may be determined for luma and chroma components independently.

28. It is proposed that whether to apply RST on a first component of a block may be determined by a second component of the block when the number of components is larger than 1 and a single coding tree is used.
a. In one example, whether to apply RST on a first component of a block may be determined by the number of non-zero coefficients of a second component of the block when the number of components is larger than 1 and a single coding tree is used.
i. In one example, if NZ (e.g., number of non-zero coefficients of the second component of the block or sub-region (e.g., top-left 4×4) of the block) is smaller than a threshold T (e.g. T=2), RST is not applied on the first component of the block.
ii. The syntax element(s) to indicate whether to apply RST may not be signalled for a component of the block if RST is determined not to be applied on the first component of the block.
iii. In one example, the first component is Cb or Cr, and the second component is Y.
iv. In one example, the first component is R or B, and the second component is G.

29. In one example, whether to apply bullet 25 and/or bullet 26 and/or bullet 27 may depend on the width and height of the CU and/or TU and/or block (denoted as W and H) and/or maximum transform block sizes.
a. In one example, bullet 25 and/or bullet 26 and/or bullet 27 is applied only when W>T or H>T. In one example, T may be equal to 64. In an alternative example, T may be equal to the maximum transform size.
b. In one example, bullet 25 and/or bullet 26 and/or bullet 27 is applied only when W>T and H>T. In one example, T may be equal to 64. In an alternative example, T may be equal to the maximum transform size.
c. In one example, bullet 25 and/or bullet 26 and/or bullet 27 is applied only when W>T and H>T. In one example, T may be equal to 64. In an alternative example, T may be equal to the maximum transform size.

Improvements on Separable Secondary Transform (SST)

30. In one example, SST may be determined to be enabled or disabled for a video unit.
a. For example, the determination may be conducted based on a signalling in a video syntax structure associated with the video unit.
i. In one example, the signalling (such as a flag) may be coded with at least one context in arithmetic coding.
ii. In one example, the signalling may be conditionally skipped based on coding/decoding information, such as block dimensions, coded block flag (cbf), and coding mode of the current block.
1) In one example, the signalling may be skipped when cbf is equal to zero.
b. For example, the determination may be conducted based on an inferring without a signalling associated with the video unit.
i. The inferring may depend on information of the video unit, e.g. coding mode, intra-prediction mode, the type of primary transform, and the dimensions or sizes of the video unit,
c. For example, the video unit may be a block, such as a coding block or a transform block. The video syntax structure may be a coding unit (CU) or a transform unit (TU)
d. For example, the video unit may be a picture. The video syntax structure may be a picture header or a PPS.
e. For example, the video unit may be a slice. The video syntax structure may be a slice header.
f. For example, the video unit may be a slice. The video syntax structure may be a sequence header or a SPS.
g. The video syntax structure may be a video parameter set (VPS)/dependency parameter set (DPS)/adaptation parameter set (APS)/tile group/tile/CTU row/CTU.

31. In one example, whether to disable or enable SST may be based on block dimensions.
h. For example, SST may be disabled if at least one of block width or height is smaller (or no greater) than Tmin.
i. For example, SST may be disabled if both block width and height are smaller than Tmin.
j. For example, SST may be disabled if at least one of block width or height is bigger (or no smaller) than Tmax.
k. For example, SST may be disabled if both block width and height are bigger (or no smaller) than Tmax.
l. For example, Tmin may be 2 or 4.
m. For example, Tmax may be 32, 64, or 128.
n. In one example, SST may be disabled based on the block width or/and height of a first color component.
i. For example, the first color component may be the luma color component.
ii. For example, the first color component may be the R color component.
o. In one example, SST may be disabled based on the block width or/and height of all color components.
p. Alternatively, furthermore, when SST is disabled, the related signalling of indications of usage of SST and/or other side information is omitted.
q. In one example, based on the block dimension, SST may be enabled on a first color component and disabled on a second color component.

32. In one example, a set of SSTs may be utilized and the selection of an SST matrix for a block may depend on decoded information, such as block dimensions.
r. Alternatively, furthermore, the same decoded/signalled SST index or the same on/off control flag may be interpreted in different ways, such as corresponding to different matrices for different block dimensions.
s. For example, different SSTs in the set may have different dimensions, such as 4×4 SST, 8×8 SST, or 16×16 SST,
t. For example, 4×4 SST may be applied on blocks with condition C4, 8×8 SST may be applied on blocks with condition C8.
i. Alternatively, furthermore, 4×4 SST may be applied on blocks with condition C4, 8×8 SST may be applied on blocks with condition C8, . . . , N×N SST may be applied on blocks with condition CN, where N is an integer.
- u. In one example, condition C4 is at least one of block width and height is equal to 4.
- v. In one example, condition C4 is both block width and height are equal to 4.
- w. In one example, condition C4 is the smaller value of block width and height is equal to 4.
- x. In one example, condition C8 is the smaller value of block width and height is no smaller than to 8.
- y. In one example, condition C8 is at least one of block width and height is equal to 8.
- z. In one example, condition C8 is both block width and height are equal to 8.
- aa. In one example, condition C8 is at least one of block width and height is greater than or equal to 8.
- bb. In one example, condition C8 is both block width and height are greater than or equal to 8.
- cc. In one example, condition CN is at least one of block width and height is equal to N.
- dd. In one example, condition CN is both block width and height are equal to N.
- ee. In one example, condition CN is at least one of block width and height is greater than or equal to N.
- ff. In one example, condition CN is both block width and height are greater than or equal to N.
- gg. In one example, N×N SST may be applied on the top-left N×N sub-block of the transformed block.
- hh. In one example, SST may be applied horizontally or vertically or both horizontally and vertically, depending on the block dimension.
- ii. In one example, different SST matrices may be selected for different color components.
  - i. For example, the above rules may be applied to different color components independently.
- jj. In one example, one same SST matrix may be selected for all color components.
  - i. For example, the above rules may be applied to a first color component and the selected SST matrix may be applied to all color components.
    1) In one example, the first color component may be the luma component.
    2) In one example, the first color component may be the Cb or Cr component.
    3) Alternatively, furthermore, if the selected SST matrix is not applicable on a second color component, SST is disabled for the second color component.
- kk. In one example, SST may be allowed only when the selected SST matrices of all color components (by applying the above rules to different color components independently) are the same.
  - i. Alternatively, furthermore, if SST is not allowed, the related signalling of indications of usage of SST and/or other side information is omitted.
33. In one example, N×N SST may be applied on at least one N×N sub-block which is not identical to the top-left N×N sub-block.
- ll. For example, it may be applied to a N×N sub-block right adjacent to the top-left N×N sub-block.
- mm. For example, it may be applied to a N×N sub-block bottom adjacent to the top-left N×N sub-block.
34. In one example, a first SST may be applied as a horizontal transform on a transformed block, and a second SST may be applied as a vertical transform on a transformed block, wherein the first SST and the second SST may be different.
- nn. For example, the first SST and the second SST may have different dimensions.
- oo. Suppose the first SST is a N×N SST, the second SST is a M×M SST, and the transformed block dimensions are W×H, then the following rules may be applied:
  - i. N is set equal to W1 if W is equal to W1, wherein W1 is an integer such as 4 or 8.
  - ii. N is set equal to W2 if W is larger or no smaller than W2, wherein W2 is an integer such as 4 or 8.
  - iii. M is set equal to H1 if H is equal to H1, wherein H1 is an integer such as 4 or 8.
  - iv. M is set equal to H2 if H is larger or no smaller than H2, wherein H2 is an integer such as 4 or 8.
35. In one example, one of a set of SSTs may be used for a block, wherein there are more than one SSTs with the same dimensions are in the set.
- pp. In one example, a message is signalled to indicate which one is selected to be used.
- qq. In one example, it is inferred which one is selected without signalling. The inference may depend on:
  - i. Block dimensions.
  - ii. Intra-prediction mode.
  - iii. The quantized/unquantized coefficients after transform.
  - iv. Color components.
  - v. The type of primary transform.
36. In one example, different SST may be applied if the primary transform is different.
- rr. For example, the SST used associated with DCT2 may be different from the SST used associated with DST7.
37. In one example, SST may be applied on chroma components.
- ss. In one example, different SST matrices may be applied for different color components, such as Y, Cb and Cr.
- tt. In one example, different rules of whether and how to apply SST may be followed by different color components.
- uu. In one example, separate control for two color components may be applied.
  - i. In one example, indications of usage of SST and/or matrices may be signalled for each of the two color components.
38. Indications of usage of SST and/or indications of SST matrices may be signalled according to the condition check of right-bottom position of the scan region. Denote the bottom-right position by (SRx, SRy), such as that depicted in FIGS. 18A-B.
- vv. In one example, when SRx is greater than or no smaller than Kx and/or when SRy is greater than or no smaller than Ky, indications of usage of SST and/or indications of SST matrices may be omitted.
- ww. In one example, when SRx is smaller than or no greater than K'x and/or when SRy is smaller than or no greater than K'y, indications of usage of SST and/or indications of SST matrices may be omitted.
- xx. Alternatively, furthermore, when the indications are not signalled, the SST may be inferred to be disabled.
- yy. Alternatively, furthermore, when the indications are not signalled, a default SST may be inferred.
  - i. In one example, the default SST may be set to the K*L transform.

ii. In one example, the default SST may be determined according to the decoded information, such as block dimension.
zz. Alternatively, furthermore, the above methods may be also applied to other non-separate secondary/primary transforms.

Related to Enhanced Secondary Transform (EST)
39. Implicit and explicit signalling of applying secondary transform or not may be utilized within a video data unit (e.g., a picture).
  a. In one example, whether to use the implicit way or explicit way is dependent on the coded mode information, e.g., whether derived tree (DT) is applied.
    i. In one example, for intra coded blocks excluding DT and/or intra coded blocks excluding PCM mode, the explicit signalling method may be applied.
      1) In one example, a flag may be signalled to indicate whether to apply secondary transform or not.
    ii. In one example, for intra coded blocks with DT, the implicit signalling method may be applied wherein secondary transform is always applied.
    iii. In one example, for intra coded blocks with PCM mode and/or non-intra coded blocks, the implicit signalling method may be applied wherein secondary transform is always NOT applied.
40. Multiple ways of implicit signalling of applying secondary transform or not may be utilized within a video data unit (e.g., a picture).
  a. In one example, which implicit method to be used may be dependent on the coded mode information, e.g., whether DT is applied.
    iv. In one example, for intra coded blocks excluding DT and/or intra coded blocks excluding PCM mode, an implicit method which depend on the transform coefficients may be applied.
      1) In one example, parity of number of odd transform coefficients and/or parity of number of even transform coefficients in a block may be used to determine whether to apply secondary transform or not.
    v. In one example, for intra coded blocks with DT, the implicit signalling method may be applied wherein secondary transform is always applied.
    vi. In one example, for intra coded blocks with PCM mode and/or non-intra coded blocks, the implicit signalling method may be applied wherein secondary transform is always NOT applied.
41. A separable secondary transform may be either applied or not applied on a block depending on a syntax element (SE) (such as a flag). For example, the separable secondary transform may be applied on a block if the SE associated with the block is 1; the separable secondary transform may not be applied on a block if the SE associated with the block is 1.
  a. Signalling of the SE for a block may be conditioned on information of the block.
    vii. E.g. the SE is signalled only if the block is a luma block.
    viii. E.g. the SE is not signalled if DT is used.
    ix. E.g. the SE is not signalled if the major transform is not DCT2.
  b. When the SE is not signalled, it may be set equal to a default value, such as 0.
42. One of multiple separable secondary transform may be selected to be used for a block in the row and/or column second transform.
  a. In one example, the selection may be signalled.
  b. In one example, the selection may not be signalled but derived by the information of the block.
    x. For example, a 4×4 separable secondary transform may be applied to rows (e.g. the four or eight top-most rows) of a block if the width of the block is not larger than 4 (or equal to 4, or smaller than 8).
    xi. For example, a 4×4 separable secondary transform may be applied to columns (e.g. the four or eight left-most columns) of a block if the height of the block is not larger than 4 (or equal to 4, or smaller than 8).
    xii. For example, an 8×8 separable secondary transform may be applied to rows (e.g. the four or eight top-most rows) of a block if the width of the block is larger than 4 (or no smaller than 8).
    xiii. For example, an 8×8 separable secondary transform may be applied to columns (e.g. the four or eight left-most columns) of a block if the height of the block is larger than 4 (or no smaller than 8).
    xiv. For example, a 4×4 or 8×8 separable secondary transform may be applied to the four top-most rows of a block if the height of the block is not larger than 4 (or equal to 4, or smaller than 8).
    xv. For example, a 4×4 or 8×8 separable secondary transform may be applied to the eight top-most rows of a block if the height of the block is larger than 4 (or no smaller than 8).
    xvi. For example, a 4×4 or 8×8 separable secondary transform may be applied to the four left-most columns of a block if the width of the block is not larger than 4 (or equal to 4, or smaller than 8).
    xvii. For example, a 4×4 or 8×8 separable secondary transform may be applied to the eight left-most columns of a block if the width of the block is larger than 4 (or no smaller than 8).
43. The transform core matrix of the 8×8 separable secondary transform may be defined as:

$$S_8 = \begin{bmatrix} 123 & -35 & -8 & -3 & -2 & -1 & -1 & -1 \\ 32 & 120 & -29 & -10 & -5 & -3 & -2 & -1 \\ -14 & -24 & -123 & 21 & 8 & 4 & 3 & 2 \\ 7 & 11 & 17 & 125 & -16 & -7 & -4 & -2 \\ -4 & -7 & -8 & -13 & -126 & 13 & 5 & 3 \\ 3 & 4 & 5 & 6 & 11 & 127 & -10 & -5 \\ -2 & -3 & -3 & -4 & -5 & -9 & -127 & 9 \\ 2 & 2 & 3 & 3 & 3 & 5 & 8 & 128 \end{bmatrix}$$

Related to Affine Prediction and Interweaved Prediction.
44. The interpolation filters for motion compensation may be different depending on whether condition A is satisfied or not.
  a. For example, condition A means affine prediction is applied.
  b. For example, condition A means interweaved prediction is applied.
  c. For example, condition A means affine prediction is applied and bi-prediction is used.
  d. For example, condition A means interweaved prediction is applied and bi-prediction is used.
  e. Two interpolation filters are different may mean that they have different numbers of filter coefficients.

f. Two interpolation filters are different may mean that they have at least one different filter coefficient.

g. In one example, the interpolation filters when condition A is satisfied are defined as:
{0, 0, 0, 64, 0, 0, 0, 0},
{0, 1, −3, 63, 4, −2, 1, 0},
{0, 2, −5, 62, 8, −3, 0, 0},
{0, 3, −8, 60, 13, −4, 0, 0},
{0, 4, −10, 58, 17, −5, 0, 0},
{0, 3, −11, 52, 26, −8, 2, 0},
{0, 2, −9, 47, 31, −10, 3, 0},
{0, 3, −11, 45, 34, −10, 3, 0},
{0, 3, −11, 40, 40, −11, 3, 0},
{0, 3, −10, 34, 45, −11, 3, 0},
{0, 3, −10, 31, 47, −9, 2, 0},
{0, 2, −8, 26, 52, −11, 3, 0},
{0, 0, −5, 17, 58, −10, 4, 0},
{0, 0, −4, 13, 60, −8, 3, 0},
{0, 0, −3, 8, 62, −5, 2, 0},
{0, 1, −2, 4, 63, −3, 1, 0} h. In one example, the interpolation filters when condition A is satisfied are defined as:
{0, 0, 0, 64, 0, 0, 0, 0},
{0, 1, −3, 63, 4, −1, 0, 0},
{0, 2, −6, 62, 8, −3, 1, 0},
{0, 2, −8, 60, 13, −5, 2, 0},
{0, 2, −9, 57, 18, −6, 2, 0},
{0, 3, −11, 53, 24, −8, 3, 0},
{0, 3, −10, 49, 29, −9, 2, 0},
{0, 3, −11, 45, 34, −10, 3, 0},
{0, 3, −11, 40, 40, −11, 3, 0},
{0, 3, −10, 34, 45, −11, 3, 0},
{0, 2, −9, 29, 49, −10, 3, 0},
{0, 3, −8, 24, 53, −11, 3, 0},
{0, 2, −6, 18, 57, −9, 2, 0},
{0, 2, −5, 13, 60, −8, 2, 0},
{0, 1, −3, 8, 62, −6, 2, 0},
{0, 0, −1, 4, 63, −3, 1, 0}

Figure 26B:
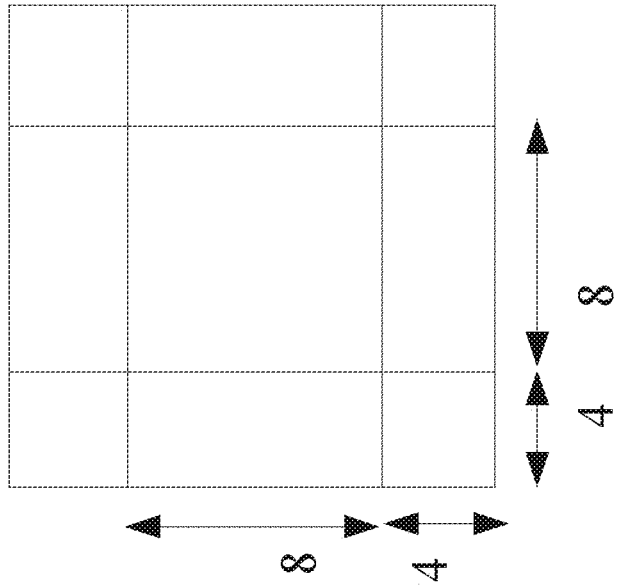
FIG. 26B shows another example of dividing patterns.
Figure 26A:
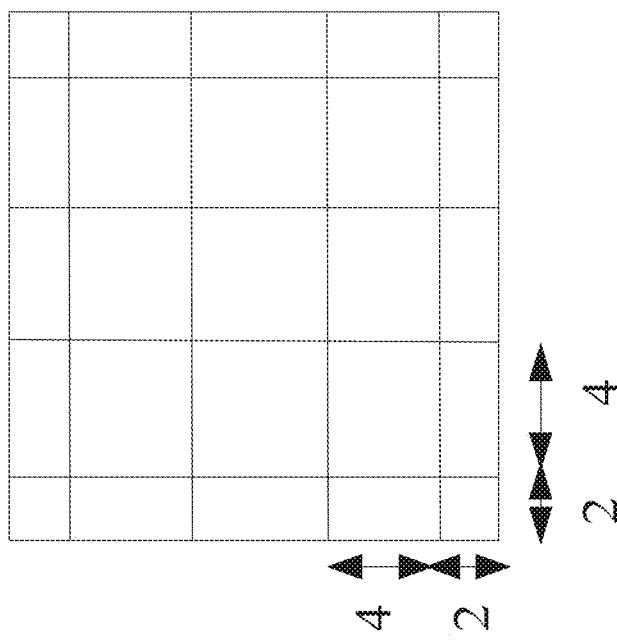
FIG. 26A shows an example of dividing patterns.

45. Different patterns may be used for uni-prediction and bi-prediction when interweaved prediction is applied.
   a. For uni-prediction, the second dividing pattern divide the block into 4×4 subblocks, with a 2×2 offset. An example is pattern 4 shown in FIG. 26A.
   b. For uni-prediction, the second dividing pattern divide the block into 8×8 subblocks, with a 4×4 offset. An example is pattern 6 shown in FIG. 26B.

46. In one embodiment, there are two possible weighting values Wa and Wb, satisfying Wa+Wb=2N. Exemplary weighting values {Wa, Wb} are {3, 1}, {7, 1}, {5, 3}, {13, 3}, etc.
   a. If the weighting value w1 associated with the prediction sample P1 generated by the first dividing pattern, and the weighting value w2 associated with the prediction sample P2 generated by the second dividing pattern, are the same (both equal to Wa or Wb), then the final prediction P for this sample is calculated as P=(P1+P2)»1 or P=(P1+P2+1)»1.
   b. If the weighting value w1 associated with the prediction sample P1 generated by the first dividing pattern, and the weighting value w2 associated with the prediction sample P2 generated by the second dividing pattern, are different ({w1, w2}={Wa, Wb} or {w1, w2}={Wb, Wa}), then the final prediction P for this sample is calculated as P=(w1×P1+w2×P2+offset)»N, where offset can be 1<<(N−1) or 0.
   c. Exemplary weighting values of 8×8, 8×4, 4×8, 4×4 sub-blocks when the block is divided into 8×8 sub-blocks are shown in FIG. 27A-D.

Figure 16:
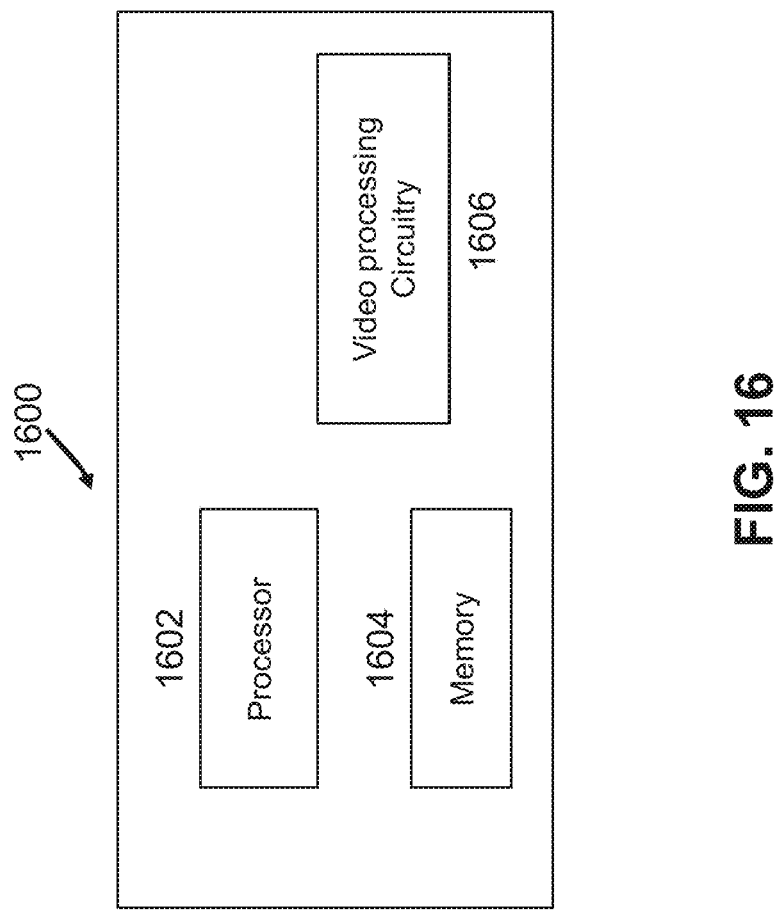
FIG. 16 is a block diagram of an example hardware platform for implementing a technique described in the present document.

FIG. 16 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606 (e.g., circuitry). The processor(s) 1602 may be configured to implement one or more methods described in the present document. The memory (memories) 1604 may be used for storing data and code used for implementing the methods and techniques described herein. The video processing hardware 1606 may be used to implement, in hardware circuitry, some techniques described in the present document.

Figure 17:
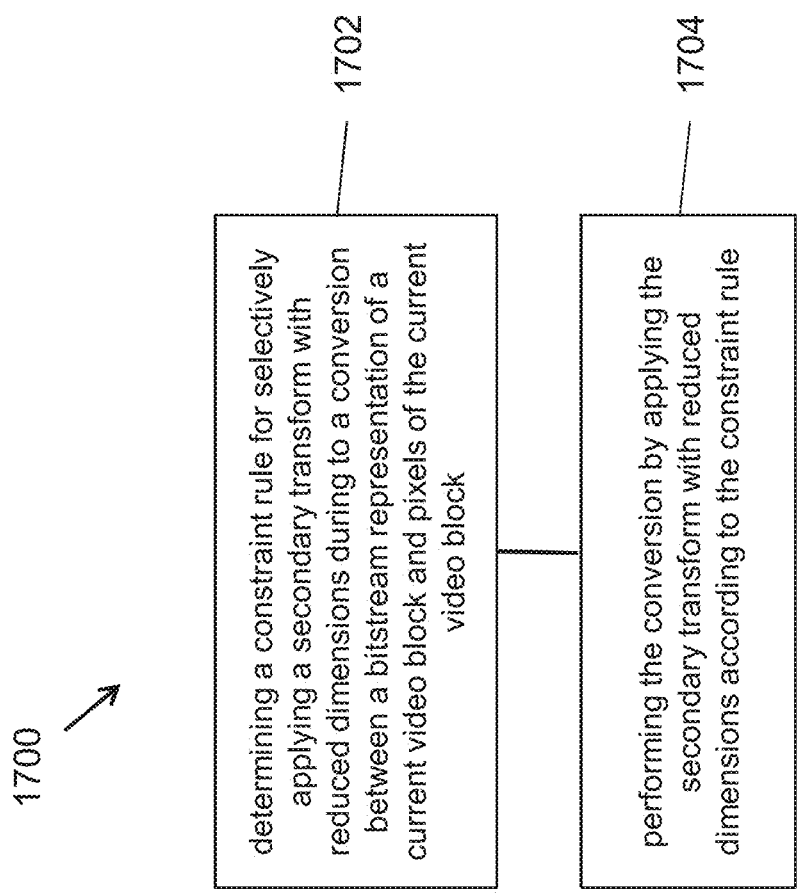
FIG. 17 is a flowchart of an example method of video processing.

FIG. 17 is a flowchart for an example method 1700 of video processing. The method 1700 includes determining (1702) a constraint rule for selectively applying a secondary transform with reduced dimensions during to a conversion between a bitstream representation of a current video block and pixels of the current video block. The method 1700 includes performing (1704) the conversion by applying the secondary transform with reduced dimensions according to the constraint rule. The secondary transform with reduced dimensions has dimensions reduced from a dimension of the current video block. The secondary transform with reduced dimensions is applied in a specific order together with a primary transform during the conversion.

Additional embodiments and techniques are as described in the following examples.

1. A video processing method, comprising: determining a constraint rule for selectively applying a secondary transform with reduced dimensions during to a conversion between a bitstream representation of a current video block and pixels of the current video block, and performing the conversion by applying the secondary transform with reduced dimensions according to the constraint rule; wherein the secondary transform with reduced dimensions has dimensions reduced from a dimension of the current video block, and wherein the secondary transform with reduced dimensions is applied in a specific order together with a primary transform during the conversion.

2. The method of example 1, wherein the conversion includes encoding the current video block into the bitstream representation and wherein the specific order includes first applying the primary transform in a forward direction, followed by selectively applying the secondary transform with reduced dimensions in a forward direction followed by quantizing an output of the secondary transform with reduced dimension in the forward direction.

3. The method of example 1, wherein the conversion includes decoding the current video block from the bitstream representation and wherein the specific order includes first applying a dequantization to the bitstream representation, followed by selectively applying the secondary transform with reduced dimensions in an inverse direction followed by applying the primary transform in an inverse direction to an output of the secondary transform with reduced dimensions in the inverse direction.

4. The method of any of examples 1 to 3, wherein the constraint rule specifies to clip a range of the output of the secondary transform with reduced dimensions in the inverse direction to a range of [MinCoef, Max-Coef], inclusively, where MinCoef and/or MaxCoef are two integer values that are a function of a condition of the current video block.
5. The method of example 4, wherein the condition of the current video block is a type of color or luma component represented by the current video block.
6. The method of example 1, wherein the constraint rule specifies to apply the secondary transform with reduced dimensions to one or more M×N subblocks of the current video block and zeroing out the remaining subblocks of the current video block.
7. The method of example 1, wherein the constraint rule specifies to apply the secondary transform with reduced dimensions differently to different subblocks of the current video block.
8. The method of any of examples 1 to 5, wherein the constraint rule specifies to apply the secondary transform with reduced dimensions to exactly one M×N subblock of the current video block due to the current video block having a size 4×H or W×4, where H is height in integer pixels and W is width in integer pixels.
9. The method of example 8, wherein H>8 or W>8.
10. The method of any of examples 1 to 9, wherein the current video block is a non-square region of video.
11. The method of examples 2 or 3, wherein the constraint rule specifies to zero out transform coefficients of the primary transform in the forward direction or padding zero coefficients to an output of the secondary transform in the reverse direction.

Further embodiments of examples 1-5 are described in item 1 in Section 4. Further embodiments of examples 6-7 are described in item 2 in section 4. Further embodiments of examples 8-9 are described in item 3 of section 4. Further embodiments of examples 10-11 are described in item 4 of section 4.

12. A video processing method, comprising: determining a constraint rule for selectively applying a secondary transform with reduced dimensions during to a conversion between a bitstream representation of a current video block and a neighboring video region and pixels of the current video block and pixels of the neighboring region, and performing the conversion by applying the secondary transform with reduced dimensions according to the constraint rule; wherein the secondary transform with reduced dimensions has dimensions reduced from a dimension of the current video block and the neighboring video region, and wherein the secondary transform with reduced dimensions is applied in a specific order together with a primary transform during the conversion.
13. The method of example 12, wherein the neighboring video region comprises a top-left block of the current video block.
14. The method of example 12, wherein the current video block and the neighboring video region correspond to sub-blocks of a parent video block.

Further embodiments of examples 12-14 are described in item 5 of section 4.

15. A video processing method, comprising: determining a zeroing-out rule for selectively applying a secondary transform with reduced dimensions during to a conversion between a bitstream representation of a current video block and pixels of the current video block, and performing the conversion by applying the secondary transform with reduced dimensions according to the zeroing-out rule; wherein the secondary transform with reduced dimensions has dimensions reduced from a dimension of the current video block; wherein the zeroing-out rule specifies a maximum number of coefficients used by the secondary transform with reduced dimensions.
16. The method of example 15, wherein the maximum number of coefficients is a function of component identification of the current video block.
17. The method of example 16, wherein the maximum number of coefficients is different for a luma video block and a chroma video block.
18. The method of any of examples 15 to 17, wherein the zeroing-out rule specifies a zeroing-out range that is a function of coded information of the current video block.
19. The method of any of examples 15 to 17, wherein the zeroing-out rule specifies a zeroing-out range that is a function of a quantization parameter of the current video block.
20. The method of any of examples 15 to 19, wherein the zeroing out range is indicated in the bitstream representation by a field included at a sequence parameter set level, or picture parameter set level, or a picture header, or slice header, or tile group header, or a coding tree unit row, or a coding tree unit, or a coding unit or at a video data unit level.

Further embodiments of examples 15-17 are described in item 6 of section 4. Further embodiments of example 18 are described in item 7 of section 4. Further embodiments of example 19 are described in item 8 of section 4. Further embodiments of example 20 are described in item 9 of section 4.

21. A video processing method, comprising: determining a condition for selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the condition is signalled in the bitstream representation.
22. The method of example 21, wherein the condition is a color format or a usage of a separate plane coding or based on color identity of the current video block.

Further embodiments of examples 21-22 are described in item 10 of section 4.

23. The method of any of examples 21 to 22, wherein the condition is signalled in the bitstream representation separately for chroma and luma components.

Further embodiments of example 23 are described in item 11 of section 4.

24. The method of any of examples 21 to 23, wherein the condition depends on a coding information of the current video block and a neighboring video region.
25. The method of example 24, wherein the condition precludes the applying for the current video block that is coded using a specific intra-prediction mode.

Further embodiments of examples 24-25 are described in item 12 of section 4.

26. The method of example 24, wherein the condition specifies the applying for the current video block that is inter-coded.
27. The method of example 24, wherein the condition specifies the applying for the current video block that is coded using an intra-block copy mode.

Further embodiments of examples 25-26 are described in item 13 of section 4.

28. The method of example 21, wherein the condition is signalled in the bitstream representation at a level such that all blocks within that level comply with the condition, wherein the level is a sequence parameter set level, or picture parameter set level, or a picture header, or slice header, or tile group header, or a coding tree unit row, or a coding tree unit, or a coding unit or at a video data unit level.

Further embodiments of example 28 are described in item 14 of section 4.

29. The method of example 21, wherein the condition is that the current video block is coded using a transform skip mode.

Further embodiments of example 29 are described in item 17 of section 4.

30. A video processing method, comprising: selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the conversion includes selectively applying a Position Dependent intra Prediction Combination (PDPC) based on a coexistence rule.

31. The method of example 30, wherein the coexistence rule excludes applying the PDPC to the current video block due to the applying the secondary transform.

32. The method of example 30, wherein the coexistence rule specifies applying the PDPC to the current video block due to the applying the secondary transform.

33. The method of example 30, wherein the selectively applying the secondary transform is performed for the current video block that uses the PDPC.

Further embodiments of examples 30-33 are described in item 15 of section 4.

34. A video processing method, comprising: applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the applying controls a use of neighboring samples for intra prediction during the conversion.

Further embodiments of example 34 are described in item 16 of section 4.

35. A video processing method, comprising: selectively applying a secondary transform with reduced dimensions during to a conversion between a bitstream representation of a current video block and pixels of the current video block, and performing the conversion by applying the secondary transform with reduced dimensions according to the condition; wherein the secondary transform with reduced dimensions has dimensions reduced from a dimension of the current video block; and wherein the selectively applying controls a use of quantization matrix during the conversion.

36. The method of example 35, wherein the use of quantization matrix occurs only due to the applying the secondary transform.

Further embodiments of examples 35-36 are described in item 22 of section 4

37. The method of any of examples 1-36, wherein the primary transform and the secondary transform are stored as transform matrices having bit-widths less than 8.

38. The method of any of examples 1-36, wherein the primary transform and the secondary transform are stored as predictive transform matrices.

39. The method of any of examples 1-36, wherein the primary transform is derivable from the secondary transform using a first rule or wherein the secondary transform is derivable from the primary transform using a second rule.

40. The method of any of examples 1-36, wherein the bitstream representation includes information about the secondary transform or the primary transform before residual information for the current video block.

Further embodiments of examples 37-40 are described in items 18, 19, 20 and 21 of section 4.

41. The method of example 1, wherein the constraint rule for selectively applying the secondary transform is dependent on a number of transform units in a coding unit of the current video block.

42. The method of example 41, wherein the constraint rule specifies to apply the secondary transform due to the number of transform units in the coding unit being greater than one.

43. The method of example 1, wherein a flag in the bitstream representation indicates whether or not the secondary transform with reduced dimensions is applied to the conversion.

44. The method of example 1, wherein the current video block includes more than one component video blocks and wherein the constrained rule specifies applicability of the secondary transform with reduced dimension differently for different component video blocks.

45. The method of example 44, wherein the constrained rule specifies applicability of the secondary transform with reduced dimension for a first component video block based on how the constrained rule is applied to a second component video block.

46. The method of any of examples 44-45, wherein the constraint rule further depends on dimensions of the current video block.

Further embodiments of examples 47-53 are described in, e.g., items 30 to 38 of section 4.

47. A method of video processing, comprising: determining, for a conversion between a current video block of a video and a bitstream representation of the video, whether to use a separable secondary transform (SST) for the conversion based on a coding condition; and performing the conversion according to the determining.

48. The method of example 47, wherein the coding condition corresponds to a syntax element in the bitstream representation.

49. The method of example 48, wherein the coding condition comprises a size of the current video block.

50. The method of any of examples 47-49, wherein, upon determining to use the SST, the conversion uses a selected SST that is selected from a set of SSTs based on another coding condition.

51. The method of example 50, wherein the another coding condition includes a dimension of the current video block.

52. The method of any of examples 1-51, wherein the conversion comprises decoding and parsing the bitstream representation to generate the video.
53. The method of any of examples 1-51, wherein the conversion comprises encoding the video into the bitstream representation.
54. A video processing apparatus comprising a processor configured to implement one or more of examples 1 to 53.
55. A computer-readable medium having code stored thereon, the code, when executed by a processor, causing the processor to implement a method recited in any one or more of examples 1 to 53.

It will be appreciated that the disclosed techniques may be embodied in video encoders or decoders to improve compression efficiency using techniques that include the use of a reduced dimension secondary transform.

Figure 19:
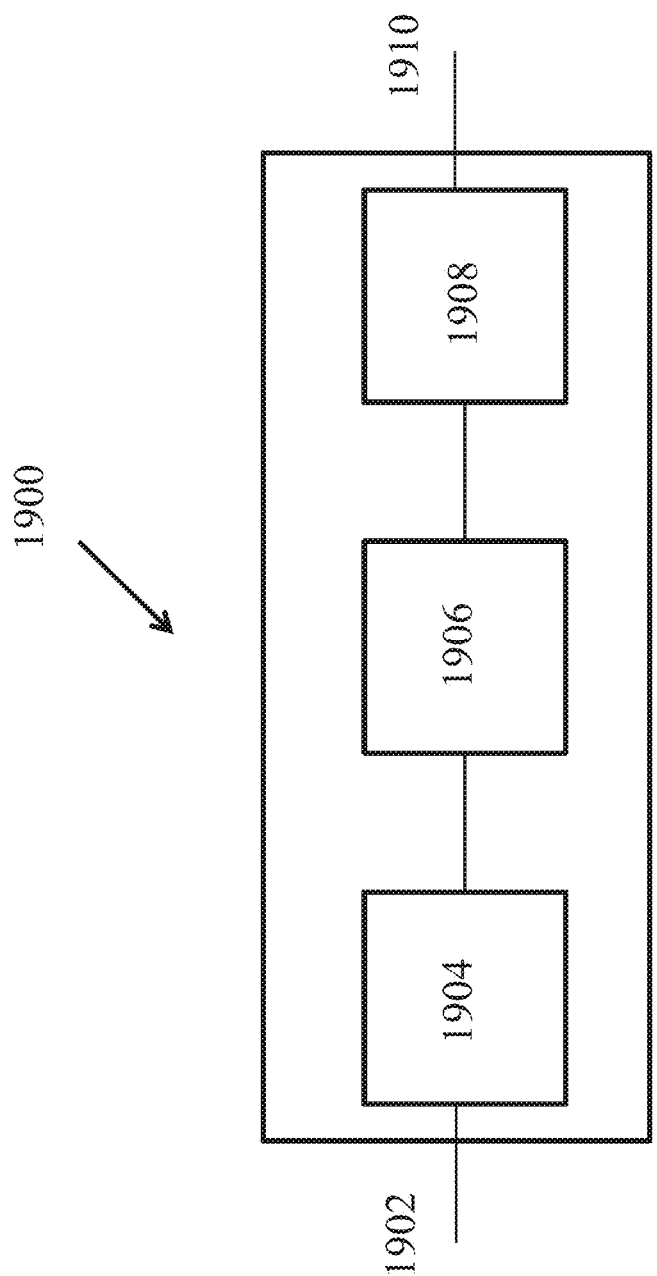
FIG. 19 is a block diagram of an example video processing system in which disclosed techniques may be implemented.

FIG. 19 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The techniques described in the present document may be embodied in various electronic devices such as mobile phones, laptops, smartphones or other devices that are capable of performing digital data processing and/or video display.

Figure 28:
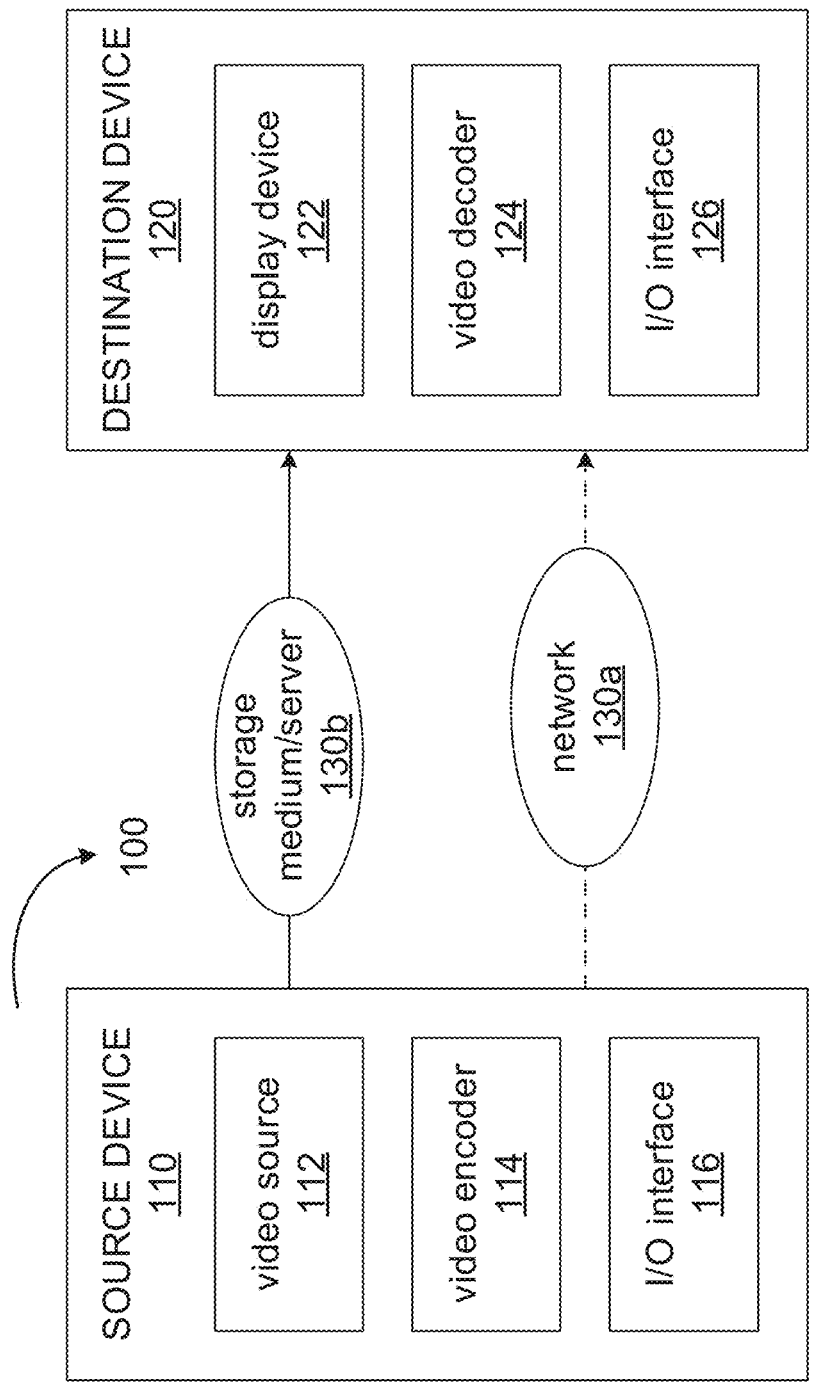
FIG. 28 is a block diagram that illustrates an example video coding system.

FIG. 28 is a block diagram that illustrates an example video coding system 100 that may utilize the techniques of this disclosure.

As shown in FIG. 28, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 29:
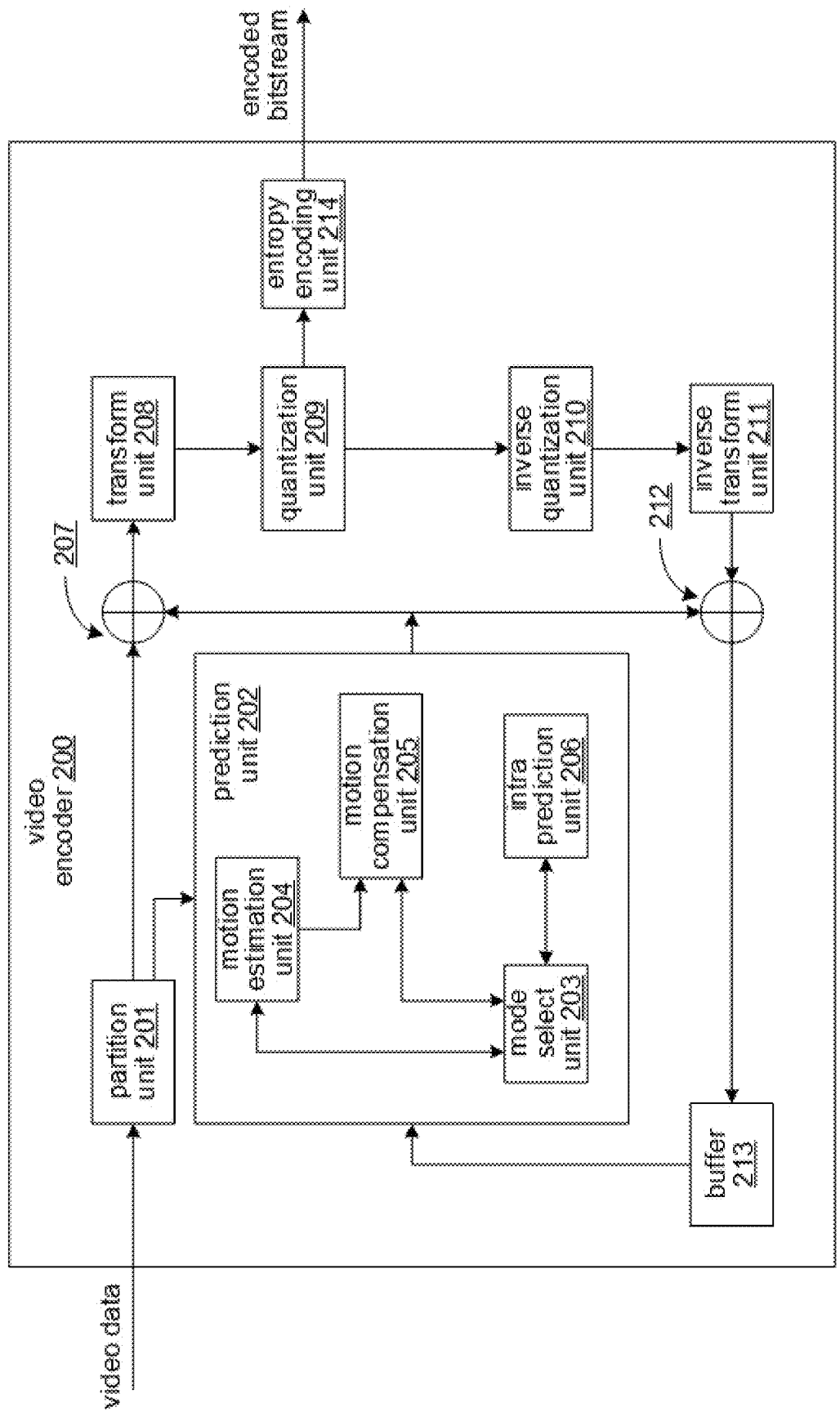
FIG. 29 is a block diagram that illustrates an encoder in accordance with some embodiments of the present disclosure.

FIG. 29 is a block diagram illustrating an example of video encoder 200, which may be video encoder 114 in the system 100 illustrated in FIG. 28.

Video encoder 200 may be configured to perform any or all of the techniques of this disclosure. In the example of FIG. 29, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 19 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 30:
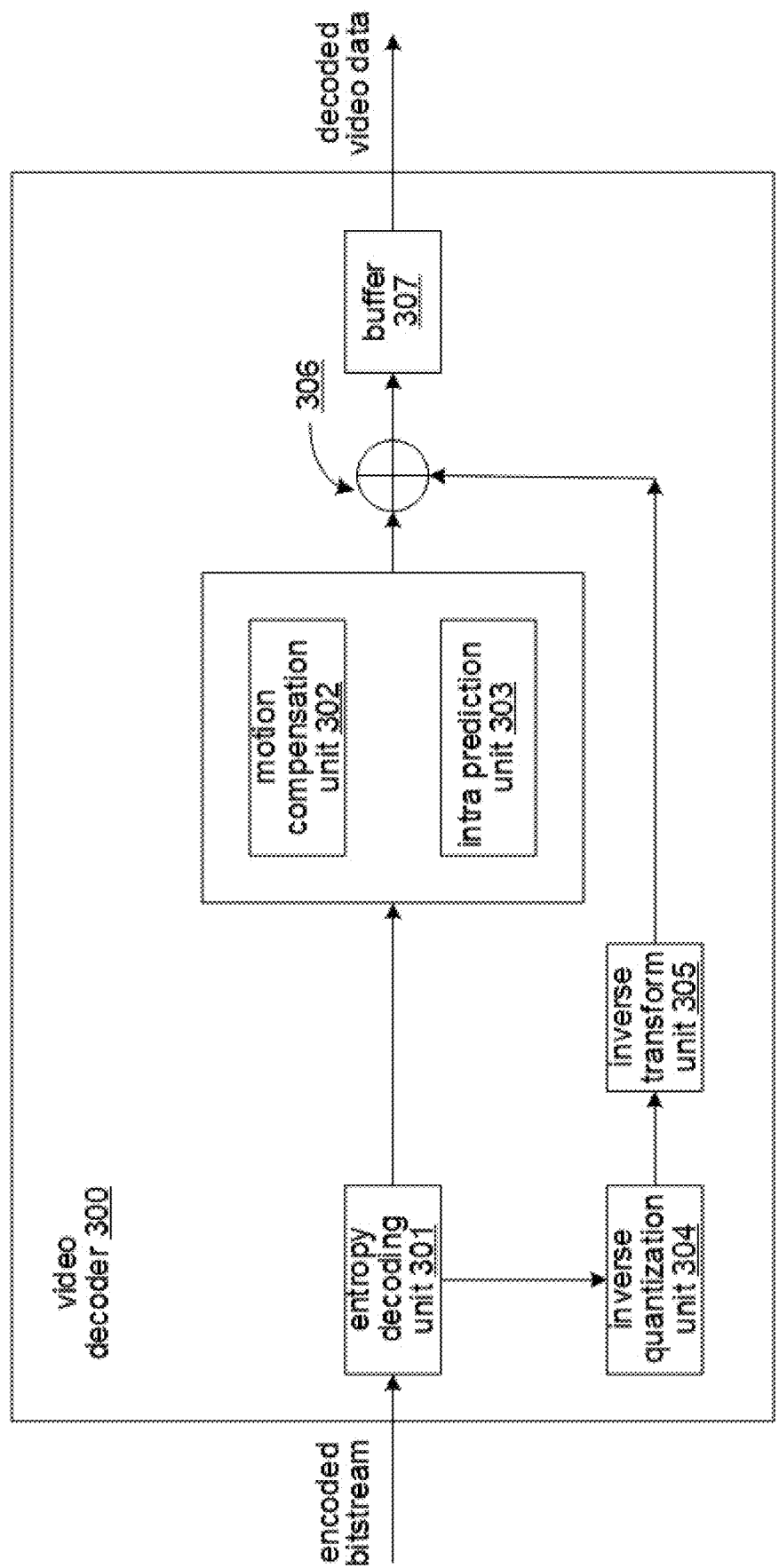
FIG. 30 is a block diagram that illustrates a decoder in accordance with some embodiments of the present disclosure.

FIG. 30 is a block diagram illustrating an example of video decoder 300 which may be video decoder 114 in the system 100 illustrated in FIG. 28.

The video decoder 300 may be configured to perform any or all of the techniques of this disclosure. In the example of FIG. 30, the video decoder 300 includes a plurality of functional components. The techniques described in this disclosure may be shared among the various components of the video decoder 300. In some examples, a processor may be configured to perform any or all of the techniques described in this disclosure.

In the example of FIG. 30, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 29).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 31:
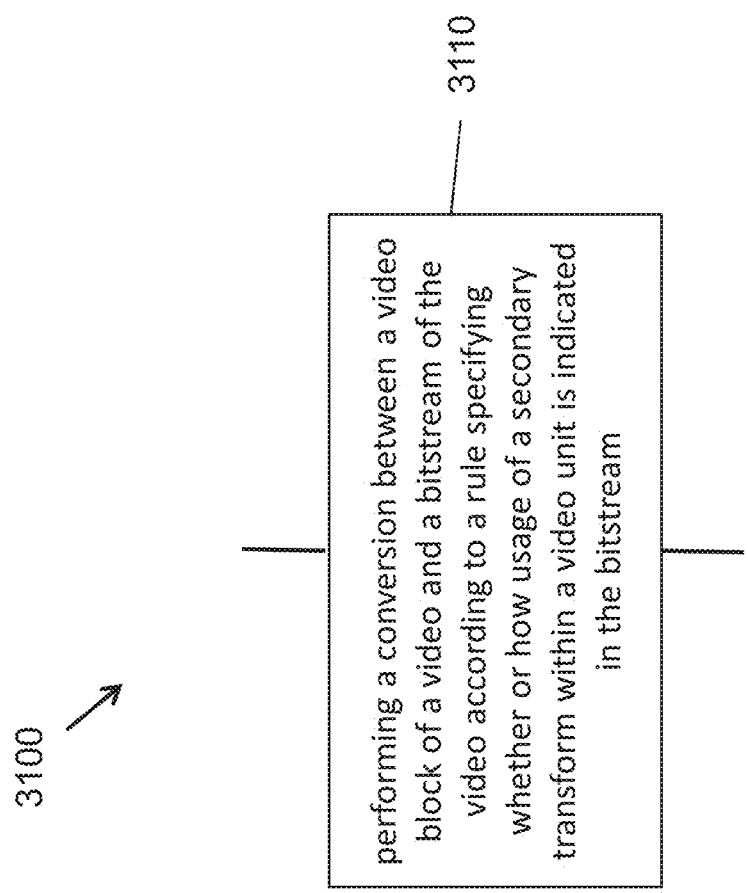
FIG. 31 is a flowchart representation of a method for video processing in accordance with the present embodiments.

FIG. 31 is a flowchart representation of a method 3100 for video processing in accordance with the present embodiments. The method 3100 includes, at operation 3110, performing a conversion between a video block of a video and a bitstream of the video according to a rule. The rule specifies whether or how usage of a secondary transform within a video unit is indicated in the bitstream. The secondary transform is applied before quantization or after de-quantization.

In some embodiments, the secondary transform is applied between forward primary transform and quantization or between de-quantization and invert primary transform. In some embodiments, the video unit comprises a video picture of the video. In some embodiments, the video unit comprises a video sequence of the video. In some embodiments, the secondary transform comprises an enhanced secondary transform.

In some embodiments, implicit or explicit indication of the usage of the secondary transform is based on a coding mode of the video block. In some embodiments, the video block is coded in an intra-coded mode. The usage of the secondary transform is explicitly indicated in the bitstream in case the video block is coded without using a derived tree block partition or a pulse-coded modulation (PCM) coding tool. In some embodiments, a syntax element is used to explicitly indicate the usage of the secondary transform. In some embodiments, the video block is coded in an intra-coded mode. The usage of the secondary transform is implicitly indicated in the bitstream in case the video block is coded using a derived tree block partition. In some embodiments, the secondary transform is always applied within the video unit. In some embodiments, the video block is coded in an intra-coded mode. The usage of the secondary transform is implicitly indicated in the bitstream in case the video block is coded using a pulse-coded modulation (PCM) coding tool. In some embodiments, the secondary transform is always excluded within the video unit.

In some embodiments, the usage of the secondary transform is implicated indicated using one or more implicit methods. In some embodiments, determination of the one or more implicit methods is based on coding information of the video block. In some embodiments, the video block is coded in an intra-coded mode. The one or more implicit methods are determined based on applicable transform coefficients in case the video block is coded without using a derived tree block partition or a pulse-coded modulation (PCM) coding tool. In some embodiments, the usage of the secondary transform is indicated based on parity of odd transform coefficients and/or parity of even coefficients in the video block.

Figure 32:
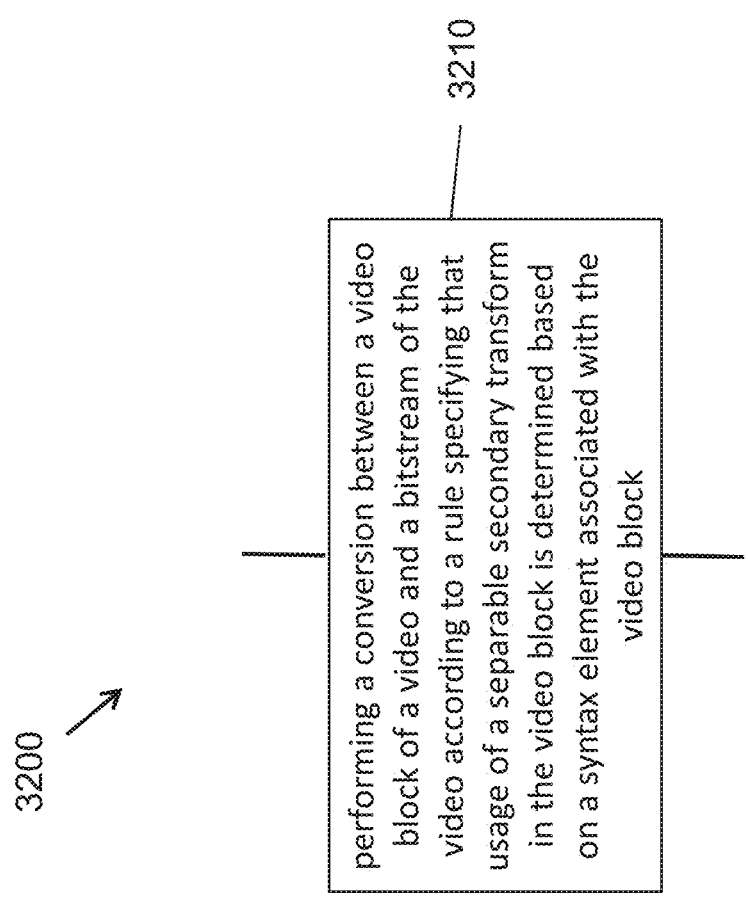
FIG. 32 is a flowchart representation of another method for video processing in accordance with the present embodiments.

FIG. 32 is a flowchart representation of a method 3200 for video processing in accordance with the present embodiments. The method 3200 includes, at operation 3210, performing a conversion between a video block of a video and a bitstream of the video according to a rule. The rule specifies that usage of a separable secondary transform in the video block is determined based on a syntax element associated with the video block. The separable secondary transform is applied between forward primary transform and quantization or between de-quantization and invert primary transform.

In some embodiments, the separable secondary transform is applied to the video block in case a value of the syntax element is 1. In some embodiments, the separable secondary transform is disabled in the video block in case a value of the syntax element is 1. In some embodiments, indication of the syntax element is conditioned based on coding information of the video block. In some embodiments, the syntax element is indicated in case the video block is a luma block. In some embodiments, the syntax element is omitted in the bitstream in case a derived tree block partition is used in the video block. In some embodiments, the syntax element is omitted in the bitstream in case a primary transform is not a discrete cosine transform type-II (DCT-2). In some embodiments, a default value of the syntax element is inferred to be 0 in case the syntax element is omitted in the bitstream.

Figure 33:
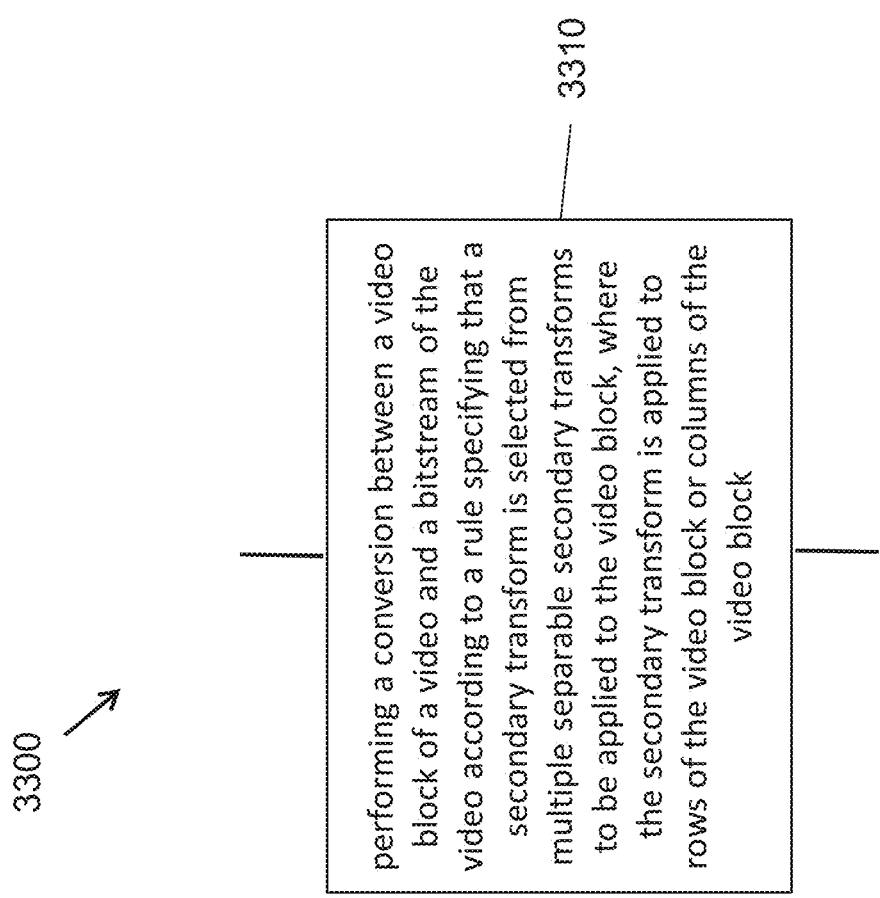
FIG. 33 is a flowchart representation of another method for video processing in accordance with the present embodiments.

FIG. 33 is a flowchart representation of a method 3300 for video processing in accordance with the present embodiments. The method 3300 includes, at operation 3310, performing a conversion between a video block of a video and a bitstream of the video according to a rule. The rule specifies that a secondary transform is selected from multiple separable secondary transforms to be applied to the video block. The secondary transform is applied to rows of the video block or columns of the video block.

In some embodiments, selection of the secondary transform is indicated in the bitstream. In some embodiments, selection of the secondary transform is derived based on coding information of the video block. In some embodiments, a 4×4 separable secondary transform is applied to rows of the video block in case a width of the video block is smaller than or equal to N, N being a positive integer. In some embodiments, a 4×4 separable secondary transform is applied to columns of the video block in case a height of the video block is smaller than or equal to N, N being a positive integer. In some embodiments, an 8×8 separable secondary transform is applied to rows of the video block in case a width of the video block is greater than N, N being a positive integer. In some embodiments, an 8×8 separable secondary transform is applied to columns of the video block in case a height of the video block is greater than N, N being a positive integer. In some embodiments, a 4×4 or 8×8 separable secondary transform is applied to four top-most rows of the video block in case a height of the video block is smaller than or equal to than N, N being a positive integer. In some embodiments, a 4×4 or 8×8 separable secondary transform is applied to eight top-most rows of the video block in case a height of the video block greater than N, N being a positive integer. In some embodiments, a 4×4 or 8×8 separable secondary transform is applied to four left-most columns of the video block in case a width of the video block is smaller than or equal to than N, N being a positive integer. In some embodiments, a 4×4 or 8×8 separable secondary transform is applied to eight left-most columns of the video block in case a width of the video block greater than N, N being a positive integer. In some embodiments, N is 4 or 8.

In some embodiments, a core matrix of an 8×8 separable secondary transform is defined as:

$$S_8 = \begin{bmatrix} 123 & -35 & -8 & -3 & -2 & -1 & -1 & -1 \\ 32 & 120 & -29 & -10 & -5 & -3 & -2 & -1 \\ -14 & -24 & -123 & 21 & 8 & 4 & 3 & 2 \\ 7 & 11 & 17 & 125 & -16 & -7 & -4 & -2 \\ -4 & -7 & -8 & -13 & -126 & 13 & 5 & 3 \\ 3 & 4 & 5 & 6 & 11 & 127 & -10 & -5 \\ -2 & -3 & -3 & -4 & -5 & -9 & -127 & 9 \\ 2 & 2 & 3 & 3 & 3 & 5 & 8 & 128 \end{bmatrix}.$$

Figure 34:
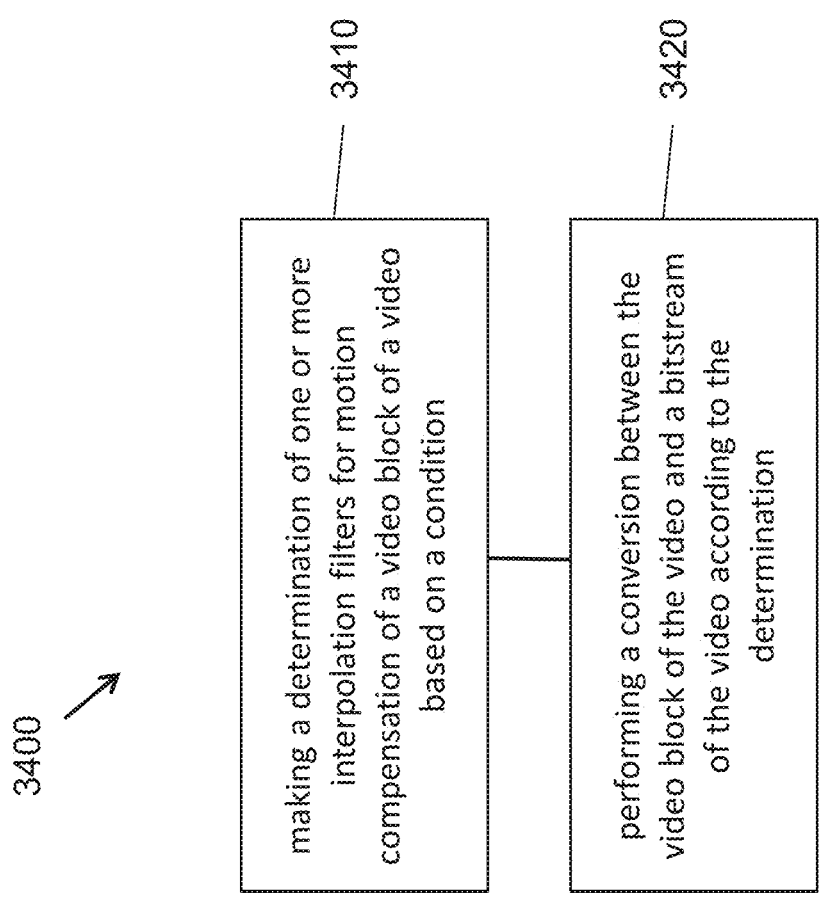
FIG. 34 is a flowchart representation of another method for video processing in accordance with the present embodiments.

FIG. 34 is a flowchart representation of a method 3400 for video processing in accordance with the present embodiments. The method 3400 includes, at operation 3410, making a determination of one or more interpolation filters for motion compensation of a video block of a video based on a condition. The method 3400 includes, at operation 3420, performing a conversion between the video block of the video and a bitstream of the video according to the determination.

In some embodiments, the condition comprises whether an affine prediction is applied to the video block. In some embodiments, the condition comprises whether an interweaved prediction is applied to the video block. In some embodiments, the condition comprises whether an affine prediction and a bi-prediction are applied to the video block. In some embodiments, the condition comprises whether an interweaved prediction and a bi-prediction are applied to the video block.

In some embodiments, two interpolation filters having different numbers of filter coefficients are different. In some embodiments, two interpolation filters having at least one different filter coefficient are different. In some embodiments, in case the condition is satisfied, the one or more interpolation filters comprises at least one of: {0, 0, 0, 64, 0, 0, 0, 0}, {0, 1, −3, 63, 4, −2, 1, 0}, {0, 2, −5, 62, 8, −3, 0, 0}, {0, 3, −8, 60, 13, −4, 0, 0}, {0, 4, −10, 58, 17, −5, 0, 0}, {0, 3, −11, 52, 26, −8, 2, 0}, {0, 2, −9, 47, 31, −10, 3, 0}, {0, 3, −11, 45, 34, −10, 3, 0}, {0, 3, −11, 40, 40, −11, 3, 0}, {0, 3, −10, 34, 45, −11, 3, 0}, {0, 3, −10, 31, 47, −9, 2, 0}, {0, 2, −8, 26, 52, −11, 3, 0}, {0, 0, −5, 17, 58, −10, 4, 0}, {0, 0, −4, 13, 60, −8, 3, 0}, {0, 0, −3, 8, 62, −5, 2, 0}, or {0, 1, −2, 4, 63, −3, 1, 0}.

In some embodiments, in case the condition is satisfied, the one or more interpolation filters comprises at least one of: {0, 0, 0, 64, 0, 0, 0, 0}, {0, 1, −3, 63, 4, −1, 0, 0}, {0, 2, −6, 62, 8, −3, 1, 0}, {0, 2, −8, 60, 13, −5, 2, 0}, {0, 2, −9, 57, 18, −6, 2, 0}, {0, 3, −11, 53, 24, −8, 3, 0}, {0, 3, −10, 49, 29, −9, 2, 0}, {0, 3, −11, 45, 34, −10, 3, 0}, {0, 3, −11, 40, 40, —11, 3, 0}, {0, 3, −10, 34, 45, −11, 3, 0}, {0, 2, −9, 29, 49, −10, 3, 0}, {0, 3, −8, 24, 53, −11, 3, 0}, {0, 2, −6, 18, 57, −9, 2, 0}, {0, 2, −5, 13, 60, −8, 2, 0}, {0, 1, −3, 8, 62, −6, 2, 0}, or {0, 0, −1, 4, 63, −3, 1, 0}.

Figure 35:
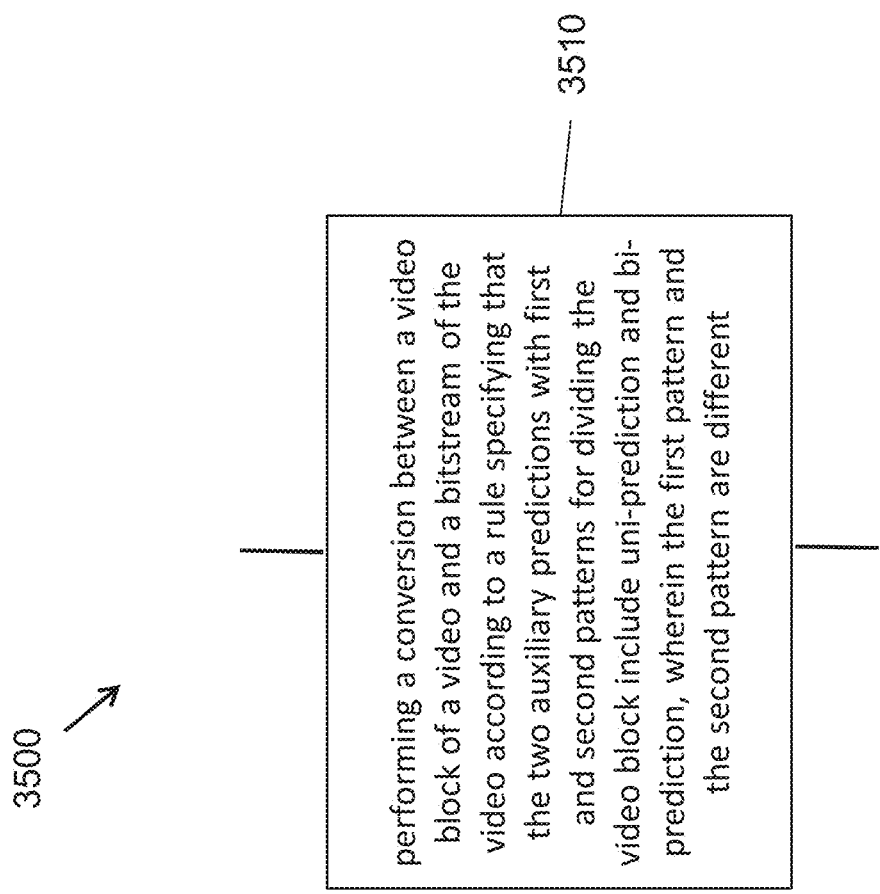
FIG. 35 is a flowchart representation of yet another method for video processing in accordance with the present embodiments.

FIG. 35 is a flowchart representation of a method 3500 for video processing in accordance with the present embodiments. The method 3500 includes, at operation 3510, performing a conversion between a video block of a video and a bitstream of the video according to a rule. The video block is coded using an interweaved prediction mode in which the video block is divided into sub-blocks using a first pattern and a second pattern, and a final prediction is determined as a weighted sum of two auxiliary predictions with the first and second patterns. The rule specifies that the two auxiliary predictions with the first and second patterns include uni-prediction and bi-prediction, wherein the first pattern and the second pattern are different.

In some embodiments, the first pattern used for the uni-prediction mode comprises 4×4 sub-blocks with a 2×2 offset at a left-bottom corner of the video block. In some embodiments, the first pattern used for the uni-prediction mode comprises 8×8 sub-blocks with a 4×4 offset at a left-bottom corner of the video block.

In some embodiments, two applicable weighting values Wa and Wb for the weighted sum satisfy Wa+Wb=2N, where N is a positive integer greater than 1. In some embodiments, a first weight w1 is associated with a first prediction sample P1 generated by the first pattern and a second weight w2 is associated with a second prediction sample P2 generated by the second pattern. The final prediction is calculated as P=(P1+P2)»1 or (P1+P2+1)»1 in case w1 and w2 are same, w1 and w2 being either Wa or Wb. In some embodiments, a first weight w1 is associated with a first prediction sample P1 generated by the first pattern and a second weight w2 is associated with a second prediction sample P2 generated by the second pattern. The final prediction is calculated as P=(w1×P1+w1×P2+offset)»N in case w1 and w2 are different, where offset is equal to 1<<(N−1) or 0.

In some embodiments, weighting values for an 8×8 sub-block are shown by a matrix as follows:

| Wb | Wb | Wb | Wb | Wb | Wb | Wb | Wb |
|----|----|----|----|----|----|----|----|
| Wb | Wb | Wb | Wb | Wb | Wb | Wb | Wb |
| Wb | Wb | Wa | Wa | Wa | Wa | Wb | Wb |
| Wb | Wb | Wa | Wa | Wa | Wa | Wb | Wb |
| Wb | Wb | Wa | Wa | Wa | Wa | Wb | Wb |
| Wb | Wb | Wa | Wa | Wa | Wa | Wb | Wb |
| Wb | Wb | Wb | Wb | Wb | Wb | Wb | Wb |
| Wb | Wb | Wb | Wb | Wb | Wb | Wb | Wb |

In some embodiments, weighting values for an 8×4 sub-block are shown by a matrix as follows:

| Wb | Wb | Wa | Wa | Wa | Wa | Wb | Wb |
|----|----|----|----|----|----|----|----|
| Wb | Wb | Wa | Wa | Wa | Wa | Wb | Wb |
| Wb | Wb | Wa | Wa | Wa | Wa | Wb | Wb |
| Wb | Wb | Wa | Wa | Wa | Wa | Wb | Wb |

In some embodiments, weighting values for a 4×8 sub-block are shown by a matrix as follows:

| Wb | Wb | Wb | Wb |
|----|----|----|----|
| Wb | Wb | Wb | Wb |
| Wa | Wa | Wa | Wa |
| Wa | Wa | Wa | Wa |
| Wa | Wa | Wa | Wa |
| Wa | Wa | Wa | Wa |
| Wb | Wb | Wb | Wb |
| Wb | Wb | Wb | Wb |

In some embodiments, weighting values for a 4×4 sub-block are shown by a matrix as follows:

| Wa | Wa | Wa | Wa |
|----|----|----|----|
| Wa | Wa | Wa | Wa |
| Wa | Wa | Wa | Wa |
| Wa | Wa | Wa | Wa |

In some embodiments, the conversion comprises encoding the video into the bitstream. In some embodiments, the conversion comprises decoding the bitstream to generate the video.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the present disclosure include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video block of a video and a bitstream of the video according to a rule,
wherein the rule specifies whether an implicit indication manner or an explicit indication manner is applied for indicating a usage of a secondary transform for the video block within a video unit is indicated in the bitstream,
wherein the secondary transform is applied before quantization or after de-quantization, and
wherein the secondary transform is applied between forward primary transform and quantization or between de-quantization and invert primary transform;
wherein whether the implicit indication manner or the explicit indication manner is applied for indicating the usage of the secondary transform is based on a coding mode of the video block;
wherein whether the implicit indication manner or the explicit indication manner is applied for indicating the usage of the secondary transform is determined based on whether a pulse-coded modulation (PCM) coding tool is applied to the video block; and
wherein in response to the PCM coding tool being applied to the video block, the implicit indication manner of not using the secondary transform is applied to the video block.

2. The method of claim 1, wherein the video unit comprises a video picture of the video.

3. The method of claim 1, wherein the video unit comprises a video sequence of the video.

4. The method of claim 1, wherein the secondary transform comprises an enhanced secondary transform.

5. The method of claim 1, wherein whether the implicit indication manner or the explicit indication manner is applied for indicating the usage of the secondary transform is determined based on whether the video block is coded with a derived tree partition.

6. The method of claim 1, wherein multiple ways of implicit indication manners are utilized to video blocks within the video unit.

7. The method of claim 1, wherein in response to a non-intra prediction coding mode being applied to the video block, the implicit indication manner of not using the secondary transform is applied to the video block.

8. The method of claim 1, wherein a syntax element is used for the explicit indication manner of the usage of the secondary transform.

9. The method of claim 1, wherein the conversion comprises encoding the video into the bitstream.

10. The method of claim 1, wherein the conversion comprises decoding the video from the bitstream.

11. An apparatus for processing video data comprising a processor and a non-transitory memory with instructions thereon, wherein the instructions upon execution by the processor, cause the processor to:
perform a conversion between a video block of a video and a bitstream of the video according to a rule,
wherein the rule specifies whether an implicit indication manner or an explicit indication manner is applied for indicating a usage of a secondary transform for the video block within a video unit is indicated in the bitstream,
wherein the secondary transform is applied before quantization or after de-quantization, and
wherein the secondary transform is applied between forward primary transform and quantization or between de-quantization and invert primary transform;
wherein whether the implicit indication manner or the explicit indication manner is applied for indicating the usage of the secondary transform is based on a coding mode of the video block;
wherein whether the implicit indication manner or the explicit indication manner is applied for indicating the usage of the secondary transform is determined based on whether a pulse-coded modulation (PCM) coding tool is applied to the video block; and
wherein in response to the PCM coding tool being applied to the video block, the implicit indication manner of not using the secondary transform is applied to the video block.

12. The apparatus of claim 11, wherein the video unit comprises a video sequence of the video.

13. A non-transitory computer-readable storage medium storing instructions that cause a processor to:
perform a conversion between a video block of a video and a bitstream of the video according to a rule,
wherein the rule specifies whether an implicit indication manner or an explicit indication manner is applied for indicating a usage of a secondary transform for the video block within a video unit is indicated in the bitstream,
wherein the secondary transform is applied before quantization or after de-quantization, and
wherein the secondary transform is applied between forward primary transform and quantization or between de-quantization and invert primary transform;
wherein whether the implicit indication manner or the explicit indication manner is applied for indicating the usage of the secondary transform is based on a coding mode of the video block;
wherein whether the implicit indication manner or the explicit indication manner is applied for indicating the usage of the secondary transform is determined based on whether a pulse-coded modulation (PCM) coding tool is applied to the video block; and
wherein in response to the PCM coding tool being applied to the video block, the implicit indication manner of not using the secondary transform is applied to the video block.

14. The non-transitory computer-readable storage medium of claim 13, wherein whether the implicit indication manner or the explicit indication manner is applied for indicating the usage of the secondary transform is determined based on whether the video block is coded with a derived tree partition; or
wherein whether the implicit indication manner or the explicit indication manner is applied for indicating the usage of the secondary transform is determined based on whether a pulse-coded modulation (PCM) coding tool is applied to the video block, wherein in response to the PCM coding tool being applied to the video block, the implicit indication manner of not using the secondary transform is applied to the video block; or
wherein in response to a non-intra prediction coding mode being applied to the video block, the implicit indication manner of not using the secondary transform is applied to the video block.

15. The non-transitory computer-readable storage medium of claim 13, wherein a syntax element is used for the explicit indication manner of the usage of the secondary transform.

16. A method for storing a bitstream of a video, comprising:
generating the bitstream of the video from a video block of the video according to a rule; and
storing the bitstream in a non-transitory computer-readable recording medium,
wherein the rule specifies whether an implicit indication manner or an explicit indication manner is applied for indicating a usage of a secondary transform for the video block within a video unit is indicated in the bitstream,
wherein the secondary transform is applied before quantization or after de-quantization, and
wherein the secondary transform is applied between forward primary transform and quantization or between de-quantization and invert primary transform;
wherein whether the implicit indication manner or the explicit indication manner is applied for indicating the usage of the secondary transform is based on a coding mode of the video block;
wherein whether the implicit indication manner or the explicit indication manner is applied for indicating the usage of the secondary transform is determined based on whether a pulse-coded modulation (PCM) coding tool is applied to the video block; and
wherein in response to the PCM coding tool being applied to the video block, the implicit indication manner of not using the secondary transform is applied to the video block.

17. The method of claim 16, wherein whether the implicit indication manner or the explicit indication manner is applied for indicating the usage of the secondary transform is determined based on whether the video block is coded with a derived tree partition; or
wherein whether the implicit indication manner or the explicit indication manner is applied for indicating the usage of the secondary transform is determined based on whether a pulse-coded modulation (PCM) coding tool is applied to the video block, wherein in response to the PCM coding tool being applied to the video block, the implicit indication manner of not using the secondary transform is applied to the video block; or
wherein in response to a non-intra prediction coding mode being applied to the video block, the implicit indication manner of not using the secondary transform is applied to the video block.

18. The method of claim 16, wherein a syntax element is used for the explicit indication manner of the usage of the secondary transform.

* * * * *